(12) United States Patent
Polzin et al.

(10) Patent No.: US 9,656,162 B2
(45) Date of Patent: *May 23, 2017

(54) DEVICE FOR IDENTIFYING AND TRACKING MULTIPLE HUMANS OVER TIME

(71) Applicant: Microsoft Technology Licensing, LLC, Redmond, WA (US)

(72) Inventors: R. Stephen Polzin, San Jose, CA (US); Alex A. Kipman, Duvall, WA (US); Mark J. Finocchio, Redmond, WA (US); Ryan Michael Geiss, San Jose, CA (US); Kathryn Stone Perez, Shoreline, WA (US); Kudo Tsunoda, Seattle, WA (US); Darren Alexander Bennett, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 372 days.

This patent is subject to a terminal disclaimer.

(21) Appl. No.: 14/252,657

(22) Filed: Apr. 14, 2014

(65) Prior Publication Data

US 2014/0228123 A1    Aug. 14, 2014

Related U.S. Application Data

(63) Continuation of application No. 12/475,308, filed on May 29, 2009, now Pat. No. 8,744,121.

(51) Int. Cl.
G06K 9/00 (2006.01)
A63F 13/213 (2014.01)
(Continued)

(52) U.S. Cl.
CPC ........ *A63F 13/213* (2014.09); *G06K 9/00342* (2013.01); *G06K 9/00369* (2013.01);
(Continued)

(58) Field of Classification Search
CPC .. G06K 9/00; H04N 7/18; A63F 13/10; A63F 2300/6045; A63F 13/213
See application file for complete search history.

(56) References Cited

U.S. PATENT DOCUMENTS 4,627,620 A    12/1986 Yang
4,630,910 A    12/1986 Ross et al.
(Continued)

FOREIGN PATENT DOCUMENTS

CN    201254344 B    6/2009
EP    0583061 A2    2/1994
(Continued)

OTHER PUBLICATIONS

Shankar et al., "Person Tracking With Audio-Visual Cues Using the Iterative Decoding Framework", IEEE Fifth International Conference on Advanced Video and Signal Based Surveillance, Dec. 30, 2008, 260-267.
(Continued)

*Primary Examiner* — Kang Hu
*Assistant Examiner* — Malina D Blaise
(74) *Attorney, Agent, or Firm* — Baker & Hostetler LLP

(57) ABSTRACT

A system recognizes human beings in their natural environment, without special sensing devices attached to the subjects, uniquely identifies them and tracks them in three dimensional space. The resulting representation is presented directly to applications as a multi-point skeletal model delivered in real-time. The device efficiently tracks humans and their natural movements by understanding the natural mechanics and capabilities of the human muscular-skeletal system. The device also uniquely recognizes individuals in order to allow multiple people to interact with the system via natural movements of their limbs and body as well as voice commands/responses.

20 Claims, 39 Drawing Sheets

(51) Int. Cl.
*H04N 7/18* (2006.01)
*A63F 13/215* (2014.01)

(52) U.S. Cl.
CPC ............ *H04N 7/183* (2013.01); *A63F 13/215* (2014.09); *A63F 2300/1043* (2013.01); *A63F 2300/1081* (2013.01); *A63F 2300/1087* (2013.01); *A63F 2300/6045* (2013.01)

(56) References Cited

U.S. PATENT DOCUMENTS

| | | |
|---|---|---|
| 4,645,458 A | 2/1987 | Williams |
| 4,695,953 A | 9/1987 | Blair et al. |
| 4,702,475 A | 10/1987 | Elstein et al. |
| 4,711,543 A | 12/1987 | Blair et al. |
| 4,751,642 A | 6/1988 | Silva et al. |
| 4,796,997 A | 1/1989 | Svetkoff et al. |
| 4,809,065 A | 2/1989 | Harris et al. |
| 4,817,950 A | 4/1989 | Goo |
| 4,843,568 A | 6/1989 | Krueger et al. |
| 4,893,183 A | 1/1990 | Nayar |
| 4,901,362 A | 2/1990 | Terzian |
| 4,925,189 A | 5/1990 | Braeunig |
| 5,101,444 A | 3/1992 | Wilson et al. |
| 5,148,154 A | 9/1992 | MacKay et al. |
| 5,184,295 A | 2/1993 | Mann |
| 5,229,754 A | 7/1993 | Aoki et al. |
| 5,229,756 A | 7/1993 | Kosugi et al. |
| 5,239,463 A | 8/1993 | Blair et al. |
| 5,239,464 A | 8/1993 | Blair et al. |
| 5,288,078 A | 2/1994 | Capper et al. |
| 5,295,491 A | 3/1994 | Gevins |
| 5,320,538 A | 6/1994 | Baum |
| 5,347,306 A | 9/1994 | Nitta |
| 5,385,519 A | 1/1995 | Hsu et al. |
| 5,405,152 A | 4/1995 | Katanics et al. |
| 5,417,210 A | 5/1995 | Funda et al. |
| 5,423,554 A | 6/1995 | Davis |
| 5,454,043 A | 9/1995 | Freeman |
| 5,469,740 A | 11/1995 | French et al. |
| 5,495,576 A | 2/1996 | Ritchey |
| 5,516,105 A | 5/1996 | Eisenbrey et al. |
| 5,524,637 A | 6/1996 | Erickson et al. |
| 5,534,917 A | 7/1996 | MacDougall |
| 5,563,988 A | 10/1996 | Maes et al. |
| 5,577,981 A | 11/1996 | Jarvik |
| 5,580,249 A | 12/1996 | Jacobsen et al. |
| 5,594,469 A | 1/1997 | Freeman et al. |
| 5,597,309 A | 1/1997 | Riess |
| 5,616,078 A | 4/1997 | Oh |
| 5,617,312 A | 4/1997 | Iura et al. |
| 5,638,300 A | 6/1997 | Johnson |
| 5,641,288 A | 6/1997 | Zaenglein |
| 5,682,196 A | 10/1997 | Freeman |
| 5,682,229 A | 10/1997 | Wangler |
| 5,690,582 A | 11/1997 | Ulrich et al. |
| 5,703,367 A | 12/1997 | Hashimoto et al. |
| 5,704,837 A | 1/1998 | Iwasaki et al. |
| 5,715,834 A | 2/1998 | Bergamasco et al. |
| 5,875,108 A | 2/1999 | Hoffberg et al. |
| 5,877,803 A | 3/1999 | Wee et al. |
| 5,913,727 A | 6/1999 | Ahdoot |
| 5,933,125 A | 8/1999 | Fernie |
| 5,980,256 A | 11/1999 | Carmein |
| 5,989,157 A | 11/1999 | Walton |
| 5,995,649 A | 11/1999 | Marugame |
| 6,005,548 A | 12/1999 | Latypov et al. |
| 6,009,210 A | 12/1999 | Kang |
| 6,054,991 A | 4/2000 | Crane et al. |
| 6,057,909 A | 5/2000 | Yahav et al. |
| 6,066,075 A | 5/2000 | Poulton |
| 6,072,494 A | 6/2000 | Nguyen |
| 6,073,489 A | 6/2000 | French et al. |
| 6,077,201 A | 6/2000 | Cheng |
| 6,098,458 A | 8/2000 | French et al. |
| 6,100,517 A | 8/2000 | Yahav et al. |
| 6,100,896 A | 8/2000 | Strohecker et al. |
| 6,101,289 A | 8/2000 | Kellner |
| 6,128,003 A | 10/2000 | Smith et al. |
| 6,130,677 A | 10/2000 | Kunz |
| 6,141,463 A | 10/2000 | Covell et al. |
| 6,147,678 A | 11/2000 | Kumar et al. |
| 6,152,856 A | 11/2000 | Studor et al. |
| 6,159,100 A | 12/2000 | Smith |
| 6,173,066 B1 | 1/2001 | Peurach et al. |
| 6,181,343 B1 | 1/2001 | Lyons |
| 6,188,777 B1 | 2/2001 | Darrell et al. |
| 6,215,890 B1 | 4/2001 | Matsuo et al. |
| 6,215,898 B1 | 4/2001 | Woodfill et al. |
| 6,226,396 B1 | 5/2001 | Marugame |
| 6,229,913 B1 | 5/2001 | Nayar et al. |
| 6,256,033 B1 | 7/2001 | Nguyen |
| 6,256,400 B1 | 7/2001 | Takata et al. |
| 6,283,860 B1 | 9/2001 | Lyons et al. |
| 6,289,112 B1 | 9/2001 | Jain et al. |
| 6,299,308 B1 | 10/2001 | Voronka et al. |
| 6,308,565 B1 | 10/2001 | French et al. |
| 6,316,934 B1 | 11/2001 | Amorai-Moriya et al. |
| 6,363,160 B1 | 3/2002 | Bradski et al. |
| 6,384,819 B1 | 5/2002 | Hunter |
| 6,411,744 B1 | 6/2002 | Edwards |
| 6,430,997 B1 | 8/2002 | French et al. |
| 6,476,834 B1 | 11/2002 | Doval et al. |
| 6,496,598 B1 | 12/2002 | Harman |
| 6,498,628 B2 | 12/2002 | Iwamura |
| 6,502,515 B2 | 1/2003 | Burckhardt et al. |
| 6,503,195 B1 | 1/2003 | Keller et al. |
| 6,512,838 B1 | 1/2003 | Rafii et al. |
| 6,539,931 B2 | 4/2003 | Trajkovic et al. |
| 6,570,555 B1 | 5/2003 | Prevost et al. |
| 6,633,294 B1 | 10/2003 | Rosenthal et al. |
| 6,640,202 B1 | 10/2003 | Dietz et al. |
| 6,661,918 B1 | 12/2003 | Gordon et al. |
| 6,674,877 B1 | 1/2004 | Jojic et al. |
| 6,681,031 B2 | 1/2004 | Cohen et al. |
| 6,714,665 B1 | 3/2004 | Hanna et al. |
| 6,731,799 B1 | 5/2004 | Sun et al. |
| 6,738,066 B1 | 5/2004 | Nguyen |
| 6,765,726 B2 | 7/2004 | French et al. |
| 6,771,277 B2 | 8/2004 | Ohba |
| 6,788,809 B1 | 9/2004 | Grzeszczuk et al. |
| 6,801,637 B2 | 10/2004 | Voronka et al. |
| 6,873,723 B1 | 3/2005 | Aucsmith et al. |
| 6,876,496 B2 | 4/2005 | French et al. |
| 6,937,742 B2 | 8/2005 | Roberts et al. |
| 6,950,534 B2 | 9/2005 | Cohen et al. |
| 7,003,134 B1 | 2/2006 | Covell et al. |
| 7,006,236 B2 | 2/2006 | Tomasi et al. |
| 7,027,054 B1 | 4/2006 | Cheiky et al. |
| 7,036,094 B1 | 4/2006 | Cohen et al. |
| 7,038,855 B2 | 5/2006 | French et al. |
| 7,039,676 B1 | 5/2006 | Day et al. |
| 7,042,440 B2 | 5/2006 | Pryor et al. |
| 7,050,177 B2 | 5/2006 | Tomasi et al. |
| 7,050,606 B2 | 5/2006 | Paul et al. |
| 7,058,204 B2 | 6/2006 | Hildreth et al. |
| 7,060,957 B2 | 6/2006 | Lange et al. |
| 7,113,918 B1 | 9/2006 | Ahmad et al. |
| 7,121,946 B2 | 10/2006 | Paul et al. |
| 7,151,530 B2 | 12/2006 | Roeber et al. |
| 7,170,492 B2 | 1/2007 | Bell |
| 7,184,048 B2 | 2/2007 | Hunter |
| 7,200,266 B2 | 4/2007 | Ozer et al. |
| 7,202,898 B1 | 4/2007 | Braun et al. |
| 7,212,665 B2 | 5/2007 | Yang et al |
| 7,222,078 B2 | 5/2007 | Abelow |
| 7,224,384 B1 | 5/2007 | Iddan et al. |
| 7,227,526 B2 | 6/2007 | Hildreth et al. |
| 7,259,747 B2 | 8/2007 | Bell |
| 7,293,356 B2 | 11/2007 | Sohn et al. |
| 7,308,112 B2 | 12/2007 | Fujimura et al. |
| 7,310,431 B2 | 12/2007 | Gokturk et al. |
| 7,317,836 B2 | 1/2008 | Fujimura et al. |
| 7,340,077 B2 | 3/2008 | Gokturk et al. |

(56) References Cited

U.S. PATENT DOCUMENTS

| | | |
|---|---|---|
| 7,348,963 B2 | 3/2008 | Bell |
| 7,359,121 B2 | 4/2008 | French et al. |
| 7,367,887 B2 | 5/2008 | Watabe et al. |
| 7,379,563 B2 | 5/2008 | Shamaie |
| 7,379,566 B2 | 5/2008 | Hildreth |
| 7,389,591 B2 | 6/2008 | Jaiswal et al. |
| 7,412,077 B2 | 8/2008 | Li et al. |
| 7,421,093 B2 | 9/2008 | Hildreth et al. |
| 7,430,312 B2 | 9/2008 | Gu |
| 7,436,496 B2 | 10/2008 | Kawahito |
| 7,450,736 B2 | 11/2008 | Yang et al. |
| 7,452,275 B2 | 11/2008 | Kuraishi |
| 7,460,690 B2 | 12/2008 | Cohen et al. |
| 7,489,812 B2 | 2/2009 | Fox et al. |
| 7,536,032 B2 | 5/2009 | Bell |
| 7,555,142 B2 | 6/2009 | Hildreth et al. |
| 7,560,701 B2 | 7/2009 | Oggier et al. |
| 7,570,805 B2 | 8/2009 | Gu |
| 7,574,020 B2 | 8/2009 | Shamaie |
| 7,576,727 B2 | 8/2009 | Bell |
| 7,590,262 B2 | 9/2009 | Fujimura et al. |
| 7,593,552 B2 | 9/2009 | Higaki et al. |
| 7,598,942 B2 * | 10/2009 | Underkoffler ........... G06F 3/017 345/158 |
| 7,607,509 B2 | 10/2009 | Schmiz et al. |
| 7,613,325 B2 | 11/2009 | Iwasaki et al. |
| 7,620,202 B2 | 11/2009 | Fujimura et al. |
| 7,627,139 B2 | 12/2009 | Marks et al. |
| 7,668,340 B2 | 2/2010 | Cohen et al. |
| 7,680,298 B2 | 3/2010 | Roberts et al. |
| 7,683,954 B2 | 3/2010 | Ichikawa et al. |
| 7,684,592 B2 | 3/2010 | Paul et al. |
| 7,701,439 B2 | 4/2010 | Hillis et al. |
| 7,702,130 B2 | 4/2010 | Im et al. |
| 7,704,135 B2 | 4/2010 | Harrison, Jr. |
| 7,710,391 B2 | 5/2010 | Bell et al. |
| 7,729,530 B2 | 6/2010 | Antonov et al. |
| 7,746,345 B2 | 6/2010 | Hunter |
| 7,760,182 B2 | 7/2010 | Ahmad et al. |
| 7,809,167 B2 | 10/2010 | Bell |
| 7,834,846 B1 | 11/2010 | Bell |
| 7,852,262 B2 | 12/2010 | Namineni et al. |
| RE42,256 E | 3/2011 | Edwards |
| 7,898,522 B2 | 3/2011 | Hildreth et al. |
| 8,035,612 B2 | 10/2011 | Bell et al. |
| 8,035,614 B2 | 10/2011 | Bell et al. |
| 8,035,624 B2 | 10/2011 | Bell et al. |
| 8,072,470 B2 | 12/2011 | Marks |
| 8,287,373 B2 | 10/2012 | Marks et al. |
| 9,317,110 B2 * | 4/2016 | Lutnick .................. G06F 3/011 |
| 2004/0046736 A1 | 3/2004 | Pryor et al. |
| 2004/0207597 A1 | 10/2004 | Marks |
| 2005/0059488 A1 | 3/2005 | Larsen et al. |
| 2005/0105743 A1 | 5/2005 | Faltesek et al. |
| 2006/0033713 A1 | 2/2006 | Pryor |
| 2006/0075422 A1 | 4/2006 | Choi et al. |
| 2006/0188144 A1 | 8/2006 | Sasaki et al. |
| 2006/0239558 A1 | 10/2006 | Rafii et al. |
| 2006/0252541 A1 | 11/2006 | Zalewski et al. |
| 2007/0013718 A1 | 1/2007 | Ohba |
| 2007/0060336 A1 | 3/2007 | Marks et al. |
| 2007/0098222 A1 | 5/2007 | Porter et al. |
| 2007/0216894 A1 | 9/2007 | Garcia et al. |
| 2007/0260984 A1 | 11/2007 | Marks et al. |
| 2007/0279485 A1 | 12/2007 | Ohba et al. |
| 2007/0283296 A1 | 12/2007 | Nilsson |
| 2007/0298882 A1 | 12/2007 | Marks et al. |
| 2008/0001951 A1 | 1/2008 | Marks et al. |
| 2008/0026838 A1 | 1/2008 | Dunstan et al. |
| 2008/0062257 A1 | 3/2008 | Corson |
| 2008/0100620 A1 | 5/2008 | Nagai et al. |
| 2008/0126937 A1 | 5/2008 | Pachet |
| 2008/0134102 A1 | 6/2008 | Movold et al. |
| 2008/0152191 A1 | 6/2008 | Fujimura et al. |
| 2008/0215972 A1 | 9/2008 | Zalewski et al. |
| 2008/0215973 A1 | 9/2008 | Zalewski et al. |
| 2008/0220867 A1 | 9/2008 | Zalewski et al. |
| 2008/0225041 A1 | 9/2008 | El Dokor et al. |
| 2008/0252596 A1 | 10/2008 | Bell et al. |
| 2009/0046056 A1 | 2/2009 | Rosenberg et al. |
| 2009/0077504 A1 | 3/2009 | Bell et al. |
| 2009/0128618 A1 | 5/2009 | Fahn et al. |
| 2009/0141933 A1 | 6/2009 | Wagg |
| 2009/0167679 A1 | 7/2009 | Klier et al. |
| 2009/0215533 A1 | 8/2009 | Zalewski et al. |
| 2009/0221368 A1 | 9/2009 | Yen et al. |
| 2009/0240461 A1 | 9/2009 | Makino et al. |
| 2010/0201693 A1 | 8/2010 | Caplette et al. |
| 2010/0302138 A1 | 12/2010 | Poot et al. |
| 2012/0033856 A1 | 2/2012 | Flagg et al. |
| 2012/0196660 A1 | 8/2012 | El Dokor et al. |
| 2012/0257035 A1 | 10/2012 | Larsen |

FOREIGN PATENT DOCUMENTS

| | | |
|---|---|---|
| JP | 08-044490 A1 | 2/1996 |
| WO | WO 93/10708 A1 | 6/1993 |
| WO | WO 97/17598 A1 | 5/1997 |
| WO | WO 99/15863 A1 | 4/1999 |
| WO | WO 99/44698 A1 | 9/1999 |
| WO | WO 01/59975 A3 | 1/2002 |
| WO | WO 02/082249 A2 | 10/2002 |
| WO | WO 03/001722 A3 | 3/2003 |
| WO | WO 03/046706 A1 | 6/2003 |
| WO | WO 03/073359 A3 | 11/2003 |
| WO | WO 03/054683 A3 | 12/2003 |
| WO | WO 03/071410 A3 | 3/2004 |
| WO | WO 2009/059065 A1 | 5/2009 |

OTHER PUBLICATIONS

Knoop, S. et al., "Sensor Fusion for 3D Human Body Tracking with an Articulated 3D Body Model," May 15, 2006, 7 pages, downloaded at http://i61www.itec.uni-karlsruhe.de/data/File/Publications/icra06.sub.--2- .pdf.

Campbell, L. et al., "Recognition of Human Body Motion Using Phase Space Constraints," M.I.T. Media Laboratory Perceptual Computing Section Technical Report No. 309, 1995, 13 pages, downloaded at https://eprints.kfupm.edu.sa/61304/1/61304.pdf.

Qian et al., "A Gesture-Driven Multimodal Interactive Dance System", IEEE International Conference on Multimedia and Expo, Taipei, Jun. 2004, 3, 1579-1582.

Kanade et al., "A Stereo Machine for Video-rate Dense Depth Mapping and Its New Applications", IEEE Computer Society Conference on Computer Vision and Pattern Recognition, 1996, pp. 196-202,The Robotics Institute, Carnegie Mellon University, Pittsburgh, PA.

Miyagawa et al., "CCD-Based Range Finding Sensor", Oct. 1997, pp. 1648-1652, vol. 44 No. 10, IEEE Transactions on Electron Devices.

Rosenhahn et al., "Automatic Human Model Generation", 2005, pp. 41-48, University of Auckland (CITR), New Zealand.

Aggarwal et al., "Human Motion Analysis: A Review", IEEE Nonrigid and Articulated Motion Workshop, 1997, University of Texas at Austin, Austin, TX.

Shao et al., "An Open System Architecture for a Multimedia and Multimodal User Interface", Aug. 24, 1998, Japanese Society for Rehabilitation of Persons with Disabilities (JSRPD), Japan.

Kohler, "Special Topics of Gesture Recognition Applied in Intelligent Home Environments", In Proceedings of the Gesture Workshop, 1998, pp. 285-296, Germany.

Kohler, "Vision Based Remote Control in Intelligent Home Environments", University of Erlangen-Nuremberg/Germany, 1996, pp. 147-154, Germany.

Kohler, "Technical Details and Ergonomical Aspects of Gesture Recognition applied in Intelligent Home Environments", 1997, Germany.

Hasegawa et al., "Human-Scale Haptic Interaction with a Reactive Virtual Human in a Real-Time Physics Simulator", Jul. 2006, vol. 4, No. 3, Article 6C, ACM Computers in Entertainment, New York, NY.

(56) References Cited

OTHER PUBLICATIONS

Qian et al., "A Gesture-Driven Multimodal Interactive Dance System", Jun. 2004, pp. 1579-1582, IEEE International Conference on Multimedia and Expo (ICME), Taipei, Taiwan.

Zhao, "Dressed Human Modeling, Detection, and Parts Localization", 2001, The Robotics Institute, Carnegie Mellon University, Pittsburgh, PA.

He, "Generation of Human Body Models", Apr. 2005, University of Auckland, New Zealand.

Isard et al., "Condensation—Conditional Density Propagation for Visual Tracking", 1998, pp. 5-28, International Journal of Computer Vision 29(1), Netherlands.

Livingston, "Vision-based Tracking with Dynamic Structured Light for Video See-through Augmented Reality", 1998, University of North Carolina at Chapel Hill, North Carolina, USA.

Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.

Breen et al., "Interactive Occlusion and Collusion of Real and Virtual Objects in Augmented Reality", Technical Report ECRC-95-02, 1995, European Computer-Industry Research Center GmbH, Munich, Germany.

Freeman et al., "Television Control by Hand Gestures", Dec. 1994, Mitsubishi Electric Research Laboratories, TR94-24, Caimbridge, MA.

Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.

Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.

Azarbayejani et al., "Visually Controlled Graphics", Jun. 1993, vol. 15, No. 6, IEEE Transactions on Pattern Analysis and Machine Intelligence.

Granieri et al., "Simulating Humans in VR", The British Computer Society, Oct. 1994, Academic Press.

Brogan et al., "Dynamically Simulated Characters in Virtual Environments", Sep./Oct. 1998, pp. 2-13, vol. 18, Issue 5, IEEE Computer Graphics and Applications.

Fisher et al., "Virtual Environment Display System", ACM Workshop on Interactive 3D Graphics, Oct. 1986, Chapel Hill, NC.

"Virtual High Anxiety", Tech Update, Aug. 1995, pp. 22.

Sheridan et al., "Virtual Reality Check", Technology Review, Oct. 1993, pp. 22-28, vol. 96, No. 7.

Stevens, "Flights into Virtual Reality Treating Real World Disorders", The Washington Post, Mar. 27, 1995, Science Psychology, 2 pages.

"Simulation and Training", 1994, Division Incorporated.

* cited by examiner

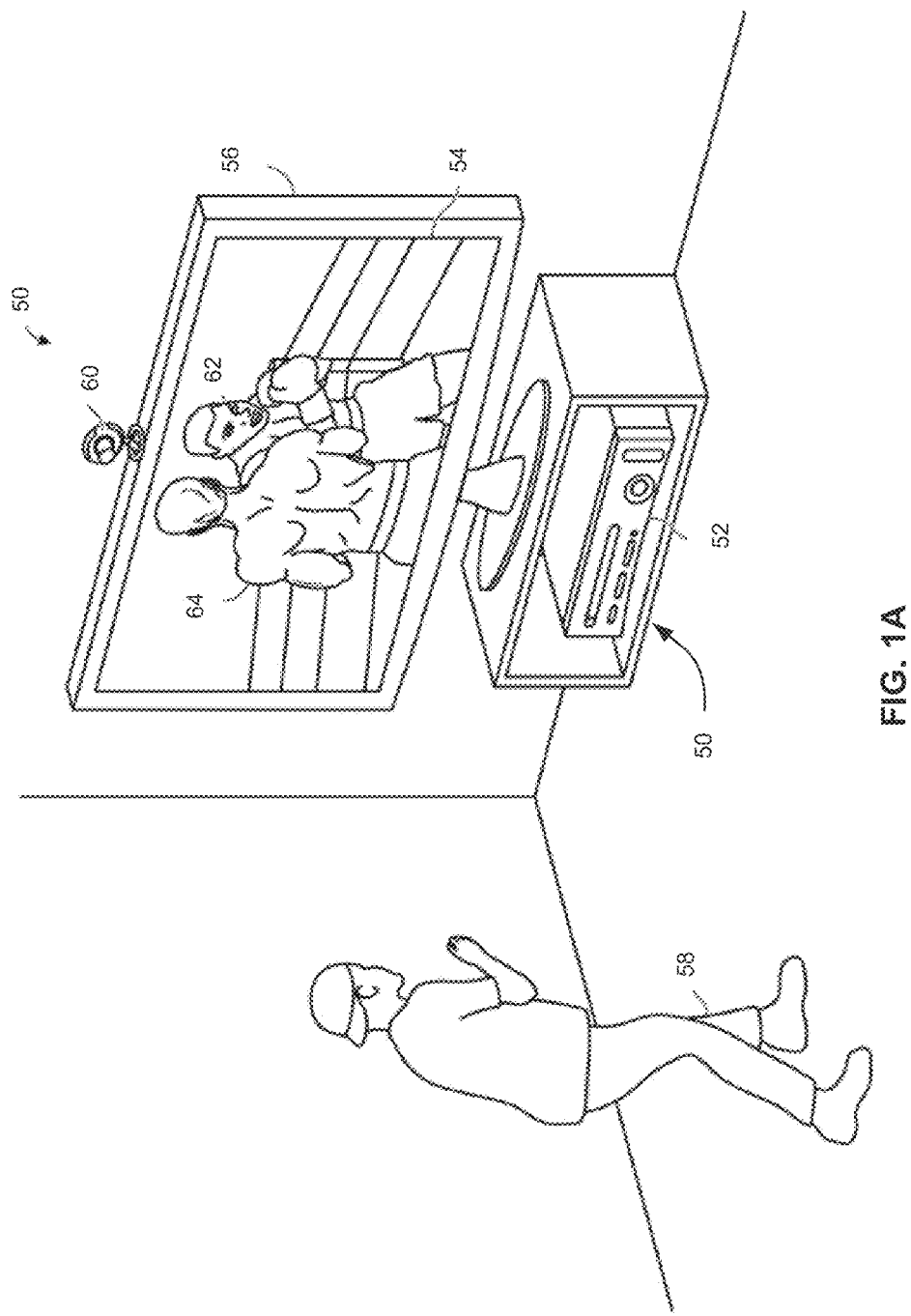

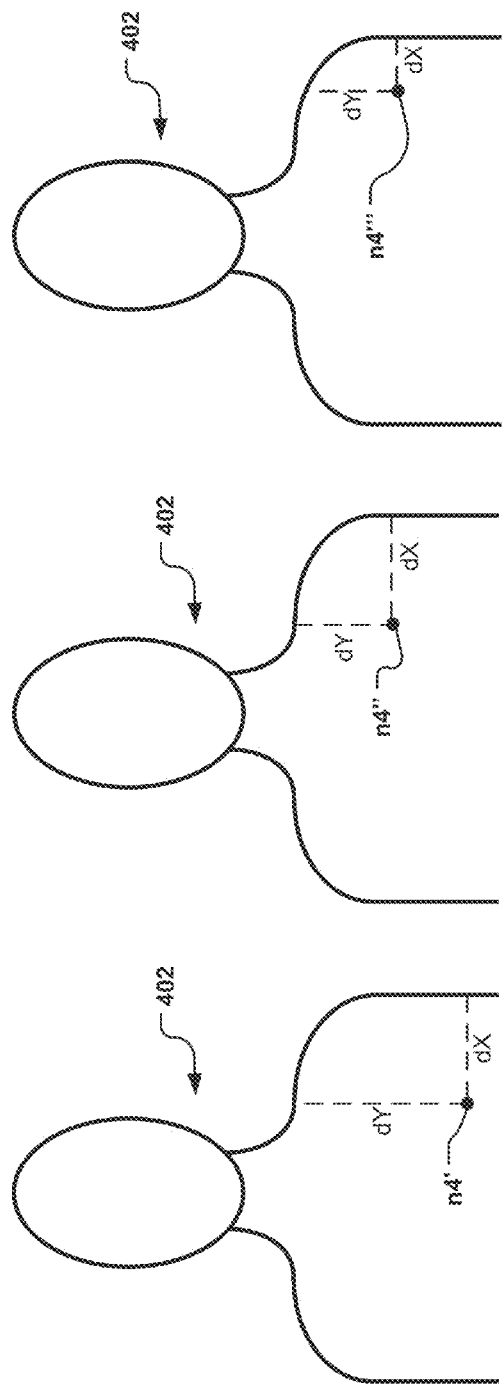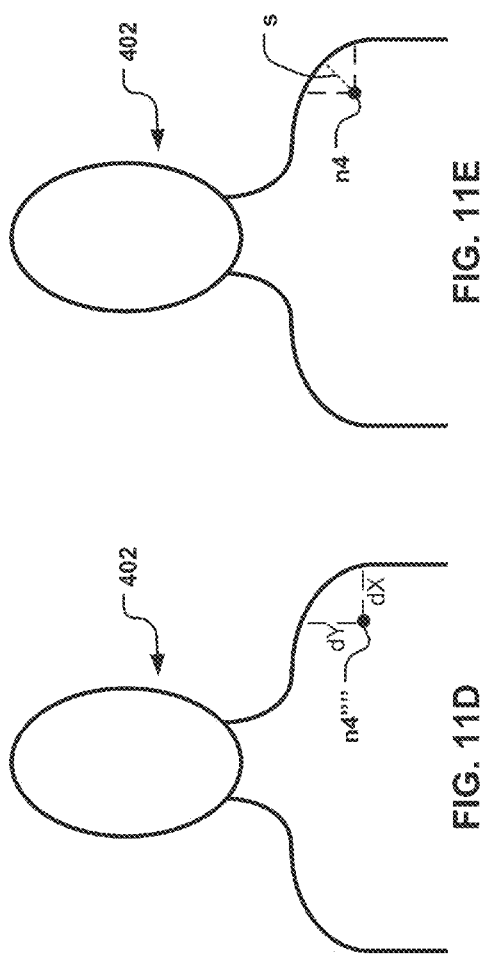

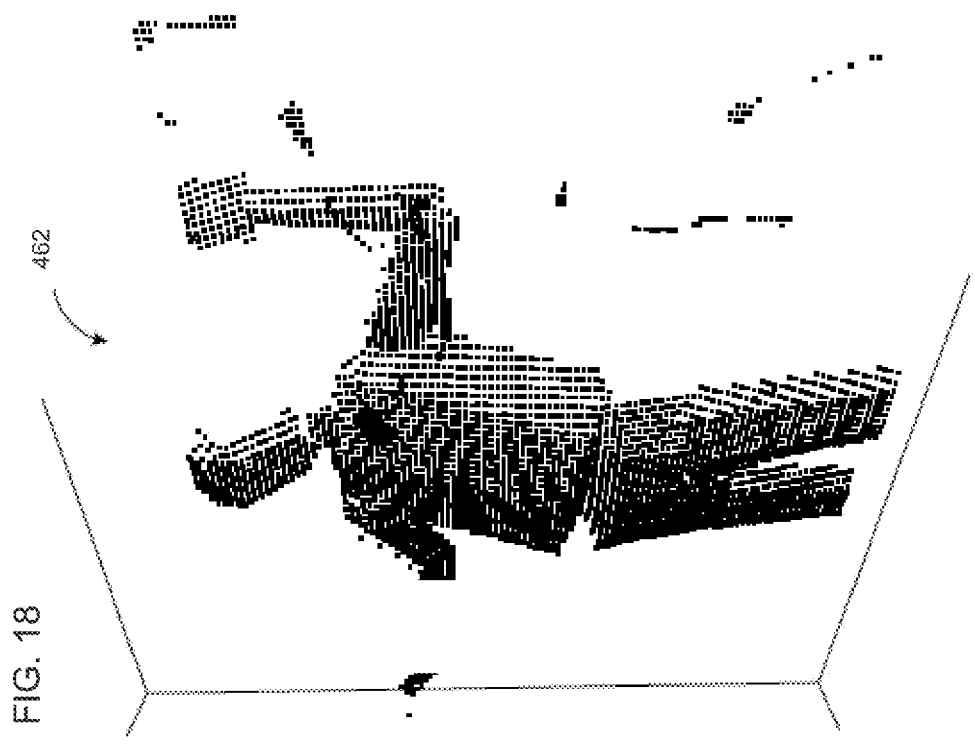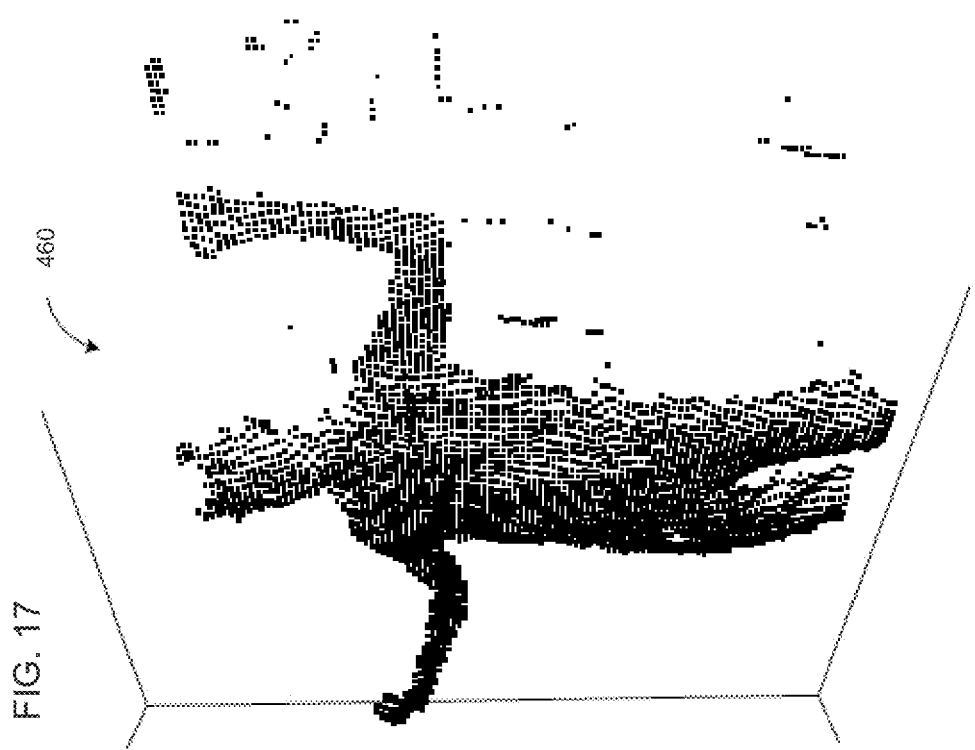

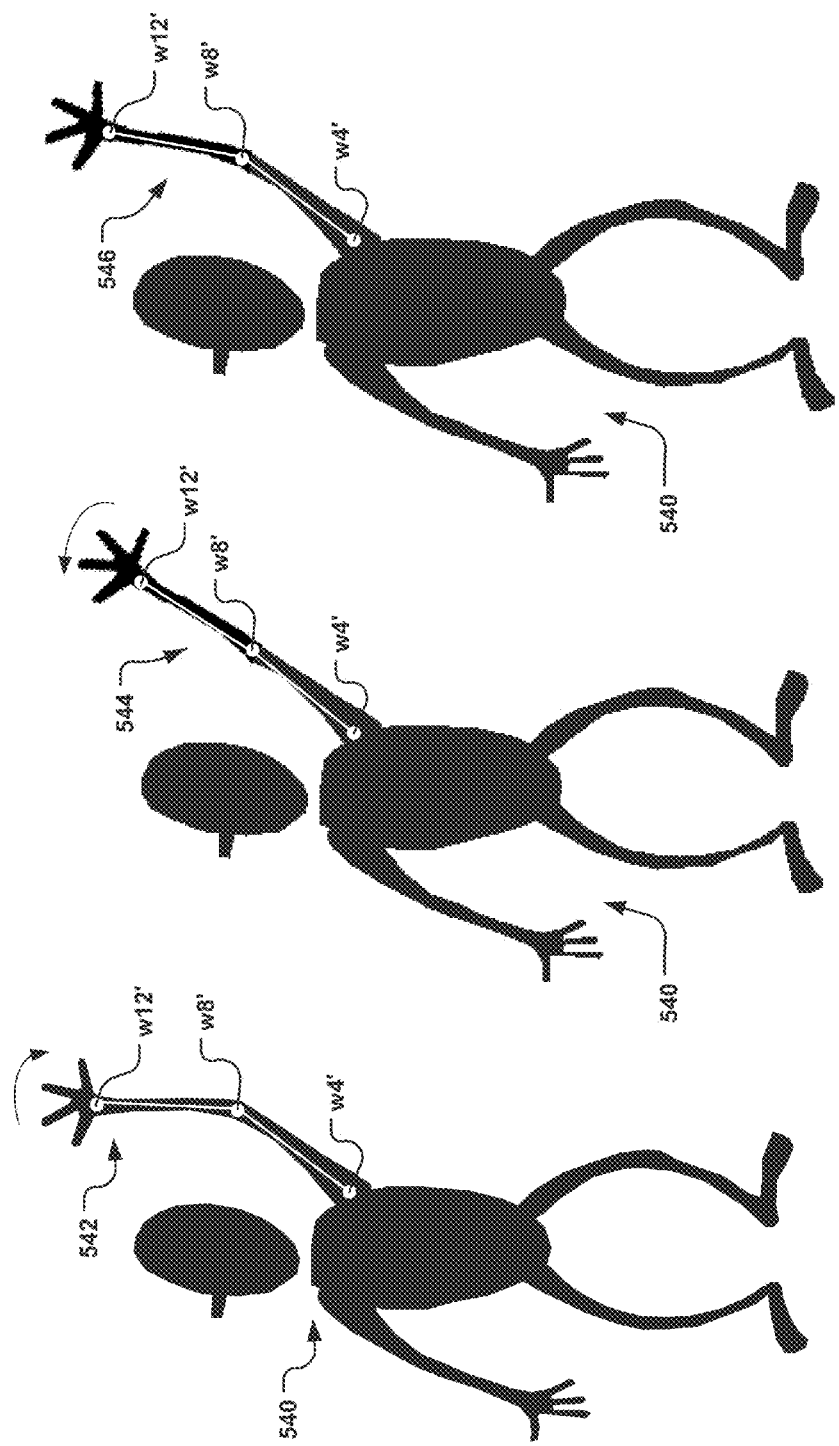

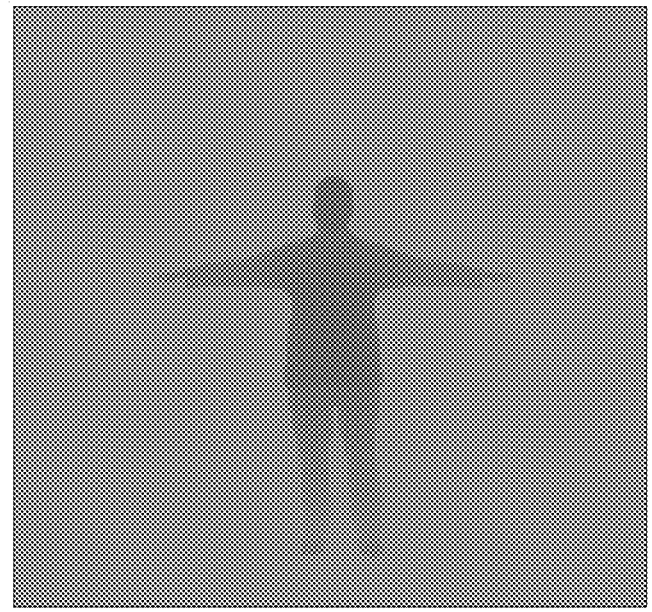
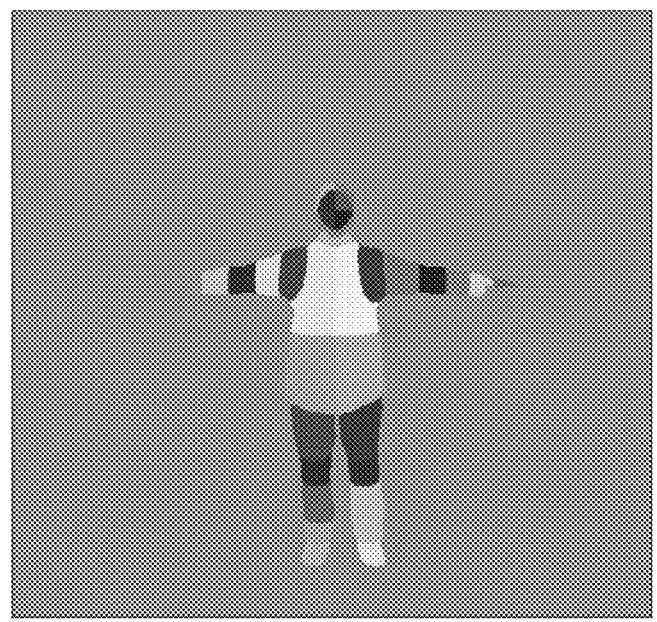
FIG. 29

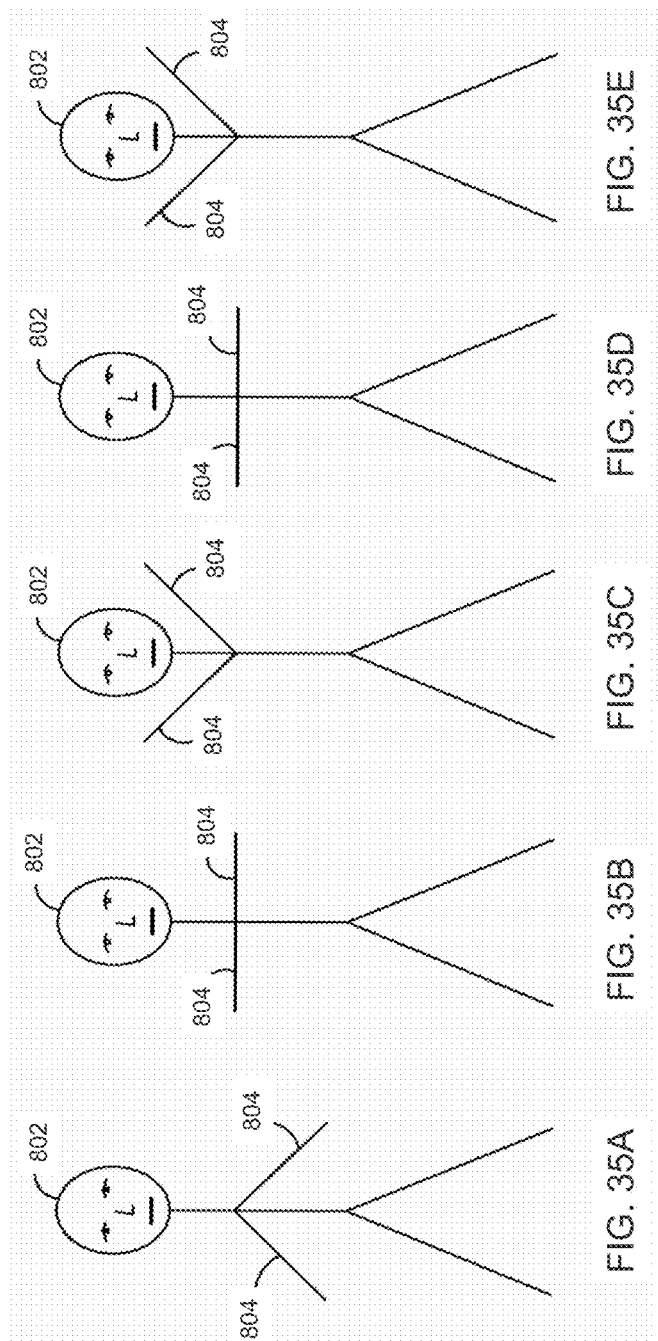

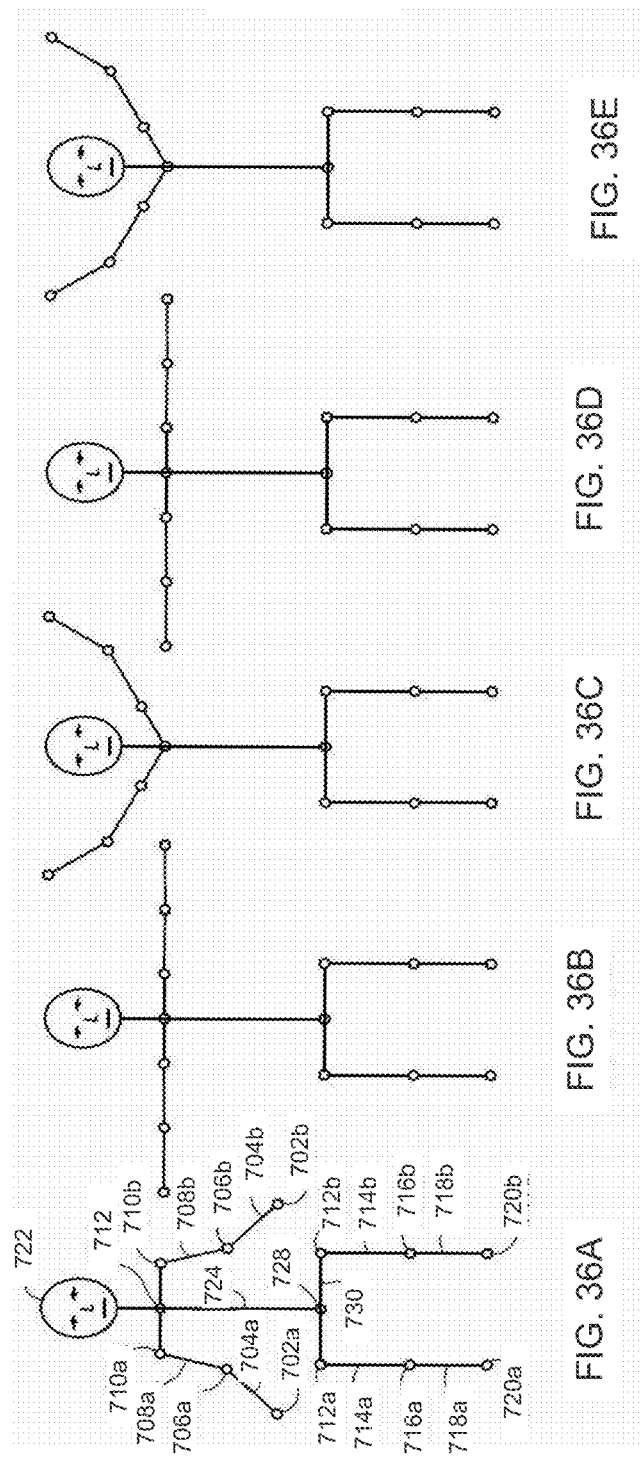

DEVICE FOR IDENTIFYING AND TRACKING MULTIPLE HUMANS OVER TIME

CROSS REFERENCE TO RELATED APPLICATIONS

This application is a continuation of U.S. application Ser. No. 12/475,308, filed on May 29, 2009, titled "Device for Identifying and Tracking Multiple Humans Over Time," the contents of which are incorporated by reference.

BACKGROUND

Many computing applications such as computer games, multimedia applications, or the like use controls to allow users to manipulate game characters or other aspects of an application. Typically such controls are input using, for example, controllers, remotes, keyboards, mice, or the like. Unfortunately, such controls can be difficult to learn, thus creating a barrier between a user and such games and applications. Furthermore, such controls may be different than actual game actions or other application actions for which the controls are used. For example, a game control that causes a game character to swing a baseball bat may not correspond to an actual motion of swinging the baseball bat. Thus, an input mechanism that relies on human gestures or movement is desirable. However, tracking humans and objects in three dimensional space typically requires complex sensor systems and powerful processing elements. The result must be post-processed before being digested by application programs.

SUMMARY

Described herein is a system, which may be embodied as single, compact device, that recognizes human beings in their natural environment, without special sensing devices attached to the subjects, uniquely identifies them and tracks them in three dimensional space. The resulting representation is presented directly to applications as a multi-point skeletal model delivered in real-time. The device efficiently tracks humans and their natural movements by understanding the natural mechanics and capabilities of the human muscular-skeletal system. The device also uniquely recognizes individuals in order to allow multiple people to interact with the system via natural movements of their limbs and body as well as voice commands/responses. Using the device, humans may interact with entertainment and computer systems in a natural manner. Uniquely identified humans are represented in a simple, intuitive human skeletal structure that can be used by a wide-range of applications/experiences.

BRIEF DESCRIPTION OF THE DRAWINGS

FIGS. 1A-1C illustrate an example embodiment of a target recognition, analysis and tracking system with a user playing a game.

FIGS. 11A-11E illustrate an example embodiment of a joint being adjusted for a skeletal model of a human target.

FIG. 17 shows an exemplary observed depth image.

FIG. 18 shows an exemplary synthesized depth image.

FIG. 22 depicts a flow diagram of an example method for capturing motion of a human target.

FIGS. 24A-24C illustrate an example embodiment of an avatar or game character that may be animated based on a model that may be captured at various points in time.

FIG. 29 depicts an example embodiment of a segmented body used in body pose estimation.

FIGS. 35A-35E illustrate an example gesture that a user 502 may make to signal for a "fair catch" in football video game.

FIGS. 36A-36E illustrate the example "fair catch" gesture of FIG. 5 as each frame of image data has been parsed to produce a skeletal map of the user.

DETAILED DESCRIPTION

Figure 1B:
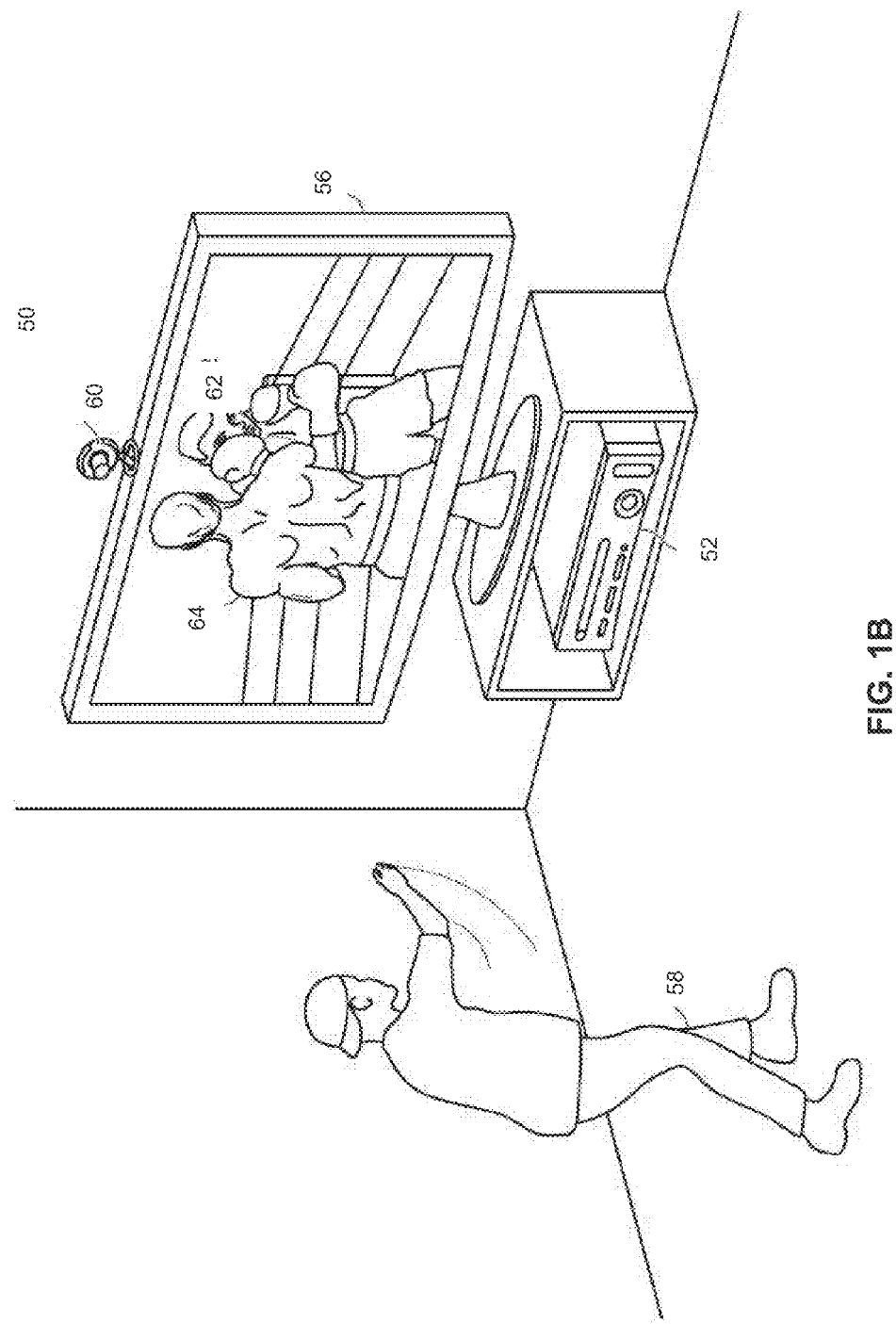

FIGS. 1A and 1B illustrate an example embodiment of a configuration of a target recognition, analysis and tracking system 50 with a user 58 playing a boxing game. In an example embodiment, the target recognition, analysis and tracking system 50 may be used to recognize, analyze, and/or track a human target such as the user 58.

As shown in FIG. 1A, the target recognition, analysis and tracking system 50 may include a computing environment 52. The computing environment 52 may be a computer, a gaming system or console, or the like. According to an example embodiment, the computing environment 52 may include hardware components and/or software components such that the computing environment 52 may be used to execute applications such as gaming applications, non-gaming applications, or the like.

As shown in FIG. 1A, the target recognition, analysis and tracking system 50 may further include a capture device 60. The capture device 60 may be, for example, a camera that may be used to visually monitor one or more users, such as the user 58, such that gestures performed by the one or more users may be captured, analyzed, and tracked to perform one or more controls or actions within an application, as will be described in more detail below.

According to one embodiment, the target recognition, analysis and tracking system 50 may be connected to an audiovisual device 56 such as a television, a monitor, a high-definition television (HDTV), or the like that may provide game or application visuals and/or audio to a user such as the user 58. For example, the computing environment 52 may include a video adapter such as a graphics card and/or an audio adapter such as a sound card that may provide audiovisual signals associated with the game application, non-game application, or the like. The audiovisual device 56 may receive the audiovisual signals from the computing environment 52 and may then output the game or application visuals and/or audio associated with the audiovisual signals to the user 58. According to one embodiment, the audiovisual device 56 may be connected to the computing environment 52 via, for example, an S-Video cable, a coaxial cable, an HDMI cable, a DVI cable, a VGA cable, or the like.

As shown in FIGS. 1A and 1B, the target recognition, analysis and tracking system 50 may be used to recognize, analyze, and/or track one or more human targets such as the user 58. For example, the user 58 may be tracked using the capture device 60 such that the movements of user 58 may be interpreted as controls that may be used to affect the application being executed by computer environment 52. Thus, according to one embodiment, the user 58 may move his or her body to control the application.

As shown in FIGS. 1A and 1B, in an example embodiment, the application executing on the computing environment 52 may be a boxing game that the user 58 may be playing. For example, the computing environment 52 may use the audiovisual device 56 to provide a visual representation of a boxing opponent 62 to the user 58 on display screen 54. The computing environment 52 may also use the audiovisual device 56 to provide a visual representation of a player avatar 64 that the user 58 may control with his or her movements. For example, as shown in FIG. 1B, the user 58 may throw a punch in physical space to cause the player avatar 64 to throw a punch in game space. Thus, according to an example embodiment, the computer environment 52 and the capture device 60 of the target recognition, analysis and tracking system 50 may be used to recognize and analyze the punch of the user 58 in physical space such that the punch may be interpreted as a game control of the player avatar 64 in game space.

In one embodiment the user avatar 64 may be specific to the user 58. The user 58 may play any number of games, where each game may allow for use of a user avatar 64. In one embodiment, the user may create the avatar 64 from a list of menu options. In another embodiment, the avatar 64 may be created by detecting one or more aspects of a user 58, such as, for example, the user's hair color, height, size, color of shirt or any other features of a user 58 and then providing an avatar based on the aspects of the user 58. As another example, the avatar 64 may start as a representation of a user captured by the capture device, which a user may then alter in any fashion, by adding or removing any features, adding fanciful elements and the like.

Movements or poses by the user 58 may also be interpreted as other controls or actions, such as controls to run, walk, accelerate, slow, stop, shift gears or weapons, aim, fire, duck, jump, grab, open, close, strum, play, swing, lean, look, bob, weave, shuffle, block, jab, throw a variety of different power punches or the like. Any other controls or actions that may be required to control an avatar, or otherwise control a computer environment are included. Furthermore, some movements or poses may be interpreted as controls that may correspond to actions other than controlling the user avatar 64. For example, the user may use movements or poses to enter, exit, turn system on or off, pause, volunteer, switch virtual ports, save a game, select a level, profile or menu, view high scores, communicate with a friend, etc. Additionally, a full range of motion of the user 58 may be available, used, and analyzed in any suitable manner to interact with an application. These movements and poses may be any movement or pose available to a user, and may include entering and exiting a capture area. For example, in one embodiment, entering a capture area may be an entry gesture or command in the target recognition, analysis and tracking system.

Figure 1C:
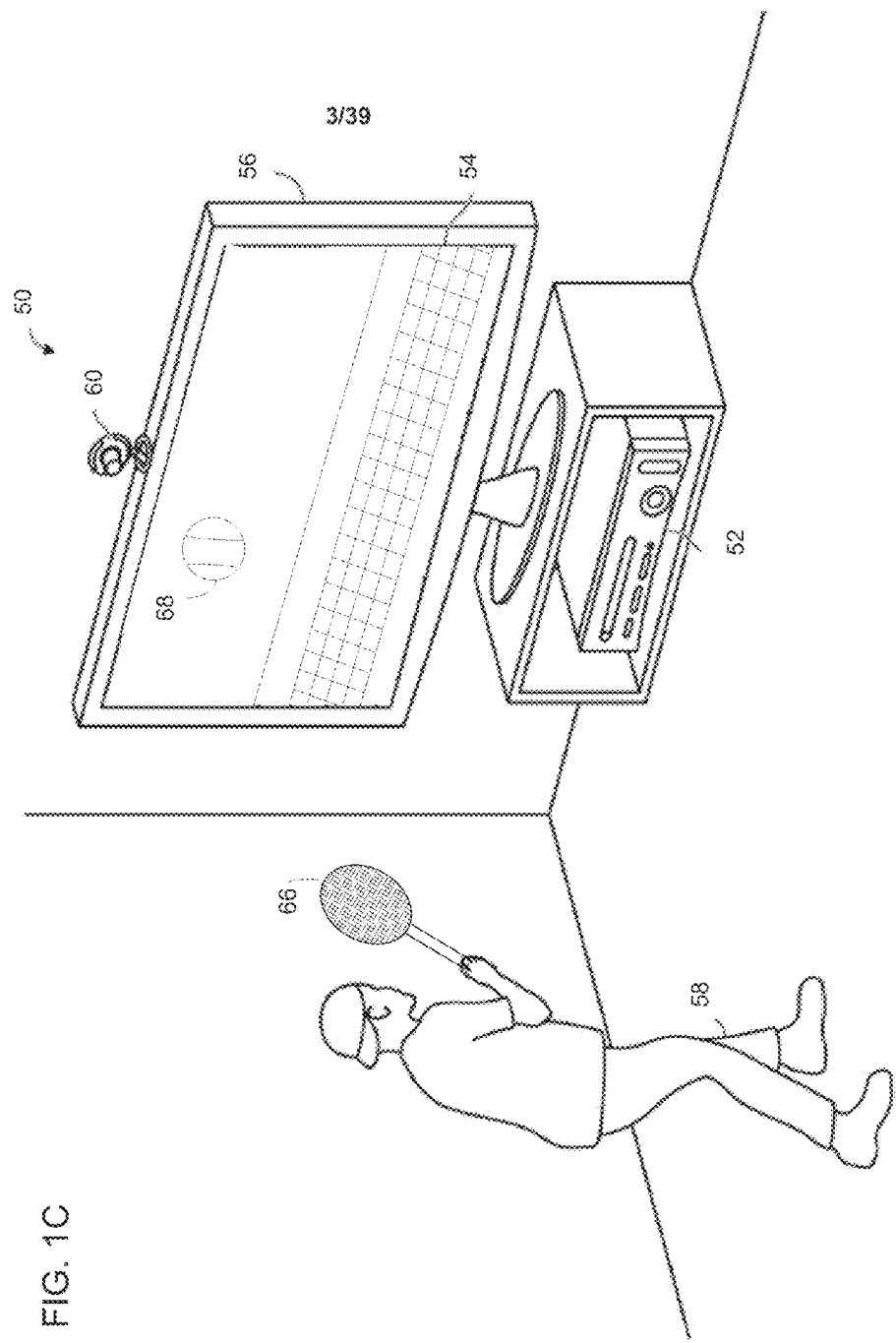

In FIG. 1C, the human target such as the user 58 may have an object. In one embodiment, the user of an electronic game may be holding the object such that the motions of the user and the object may be used to adjust and/or control parameters of the game. For example, the motion of a user holding a racket 66 may be tracked and utilized for controlling an on-screen racket to hit a ball 68 in an electronic sports game. In another example embodiment, the motion of a user holding an object may be tracked and utilized for controlling an on-screen weapon in an electronic combat game. Any other object may also be included, such as one or more gloves, balls, bats, clubs, guitars, microphones, sticks, pets, animals, drums and the like.

In another embodiment, a user avatar 64 may be depicted on an audiovisual display with one or more objects. As a first example, the target recognition, analysis and tracking system may detect an object such as racket 66, which the system may model, track or the like. The avatar may be depicted with the object that the user is holding, and the virtual object may track the motions of the physical object in the capture area. In such an example, if the object moves out of the capture area, one or more aspects of the virtual object held by the avatar may alter. For example, if the racket is moved partially or fully out of the capture area, the virtual object held by the avatar may brighten, dim, increase or decrease in size, change color, disappear or change in any other way to provide feedback to the user about the state of the object in the capture area.

In another embodiment, the avatar 64 may be depicted with an object in order to provide the user feedback about a right, privilege or feature associated with the user. For example, if the is a track and field game, and the avatar is depicted first without; and then with, a relay race baton, the user may know when he or she may need to perform one or more tasks. As another example, if there is a quiz show type game, the avatar may be provided with a buzzer onscreen, which will inform the user of a right to buzz in. As a further example, if there are multiple users and there is a menu selection option, the user provided the right to make a selection on the menu screen may be provided with an object to depict to the user the information that the user has a right to make the menu selection.

According to other example embodiments, the target recognition, analysis and tracking system 50 may further be used to interpret target movements as operating system and/or application controls that are outside the realm of games. For example, virtually any controllable aspect of an operating system and/or application may be controlled by movements of the target such as the user 58.

Figure 2:
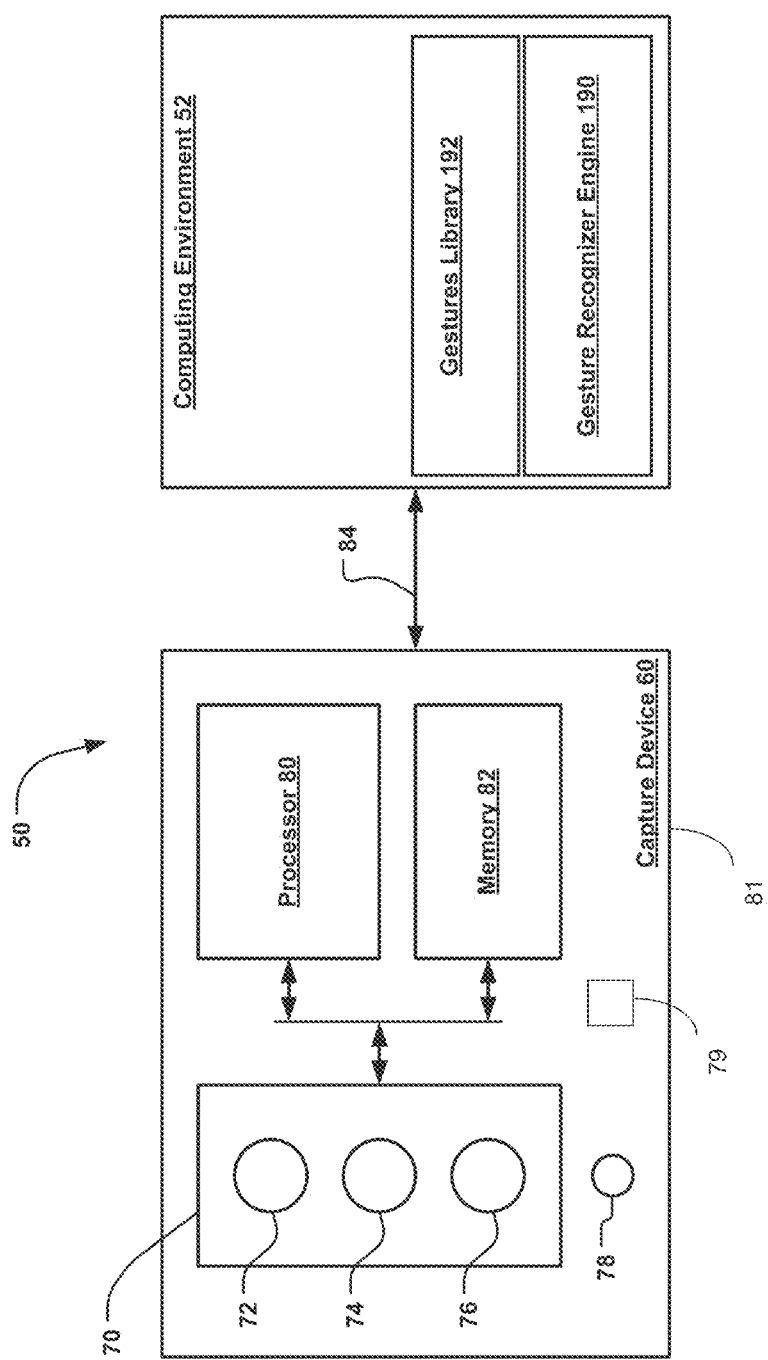
FIG. 2 illustrates an example embodiment of a capture device that may be used in a target recognition, analysis and tracking system.

FIG. 2 illustrates an example embodiment of the capture device 60 that may be used in the target recognition, analysis and tracking system 50 to recognize human and non-human targets in a capture area (without special sensing devices attached to the subjects), uniquely identify them and track them in three dimensional space. According to an example embodiment, the capture device 60 may be configured to capture video with depth information including a depth image that may include depth values via any suitable technique including, for example, time-of-flight, structured light, stereo image, or the like. According to one embodiment, the capture device 60 may organize the calculated depth information into "Z layers," or layers that may be perpendicular to a Z-axis extending from the depth camera along its line of sight.

As shown in FIG. 2, according to an example embodiment, the image camera component 70 may include an IR light component 72, a three-dimensional (3-D) camera 74, and an RGB camera 76 that may be used to capture the depth image of a capture area. For example, in time-of-flight analysis, the IR light component 72 of the capture device 60 may emit an infrared light onto the capture area and may then use sensors to detect the backscattered light from the surface of one or more targets and objects in the capture area using, for example, the 3-D camera 74 and/or the RGB camera 76. In some embodiments, pulsed infrared light may be used such that the time between an outgoing light pulse and a corresponding incoming light pulse may be measured and used to determine a physical distance from the capture device 60 to a particular location on the targets or objects in the capture area. Additionally, in other example embodiments, the phase of the outgoing light wave may be compared to the phase of the incoming light wave to determine a phase shift. The phase shift may then be used to determine a physical distance from the capture device to a particular location on the targets or objects.

According to another example embodiment, time-of-flight analysis may be used to indirectly determine a physical distance from the capture device 60 to a particular location on the targets or objects by analyzing the intensity of the reflected beam of light over time via various techniques including, for example, shuttered light pulse imaging.

In another example embodiment, the capture device 60 may use a structured light to capture depth information. In such an analysis, patterned light (i.e., light displayed as a known pattern such as grid pattern or a stripe pattern) may be projected onto the capture area via, for example, the IR light component 72. Upon striking the surface of one or more targets or objects in the capture area, the pattern may become deformed in response. Such a deformation of the pattern may be captured by, for example, the 3-D camera 74 and/or the RGB camera 76 and may then be analyzed to determine a physical distance from the capture device to a particular location on the targets or objects.

According to another embodiment, the capture device 60 may include two or more physically separated cameras that may view a capture area from different angles, to obtain visual stereo data that may be resolved to generate depth information The capture device 60 may further include a microphone 78. The microphone 78 may include a transducer or sensor that may receive and convert sound into an electrical signal. According to one embodiment, the microphone 78 may be used to reduce feedback between the capture device 60 and the computing environment 52 in the target recognition, analysis and tracking system 50. Additionally, the microphone 78 may be used to receive audio signals that may also be provided by the user to control applications such as game applications, non-game applications, or the like that may be executed by the computing environment 52.

The capture device 60 may further include a feedback component 79. The feedback component 79 may comprise a light such as an LED or a light bulb, a speaker or the like. The feedback device may perform at least one of changing colors, turning on or off, increasing or decreasing in brightness, and flashing at varying speeds. The feedback component 79 may also comprise a speaker which may provide one or more sounds or noises as a feedback of one or more states. The feedback component may also work in combination with computing environment 52 or processor 80 to provide one or more forms of feedback to a user by means of any other element of the capture device, the target recognition, analysis and tracking system or the like.

In an example embodiment, the capture device 60 may further include a processor 80 that may be in operative communication with the image camera component 70. The processor 80 may include a standardized processor, a specialized processor, a microprocessor, or the like that may execute instructions that may include instructions for storing profiles, receiving the depth image, determining whether a suitable target may be included in the depth image, converting the suitable target into a skeletal representation or model of the target, or any other suitable instruction.

The capture device 60 may further include a memory component 82 that may store the instructions that may be executed by the processor 80, images or frames of images captured by the 3-D camera or RGB camera, user profiles or any other suitable information, images, or the like. According to an example embodiment, the memory component 82 may include random access memory (RAM), read only memory (ROM), cache, Flash memory, a hard disk, or any other suitable storage component. As shown in FIG. 2, in one embodiment, the memory component 82 may be a separate component in communication with the image capture component 70 and the processor 80. According to another embodiment, the memory component 82 may be integrated into the processor 80 and/or the image capture component 70. In one embodiment, some or all of the components 70, 72, 74, 76, 78, 79, 80 and 82 of the capture device 60 illustrated in FIG. 2 are housed in a single housing 81. The housing may be plastic, metal, or any other suitable material.

As shown in FIG. 2, the capture device 60 may be in communication with the computing environment 52 via a communication link 84. The communication link 84 may be a wired connection including, for example, a USB connection, a Firewire connection, an Ethernet cable connection, or the like and/or a wireless connection such as a wireless 802.11b, g, a, or n connection. According to one embodiment, the computing environment 52 may provide a clock to the capture device 60 that may be used to determine when to capture, for example, a scene via the communication link 84.

Additionally, the capture device 60 may provide the depth information and images captured by, for example, the 3-D camera 74 and/or the RGB camera 76, and a skeletal model that may be generated by the capture device 60 to the computing environment 52 via the communication link 84. The computing environment 52 may then use the skeletal model, depth information, and captured images to, for example, create a virtual screen, adapt the user interface and control an application such as a game or word processor. For example, as shown, in FIG. 2, the computing environment 52 may include a gestures library 192. The gestures library 192 may include a collection of gesture filters, each comprising information concerning a gesture that may be performed by the skeletal model (as the user moves). A gesture recognizer engine 190 may compare the data captured by the cameras 76, 74 and device 60 in the form of the skeletal model and movements associated with it to the gesture filters in the gesture library 192 to identify when a user (as represented by the skeletal model) has performed one or more gestures. Those gestures may be associated with various controls of an application. Thus, the computing environment 52 may use the gestures library 192 to interpret movements of the skeletal model and to control an application based on the movements.

Figure 3:
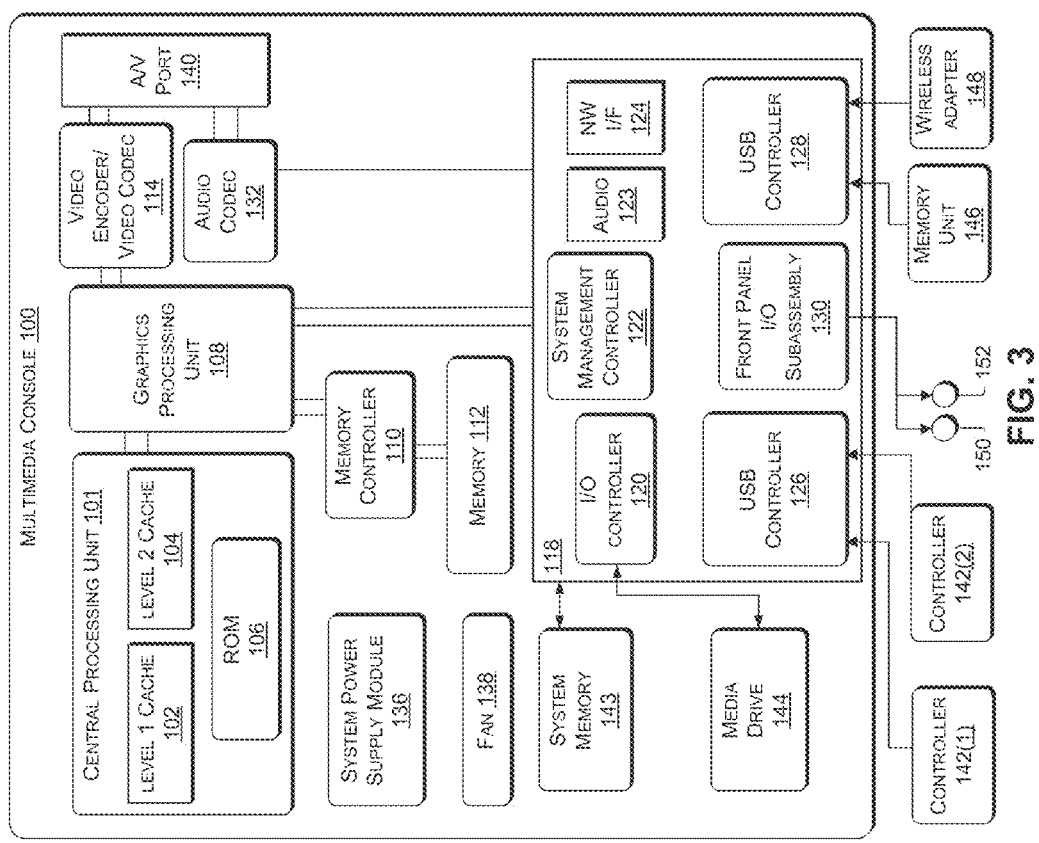
FIG. 3 illustrates an example embodiment of a computing environment that may be used to interpret one or more gestures in a target recognition, analysis and tracking system.

FIG. 3 illustrates an example embodiment of a computing environment 100 that may be used to implement the computing environment 52 of FIGS. 1A-2. The computing environment 100 of FIG. 3 may be a multimedia console 100, such as a gaming console. As shown in FIG. 3, the multimedia console 100 has a central processing unit (CPU) 101 having a level 1 cache 102, a level 2 cache 104, and a flash ROM (Read Only Memory) 106. The level 1 cache 102 and a level 2 cache 104 temporarily store data and hence reduce the number of memory access cycles, thereby improving processing speed and throughput. The CPU 101 may be provided having more than one core, and thus, additional level 1 and level 2 caches 102 and 104. The flash ROM 106 may store executable code that is loaded during an initial phase of a boot process when the multimedia console 100 is powered ON.

A graphics processing unit (GPU) 108 and a video encoder/video codec (coder/decoder) 114 form a video processing pipeline for high speed and high resolution graphics processing. Data is carried from the graphics processing unit 108 to the video encoder/video codec 114 via a bus. The video processing pipeline outputs data to an A/V (audio/video) port 140 for transmission to a television or other display. A memory controller 110 is connected to the GPU 108 to facilitate processor access to various types of memory 112, such as, but not limited to, a RAM (Random Access Memory).

The multimedia console 100 includes an I/O controller 120, a system management controller 122, an audio processing unit 123, a network interface controller 124, a first USB host controller 126, a second USB controller 128 and a front panel I/O subassembly 130 that are preferably implemented on a module 118. The USB controllers 126 and 128 serve as hosts for peripheral controllers 142(1)-142(2), a wireless adapter 148, and an external memory device 146 (e.g., flash memory, external CD/DVD ROM drive, removable media, etc.). The network interface 124 and/or wireless adapter 148 provide access to a network (e.g., the Internet, home network, etc.) and may be any of a wide variety of various wired or wireless adapter components including an Ethernet card, a modem, a Bluetooth module, a cable modem, and the like.

System memory 143 is provided to store application data that is loaded during the boot process. A media drive 144 is provided and may comprise a DVD/CD drive, hard drive, or other removable media drive, etc. The media drive 144 may be internal or external to the multimedia console 100. Application data may be accessed via the media drive 144 for execution, playback, etc. by the multimedia console 100. The media drive 144 is connected to the I/O controller 120 via a bus, such as a Serial ATA bus or other high speed connection (e.g., IEEE 1394).

The system management controller 122 provides a variety of service functions related to assuring availability of the multimedia console 100. The audio processing unit 123 and an audio codec 132 form a corresponding audio processing pipeline with high fidelity and stereo processing. Audio data is carried between the audio processing unit 123 and the audio codec 132 via a communication link. The audio processing pipeline outputs data to the A/V port 140 for reproduction by an external audio player or device having audio capabilities.

The front panel I/O subassembly 130 supports the functionality of the power button 150 and the eject button 152, as well as any LEDs (light emitting diodes) or other indicators exposed on the outer surface of the multimedia console 100. A system power supply module 136 provides power to the components of the multimedia console 100. A fan 138 cools the circuitry within the multimedia console 100.

The CPU 101, GPU 108, memory controller 110, and various other components within the multimedia console 100 are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console 100 is powered ON, application data may be loaded from the system memory 143 into memory 112 and/or caches 102, 104 and executed on the CPU 101. The application may present a graphical user interface that provides a consistent user experience when navigating to different media types available on the multimedia console 100. In operation, applications and/or other media contained within the media drive 144 may be launched or played from the media drive 144 to provide additional functionalities to the multimedia console 100.

The multimedia console 100 may be operated as a standalone system by simply connecting the system to a television or other display. In this standalone mode, the multimedia console 100 allows one or more users to interact with the system, watch movies, or listen to music. However, with the integration of broadband connectivity made available through the network interface 124 or the wireless adapter 148, the multimedia console 100 may further be operated as a participant in a larger network community.

When the multimedia console 100 is powered ON, a set amount of hardware resources are reserved for system use by the multimedia console operating system. These resources may include a reservation of memory (e.g., 16 MB), CPU and GPU cycles (e.g., 5%), networking bandwidth (e.g., 8 kbs), etc. Because these resources are reserved at system boot time, the reserved resources do not exist from the application's view.

In particular, the memory reservation preferably is large enough to contain the launch kernel, concurrent system applications and drivers. The CPU reservation is preferably constant such that if the reserved CPU usage is not used by the system applications, an idle thread will consume any unused cycles.

With regard to the GPU reservation, lightweight messages generated by the system applications (e.g., popups) are displayed by using a GPU interrupt to schedule code to render popup into an overlay. The amount of memory required for an overlay depends on the overlay area size and the overlay preferably scales with screen resolution. Where a full user interface is used by the concurrent system application, it is preferable to use a resolution independent of application resolution. A scaler may be used to set this resolution such that the need to change frequency and cause a TV resynch is eliminated.

After the multimedia console 100 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 101 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Input devices (e.g., controllers 142(1) and 142(2)) are shared by gaming applications and system applications. The input devices are not reserved resources, but are to be switched between system applications and the gaming application such that each will have a focus of the device. The application manager preferably controls the switching of input stream, without knowledge the gaming application's knowledge and a driver maintains state information regarding focus switches. The cameras 74 and 76 and capture device 60 may define additional input devices for the console 100.

Figure 4:
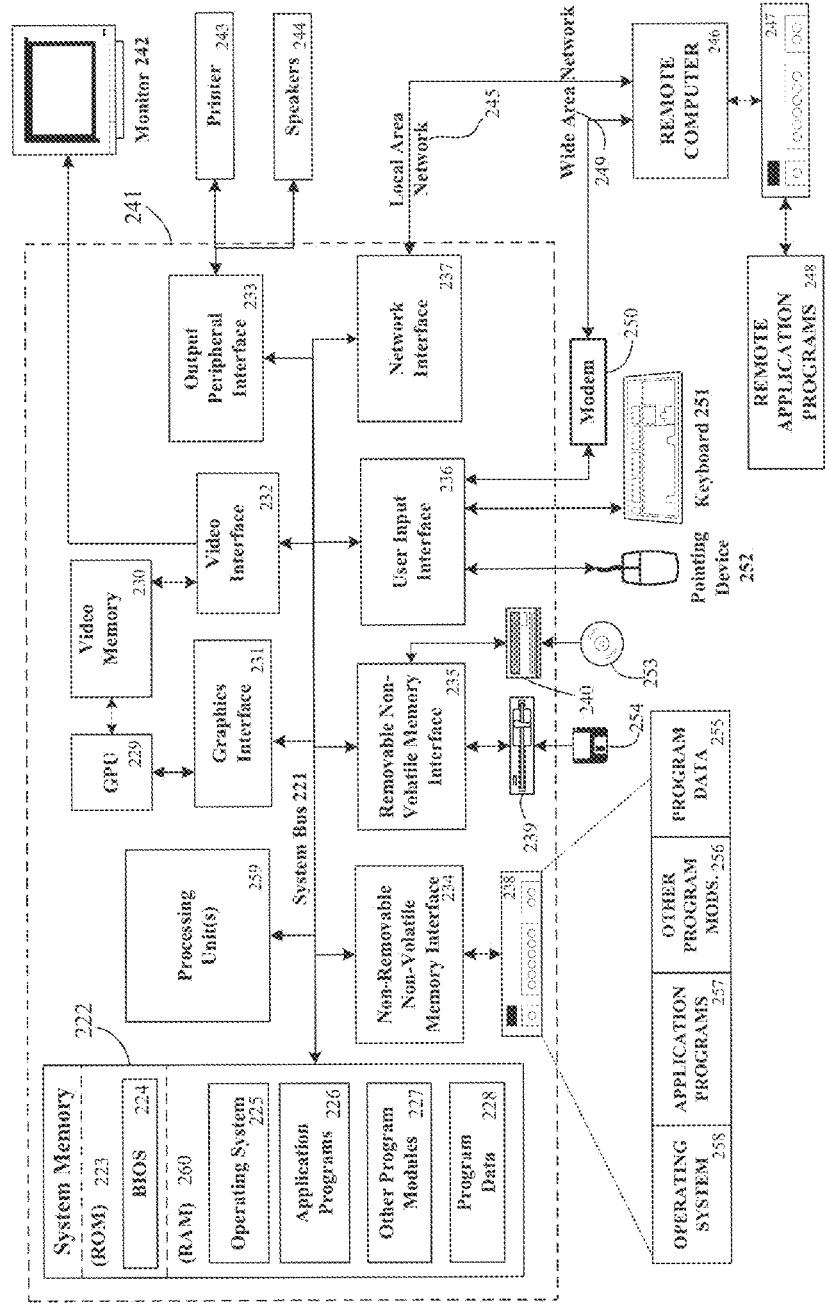
FIG. 4 illustrates another example embodiment of a computing environment that may be used to interpret one or more gestures in a target recognition, analysis and tracking system.

FIG. 4 illustrates another example embodiment of a computing environment 220 that may be used to implement the computing environment 52 shown in FIGS. 1A-2. The computing system environment 220 is only one example of a suitable computing environment and is not intended to suggest any limitation as to the scope of use or functionality of the presently disclosed subject matter. Neither should the computing environment 220 be interpreted as having any dependency or requirement relating to any one or combination of components illustrated in the exemplary operating environment 220. In some embodiments the various depicted computing elements may include circuitry configured to instantiate specific aspects of the present disclosure. For example, the term circuitry used in the disclosure can include specialized hardware components configured to perform function(s) by firmware or switches. In other examples embodiments the term circuitry can include a general-purpose processing unit, memory, etc., configured by software instructions that embody logic operable to perform function(s). In example embodiments where circuitry includes a combination of hardware and software, an implementer may write source code embodying logic and the source code can be compiled into machine readable code that can be processed by the general purpose processing unit. Since one skilled in the art can appreciate that the state of the art has evolved to a point where there is little difference between hardware, software, or a combination of hardware/software, the selection of hardware versus software to effectuate specific functions is a design choice left to an implementer. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

In FIG. 4, the computing environment 220 comprises a computer 241, which typically includes a variety of computer readable media. Computer readable media can be any available media that can be accessed by computer 241 and includes both volatile and nonvolatile media, removable and non-removable media. The system memory 222 includes computer storage media in the form of volatile and/or nonvolatile memory such as read only memory (ROM) 223 and random access memory (RAM) 260. A basic input/output system 224 (BIOS), containing the basic routines that help to transfer information between elements within computer 241, such as during start-up, is typically stored in ROM 223. RAM 260 typically contains data and/or program modules that are immediately accessible to and/or presently being operated on by processing unit 259. By way of example, and not limitation, FIG. 4 illustrates operating system 225, application programs 226, other program modules 227, and program data 228.

The computer 241 may also include other removable/non-removable, volatile/nonvolatile computer storage media. By way of example only, FIG. 4 illustrates a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through a non-removable memory interface such as interface 234, and magnetic disk drive 239 and optical disk drive 240 are typically connected to the system bus 221 by a removable memory interface, such as interface 235.

The drives and their associated computer storage media discussed above and illustrated in FIG. 4, provide storage of computer readable instructions, data structures, program modules and other data for the computer 241. In FIG. 4, for example, hard disk drive 238 is illustrated as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to illustrate that, at a minimum, they are different copies. A user may enter commands and information into the computer 241 through input devices such as a keyboard 251 and pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus, but may be connected by other interface and bus structures, such as a parallel port, game port or a universal serial bus (USB). The cameras 74, 76 and capture device 60 may define additional input devices for the computer 241. A monitor 242 or other type of display device is also connected to the system bus 221 via an interface, such as a video interface 232. In addition to the monitor, computers may also include other peripheral output devices such as speakers 244 and printer 243, which may be connected through a output peripheral interface 233.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been illustrated in FIG. 4. The logical connections depicted in FIG. 2 include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device. By way of example, and not limitation, FIG. 4 illustrates remote application programs 248 as residing on memory device 247. It will be appreciated that the network connections shown are exemplary and other means of establishing a communications link between the computers may be used.

Body Scan

As described herein, a body scan is a process by which the capture device 60 may capture depth information of a capture area that may include a human target. For example, a depth image of the capture area may be received or observed. The depth image may then be analyzed to determine whether the depth image includes a human target and/or non-human targets. Portions of the depth image may be flood filled and compared to a pattern to determine whether the target may be a human target. If one or more of the targets in the depth image includes a human target, the human target may be scanned. A model of the human target may then be generated based on the scan.

Figure 5:
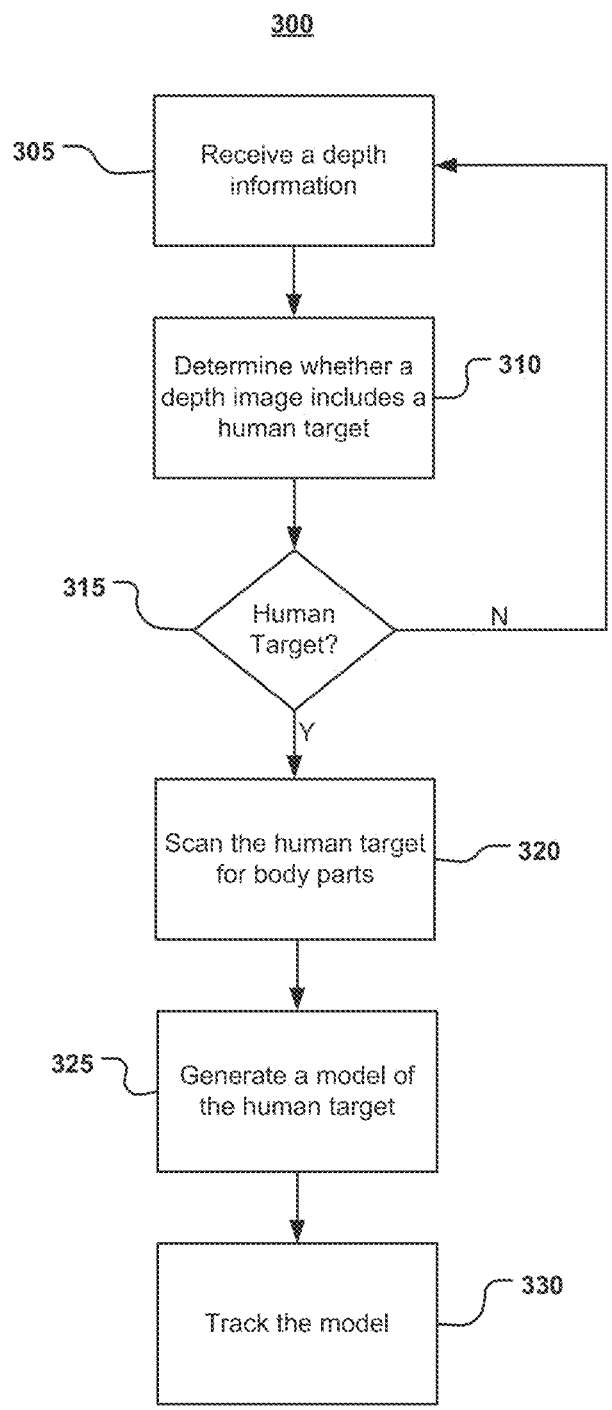
FIG. 5 depicts a flow diagram of an example method for scanning a target that may be visually tracked.

FIG. 5 depicts a flow diagram of an example method 300 for scanning a target that may be visually tracked. The example method 300 may be implemented using, for example, the capture device 60 and/or the computing environment 52 of the target recognition, analysis and tracking system 50 described with respect to FIGS. 1A-4. According to an example embodiment, the target may be a human target, a human target with an object, two or more human targets, or the like that may be scanned to generate a model such as a skeletal model, a mesh human model, or any other suitable representation thereof. The model may then be used to interact with an application that may be executed by the computing environment 52 described above with respect to FIGS. 1A-1B. According to an example embodiment, the target may be scanned to generate the model when an application may be started or launched on, for example, the computing environment 52 and/or periodically during execution of the application on, for example, the computing environment 52.

For example, as described above, the target may include the user 58 described above with respect to FIGS. 1A-1C. The target may be scanned to generate a skeletal model of, for example, the user 58 that may be tracked such that physical movements or motions of the user 58 may act as a real-time user interface that adjusts and/or controls parameters of an application such as an electronic game. For example, the tracked motions of a user may be used to move an on-screen character or avatar in an electronic role-playing game; to control an on-screen vehicle in an electronic racing game; to control the building or organization of objects in a virtual environment; or to perform any other suitable controls of an application.

According to one embodiment, at 305, depth information may be received. For example, the target recognition, analysis and tracking system may include a capture device such as the capture device 60 described above with respect to FIGS. 1A-2. The capture device may capture or observe a capture area that may include one or more targets. In an example embodiment, the capture device may be a depth camera configured to obtain depth information associated with the one or more targets in the capture area using any suitable technique such as time-of-flight analysis, structured light analysis, stereo vision analysis, or the like.

According to an example embodiment, the depth information may include a depth image. The depth image may be a plurality of observed pixels where each observed pixel has an observed depth value. For example, the depth image may include a two-dimensional (2-D) pixel area of the captured scene where each pixel in the 2-D pixel area may represent a depth value such as a length or distance in, for example, centimeters, millimeters, or the like of an object in the captured scene from the capture device.

Figure 6:
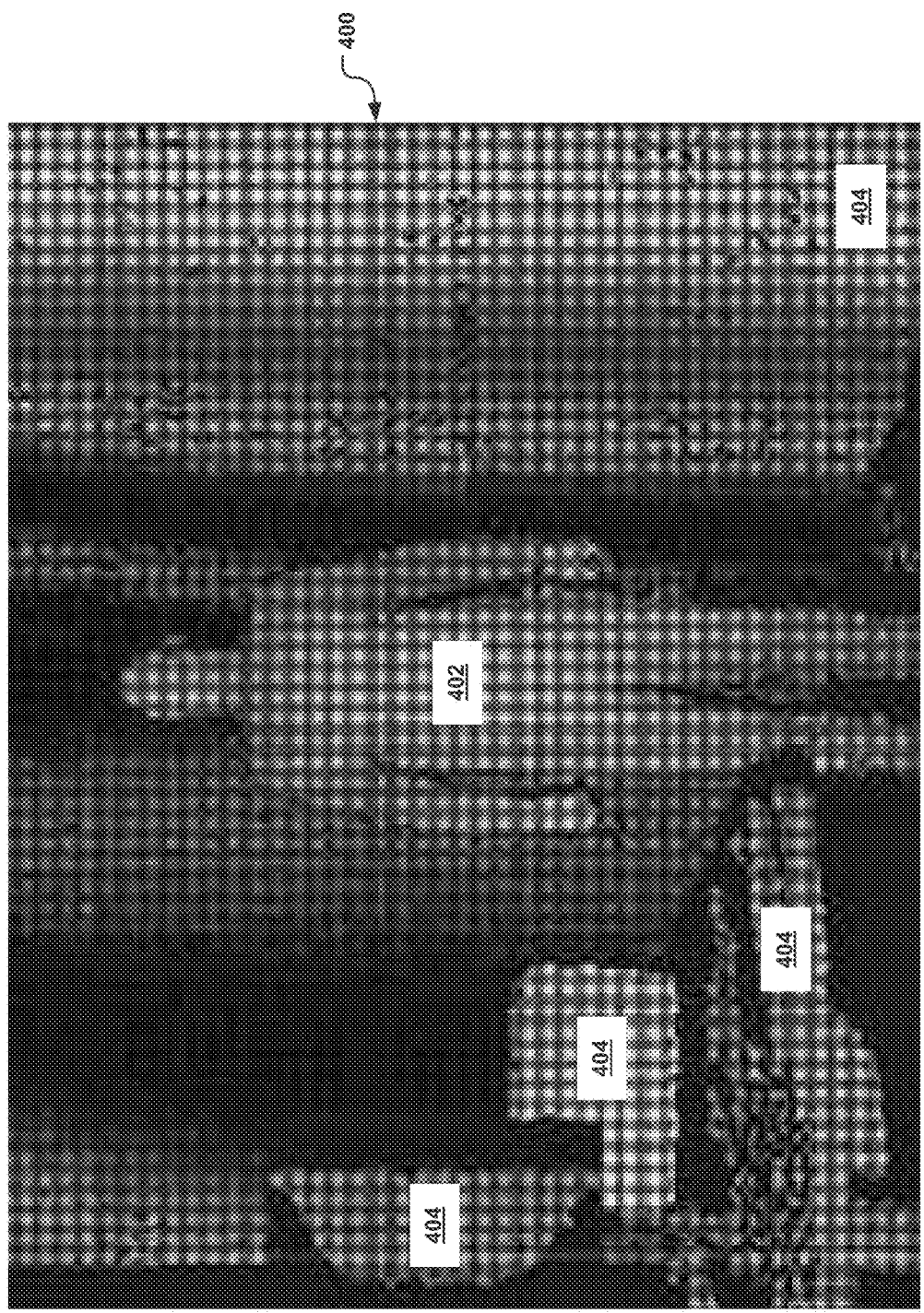
FIG. 6 illustrates an example embodiment of a depth image.

FIG. 6 illustrates an example embodiment of a depth image 400 that may be received at 305. According to an example embodiment, the depth image 400 may be an image or frame of a capture area captured by, for example, the 3-D camera 74 and/or the RGB camera 76 of the capture device 60 described above with respect to FIG. 2. As shown in FIG. 6, the depth image 400 may include a human target 402 and one or more non-human targets 404 such as a wall, a table, a monitor, or the like in the captured scene. As described above, the depth image 400 may include a plurality of observed pixels where each observed pixel has an observed depth value associated therewith. For example, the depth image 400 may include a two-dimensional (2-D) pixel area of the captured scene where each pixel in the 2-D pixel area may represent a depth value such as a length or distance in, for example, centimeters, millimeters, or the like of a target or object in the captured scene from the capture device. In one example embodiment, the depth image 400 may be colonized such that different colors of the pixels of the depth image correspond to different distances of the human target 402 and non-human targets 404 from the capture device. For example, according to one embodiment, the pixels associated with a target closest to the capture device may be colored with shades of red and/or orange in the depth image whereas the pixels associated with a target further away may be colored with shades of green and/or blue in the depth image.

Referring back to FIG. 5, in one embodiment, upon receiving the depth image with, for example, the depth information at 305, the depth image may be downsampled to a lower processing resolution such that the depth image may be more easily used and/or more quickly processed with less computing overhead. Additionally, one or more high-variance and/or noisy depth values may be removed and/or smoothed from the depth image; portions of missing and/or removed depth information may be filled in and/or reconstructed; and/or any other suitable processing may be performed on the received depth information may such that the depth information may used to generate a model such as a skeletal model, which will be described in more detail below.

At 310, the target recognition, analysis and tracking system may determine whether the depth image includes a human target. For example, at 310, each target or object in the depth image may be flood filled and compared to a pattern to determine whether the depth image includes a human target.

Figure 7:
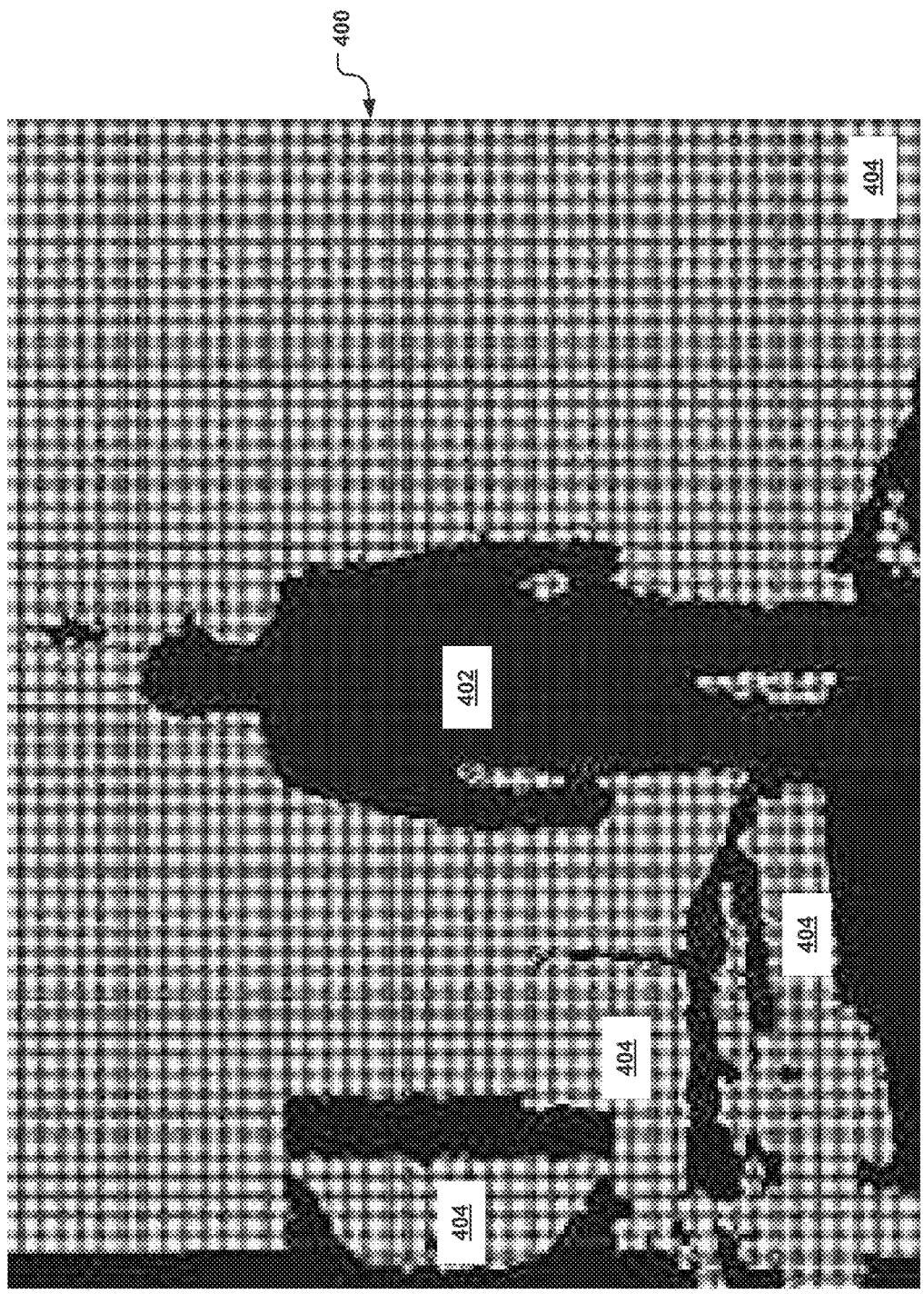
FIG. 7 illustrates an example embodiment of a depth image with a flood filled human target.

FIG. 7 illustrates an example embodiment of the depth image 400 with the human target 402 flood filled. According to one embodiment, upon receiving the depth image 400, each target in the depth image 400 may be flood filled. For example, in one embodiment, the edges of each target such as the human target 402 and the non-human targets 404 in the captured scene of the depth image 400 may be determined. As described above, the depth image 400 may include a two-dimensional (2-D) pixel area of the captured scene where each pixel in the 2-D pixel area may represent a depth value such as a length or distance in, for example, centimeters, millimeters, or the like of an object in the captured scene from the camera. According to an example embodiment, the edges may be determined by comparing various depth values associated with, for example, adjacent or nearby pixels of the depth image 400. If the various depth values being compared may be greater than a predetermined edge tolerance, the pixels may define an edge. In one embodiment, the predetermined edge tolerance may be, for example, a 100 millimeters. If a pixel representing a depth value of 1000 millimeters may be compared with an adjacent pixel representing a depth value of 1200 millimeters, the pixels may define an edge of a target, because the difference in the length or distance between the pixels is greater than the predetermined edge tolerance of 100 mm.

Additionally, as described above, the capture device may organize the calculated depth information including the depth image into "Z layers," or layers that may be perpendicular to a Z axis extending from the camera along its line of sight to the viewer. The likely Z values of the Z layers may be flood filled based on the determined edges. For example, the pixels associated with the determined edges and the pixels of the area within the determined edges may be associated with each other to define a target or an object in the capture area that may be compared with a pattern, which will be described in more detail below According to another embodiment, upon receiving the depth image 400, predetermined points or areas on the depth image 400 may be flood filled to determine whether the depth image 400 includes the human target 402. For example, various depth values of pixels in a selected area or point of the depth image 400 may be compared to determine edges that may define targets or objects as described above. The likely Z values of the Z layers may be flood filled based on the determined edges. For example, the pixels associated with the determined edges and the pixels of the area within the edges may be associated with each other to define a target or an object in the capture area that may be compared with a pattern, which will be described in more detail below.

Figure 8:
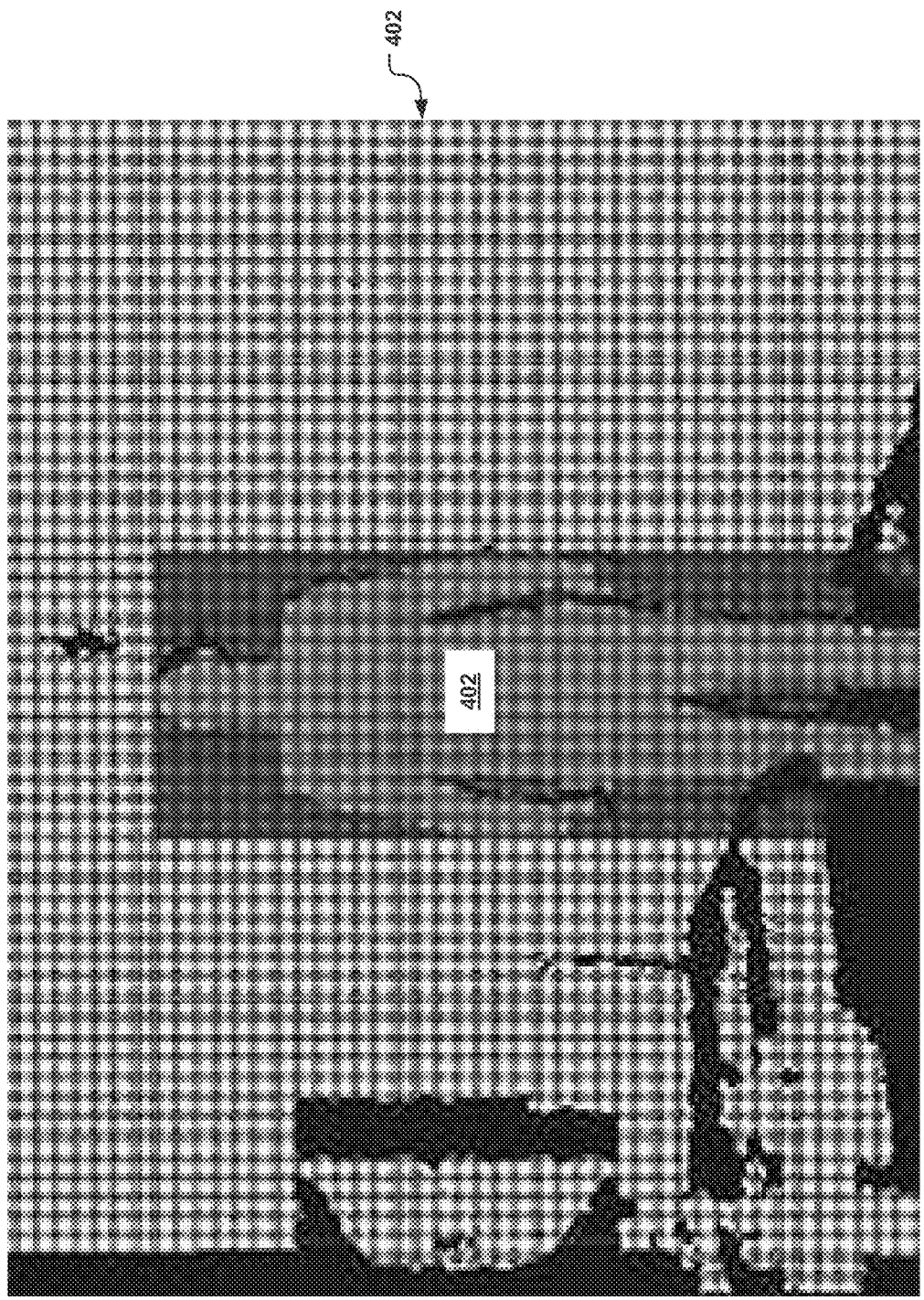
FIG. 8 illustrates an example embodiment of a depth image with a flood filled human target matched against a pattern.

In an example embodiment, the predetermined points or areas may be evenly distributed across the depth image. For example, the predetermined points or areas may include a point or an area in the center of the depth image, two points or areas in between the left edge and the center of the depth image, two points or areas between the right edge and the center of the depth FIG. 8 illustrates an example embodiment of a depth image such as the depth image 400 with the flood filled human target 402 matched against a pattern. According to an example embodiment, each of the flood-filled targets such as the human target 402 and the non-human targets 404 may be matched against a pattern to determine whether and/or which of the targets in the capture area include a human. The pattern may include, for example, a machine representation of a predetermined body model associated with a human in various positions or poses such as a typical standing pose with arms to each side.

According to an example embodiment, the pattern may include one or more data structures that may have a set of variables that collectively define a typical body of a human such that the information associated with the pixels of, for example, the human target 402 and the non-human targets 404 may be compared with the variables to determine whether and which of the targets may be a human. In one embodiment, each of the variables in the set may be weighted based on a body part. For example, various body parts such as a head and/or shoulders in the pattern may have weight value associated therewith that may be greater than other body parts such as a leg. According to one embodiment, the weight values may be used when comparing a target such as the human target 402 and the non-human targets 404 with the variables to determine whether and which of the targets may be human. For example, matches between the variables and the target that have larger weight values may yield a greater likelihood of the target being human than matches with smaller weight values.

Additionally, in an example embodiment, a confidence value may be calculated that indicates, for example, the accuracy to which each of the flood filled targets in the depth image 400 corresponds to the pattern. The confidence value may include a probability that each of the flood-filled targets may be a human. According to one embodiment, the confidence value may be used to further determine whether the flood-filled target may be a human. For example, the confidence value may compared to a threshold value such that if the confidence value exceeds the threshold, the flood filled target associated therewith may be determined to be a human target.

Referring back to FIG. 5, at 315, if the depth image does not include a human target, a new depth image of a capture area may be received at 305 such that the target recognition, analysis and tracking system may determine whether the new depth image may include a human target at 310.

At 315, if the depth image includes a human target, the human target may be scanned for one or more body parts at 320. According to one embodiment, the human target may be scanned to provide measurements such as length, width, or the like associated with one or more body parts of a user such as the user 58 described above with respect to FIGS. 1A and 1B such that an accurate model of the user may be generated based on such measurements, which will be described in more detail below.

In an example embodiment, the human target may be isolated and a bitmask of the human target may be created to scan for one or more body parts. The bitmask may be created by, for example, flood filling the human target such that the human target may be separated from other targets or objects in the capture area elements. The bitmask may then be analyzed for one or more body parts to generate a model such as a skeletal model, a mesh human model, or the like of the human target.

Figure 9:
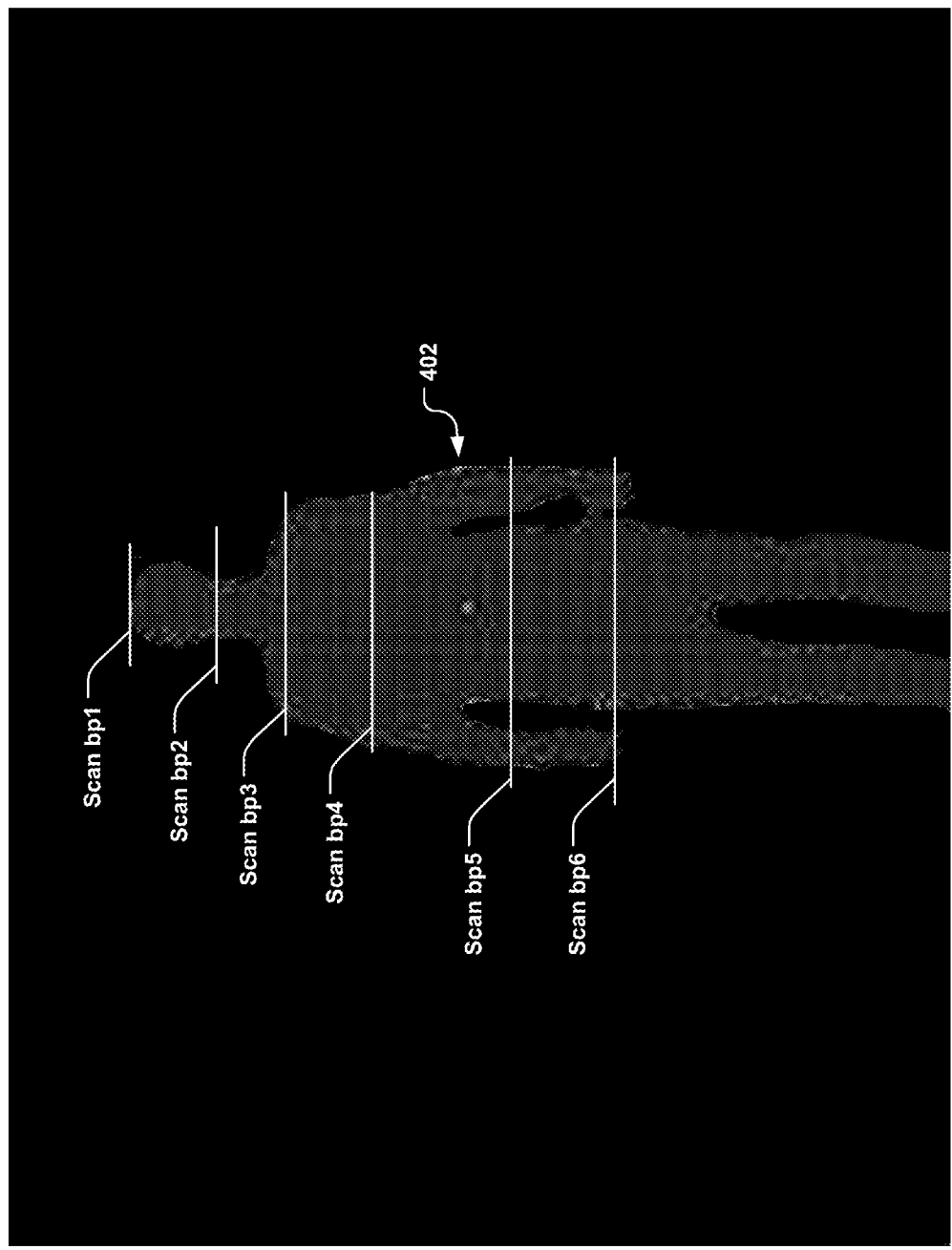
FIG. 9 illustrates an example embodiment of a depth image a human target being scanned to generate a model.

FIG. 9 illustrates an example embodiment of a depth image 400 that includes a human target 402 being scanned to generate a model. For example, after a valid human target such as the human target 402 may be found within the depth image 400, the background or the area of the depth image not matching the human target may be removed. A bitmask may then be generated for the human target 402 that may include values of the human target along, for example, an X, Y, and Z axis. According to an example embodiment, the bitmask of the human target 402 may be scanned for various body parts, starting with, for example, the head to generate a skeletal model of the human target 402.

As shown in FIG. 9, the information such as the bits, pixels, or the like associated with the matched human target 402 may be scanned to determine various locations such as scan bp1-scan bp6 that are associated with various parts of the body of the human target 402. For example, after removing the background or area surrounding the human target 402 in the depth image, the depth image 400 may include the human target 402 isolated. The bitmask that may include X, Y, and Z values may then be generated for the isolated human target 402. The bitmask of the human target 402 may be scanned to determine various body parts. For example, a top of the bitmask of the human target 402 may initially be determined. As shown in FIG. 9, the top of the bitmask of the human target 402 may be associated with a location of the top of the head as indicated by scan bp1. After determining the top of the head, the bitmask may be scanned downward to then determine a location of a neck of the human target 402, a location of the shoulders of the human target 402, or the like.

According to an example embodiment, to determine the location of the neck, shoulders, or the like of the human target 402, a width of the bitmask, for example, at a position being scanned, may be compared to a threshold value of a typical width associated with, for example, a neck, shoulders, or the like. In an alternative embodiment, the distance from a previous position scanned and associated with a body part in a bitmask may be used to determine the location of the neck, shoulders or the like.

In one embodiment, to determine the location of the shoulders, the width of the bitmask at the position indicated by scan bp3 in FIG. 9 may be compared to a threshold shoulder value. For example, a distance between the two outer most Y values at the X value of the bitmask at the position indicated by scan bp3 in FIG. 9 may be compared to the threshold shoulder value of a typical distance between, for example, shoulders of a human. Thus, according to an example embodiment, the threshold shoulder value may be a typical width or range of widths associated with shoulders of a body model of a human.

In another embodiment, to determine the location of the shoulders, the bitmask may be parsed downward a certain distance from the head. For example, the top of the bitmask that may be associated with the top of the head may have an X value associated therewith. A stored value associated with the typical distance from the top of the head to the top of the shoulders of a human body may then added to the X value of the top of the head to determine the X value of the shoulders. Thus, in one embodiment, a stored value may be added to the X value associated with scan bp1 shown in FIG. 9 to determine the X value associated with the shoulders at scan bp3.

In one embodiment, some body parts such as legs, feet, or the like may be calculated based on, for example, the location of other body parts. For example, as described above, the information such as the bits, pixels, or the like associated with the human target 402 may be scanned to determine the locations of various body parts of the human target 402 represented by scan bp1-scan bp6 in FIG. 9. Based on such locations, subsequent body parts such as legs, feet, or the like may then be calculated for the human target 402.

According to an example embodiment, upon determining the values of, for example, a body part, a data structure may be created that may include measurement values such as length, width, or the like of the body part associated with the scan of the bitmask of the human target 402. In one embodiment, the data structure may include scan results averaged from a plurality depth images. For example, the capture device such as the capture device 60 described above with respect to FIGS. 1A-2 may capture a capture area in frames. Each frame may include a depth image. The depth image of each frame may be analyzed to determine whether a human target may be included as described above. If the depth image of a frame includes a human target, a bitmask of the human target of the depth image associated with the frame may be scanned for one or more body parts at 320. The determined value of a body part for each frame may then be averaged such that the data structure may include average measurement values such as length, width, or the like of the body part associated with the scans of each frame. According another embodiment, the measurement values of the determined body parts may be adjusted such as scaled up, scaled down, or the like such that measurements values in the data structure more closely correspond to a typical model of a human body.

Referring back to FIG. 5, at 325, a model of the human target may then be generated based on the scan. For example, according to one embodiment, measurement values determined by the scanned bitmask may be used to define one or more joints in a skeletal model. The one or more joints may be used to define one or more bones that may correspond to a body part of a human.

Figure 10:
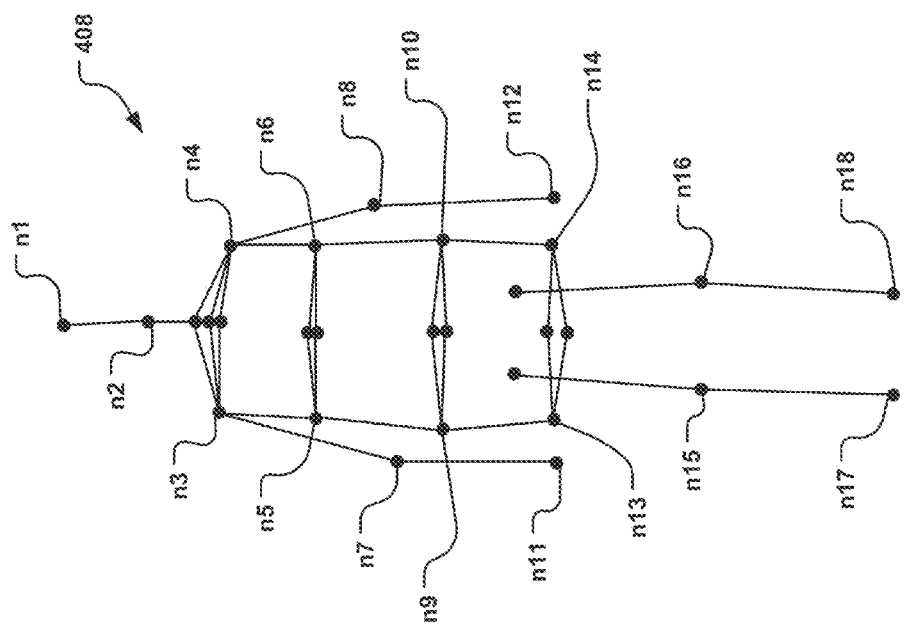
FIG. 10 illustrates an example embodiment of a skeletal model representing a scanned human target.

FIG. 10 illustrates an example embodiment of a skeletal model 405 representing a scanned human target. According to an example embodiment, the skeletal model 405 may include one or more data structures that may represent, for example, the human target 402 described above with respect to FIGS. 6-9 as a three-dimensional model. Each body part may be characterized as a mathematical vector defining joints and bones of the skeletal model 405.

As shown in FIG. 10, the skeletal model 405 may include one or more joints n1-n18. According to an example embodiment, each of the joints n1-n18 may enable one or more body parts defined there between to move relative to one or more other body parts. For example, a model representing a human target may include a plurality of rigid and/or deformable body parts that may be defined by one or more structural members such as "bones" with the joints n1-n18 located at the intersection of adjacent bones. The joints n1-n18 may enable various body parts associated with the bones and joints n1-n18 to move independently of each other. For example, the bone defined between the joints n7 and n11, shown in FIG. 10, corresponds to a forearm that may be moved independent of, for example, the bone defined between joints n15 and n17 that corresponds to a calf.

FIGS. 11A-11E illustrate an example embodiment of a joint being adjusted to generate the skeletal model 405 of the human target 402 described above with respect to FIGS. 9-10. According to an example embodiment shown in FIG. 11A, the initial scan of the bitmask may render a joint n4' that represents the left shoulder joint. As shown in FIG. 11A, the joint n4' may not accurately represent a typical location of a left shoulder joint of a human. The joint n4' may then be adjusted such that the joint may be repositioned along, for example, the X, Y, and Z axis to more accurately represent the typical location of a left shoulder joint of a human as shown by the joint n4 in FIG. 11E.

According to an example embodiment, to reposition the joint n4', a dY value associated with the distance between a reference point of the top of the scanned shoulder of the human target 402 and the joint n4' may be compared to a dX value associated with the distance between a reference point of the edge of the human target 402 and the joint n4'. If the dY value may be greater than the dX value, the joint n4' may be moved in a first direction such as up the Y axis by the dX value to generate a new left shoulder joint, represented by the joint n4" in FIG. 11B. Alternatively, if the dX value may be greater than the dY value, the joint n4' may be moved in a second direction such as right along the X axis by the dY value.

According to one embodiment, the joint n4' may be repositioned to render subsequent joints n4" and n4''' shown in FIGS. 11B and 11C until the repositioned joints may have an s value that may be within a range of a typical length of, for example, the shoulder blade to the joint as shown by the joint n4 in FIG. 11E. For example, as described above, the joint n4' may be moved up along the Y axis by the dX value to generate the joint n4" in FIG. 11B. The dX and dY values of the joint n4" may then be compared. If the dY value is greater than the dX value, the joint n4" may be moved up along the Y axis by the dX value. Alternatively, if the dX value is greater than the dY value, the joint n4" may be moved to the right along the X axis by the dY value to generate another new left shoulder joint, represented by the joint n4''' in FIG. 11C. In an example embodiment, the joint n4''' may then be adjusted as described above to generate another new left shoulder joint such that subsequent new left shoulder joints may be generated and adjusted until, for example, the dX and dY values of one of the new left shoulder joints may be equivalent or within a defined shoulder tolerance as represented by the joint n4"" in FIG. 11D. According to an example embodiment the joint n4"" may then be moved toward the shoulder edge or away from the shoulder edge at, for example, an angle such as a 45 degree angle to generate the joint n4 shown in FIG. 11E that includes an s value within the range of a typical length of, for example, the shoulder blade to the joint.

Thus, according to an example embodiment, one or more joints may be adjusted until such joints may be within a range of typical distances between a joint and a body part of a human to generate a more accurate skeletal model. According to another embodiment, the model may further be adjusted based on, for example, a height associated with the received human target to generate a more accurate skeletal model. For example, the joints and bones may be repositioned or scaled based on the height associated with the received human target.

At 330, the model may then be tracked. For example, according to an example embodiment, the skeletal model such as the skeletal model 405 described above with respect to FIG. 9 may be a representation of a user such as the user 58 described above with respect to FIGS. 1A and 1B. As the user moves in physical space, information from a capture device such as the capture device 60 described above with respect to FIGS. 1A and 1B may be used to adjust the skeletal model such that the skeletal model may accurately represent the user. In particular, one or more forces may be applied to one or more force-receiving aspects of the skeletal model to adjust the skeletal model into a pose that more closely corresponds to the pose of the human target in physical space.

In one embodiment, as described above, the skeletal model may be generated by the capture device. The skeletal model including any information associated with adjustments that may need to be made thereto may be provided to a computing environment such as the computing environment 52 described above with respect to FIGS. 1A-4. The computing environment may include a gestures library that may be used to determine controls to perform within an application based on positions of various body parts in the skeletal model.

The visual appearance of an on-screen character may then be changed in response to changes to the skeletal model being tracked. For example, a user such as the user 58 described above with respect to FIGS. 1A and 1B playing an electronic game on a gaming console may be tracked by the gaming console as described herein. In particular, a body model such as a skeletal model may be used to model the target user, and the body model may be used to render an on-screen user avatar. As the user straightens one arm, the gaming console may track this motion, and in response to the tracked motion, adjust the body model accordingly. The gaming console may also apply one or more constraints to movements of the body model. Upon making such adjustments and applying such constraints, the gaming console may display the adjusted user avatar.

Skeletal Tracking

Figure 12:
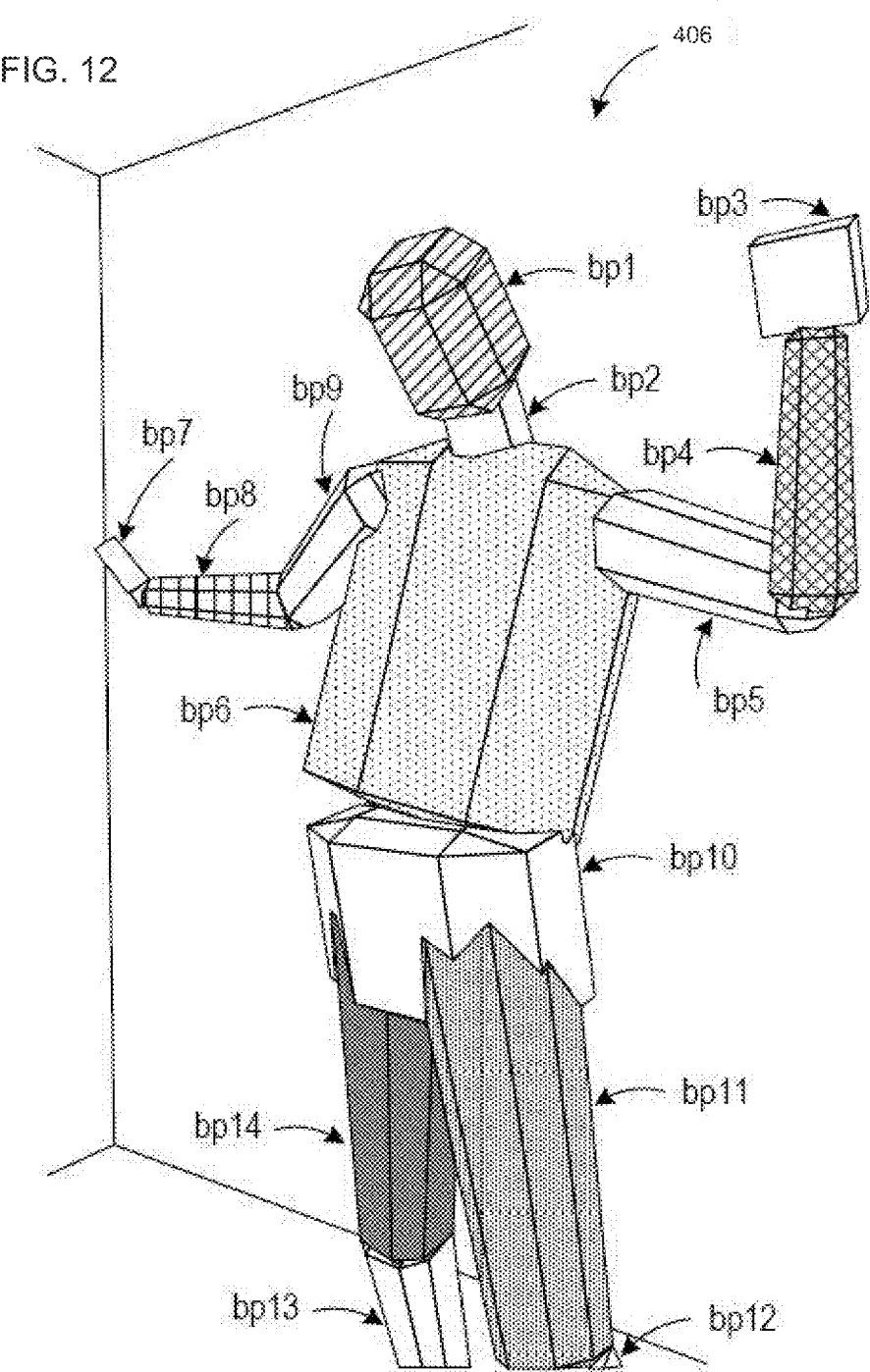
FIG. 12 shows an exemplary body model used to represent a human target.

Additional information concerning how a skeletal model of a human target may be tracked is provided in this section. FIG. 12 shows a non-limiting visual representation of an example body model 406. Body model 406 is a machine representation of a modeled target (e.g., user 58 from FIGS. 1A and 1B). The body model may include one or more data structures that include a set of variables that collectively define the modeled target in the language of a game or other application/operating system.

A model of a target can be variously configured without departing from the scope of this disclosure. In some examples, a model may include one or more data structures that represent a target as a three-dimensional model comprising rigid and/or deformable shapes, or body parts. Each body part may be characterized as a mathematical primitive, examples of which include, but are not limited to, spheres, anisotropically-scaled spheres, cylinders, anisotropic cylinders, smooth cylinders, boxes, beveled boxes, prisms, and the like.

For example, body model 406 of FIG. 12 includes body parts bp1 through by 14, each of which represents a different portion of the modeled target. Each body part is a three-dimensional shape. For example, bp3 is a rectangular prism that represents the left hand of a modeled target, and bp5 is an octagonal prism that represents the left upper-arm of the modeled target. Body model 406 is exemplary in that a body model may contain any number of body parts, each of which may be any machine-understandable representation of the corresponding part of the modeled target.

A model including two or more body parts may also include one or more joints. Each joint may allow one or more body parts to move relative to one or more other body parts. For example, a model representing a human target may include a plurality of rigid and/or deformable body parts, wherein some body parts may represent a corresponding anatomical body part of the human target. Further, each body part of the model may comprise one or more structural members (i.e., "bones"), with joints located at the intersection of adjacent bones. It is to be understood that some bones may correspond to anatomical bones in a human target and/or some bones may not have corresponding anatomical bones in the human target.

Figure 13:
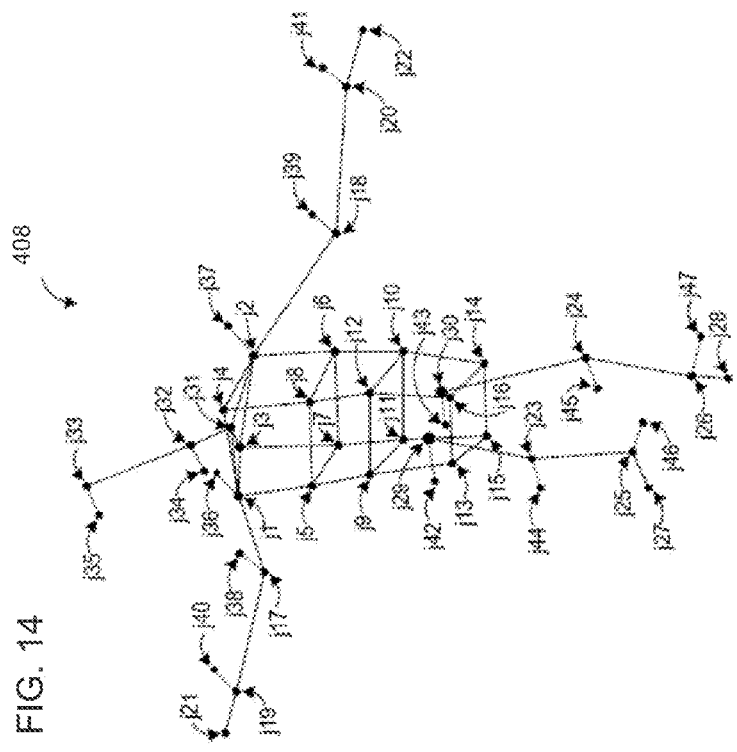
FIG. 13 shows a substantially frontal view of an exemplary skeletal model used to represent a human target.
Figure 14:
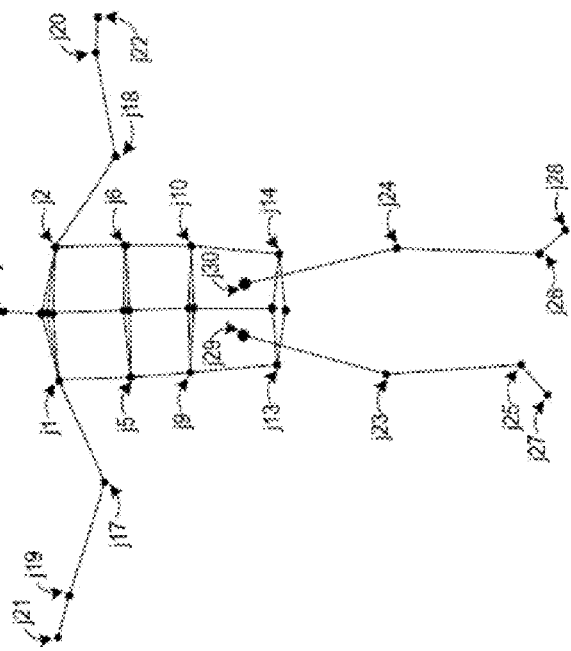
FIG. 14 shows a skewed view of an exemplary skeletal model used to represent a human target.

The bones and joints may collectively make up a skeletal model, which may be a constituent element of the model. The skeletal model may include one or more skeletal members for each body part and a joint between adjacent skeletal members. Exemplary skeletal model 407 and exemplary skeletal model 408 are shown in FIGS. 13 and 14, respectively. FIG. 13 shows a skeletal model 407 as viewed from the front, with joints j1 through j33. FIG. 14 shows a skeletal model 408 as viewed from a skewed view, also with joints j1 through j33. Skeletal model 408 further includes roll joints j34 through j47, where each roll joint may be utilized to track axial roll angles. For example, an axial roll angle may be used to define a rotational orientation of a limb relative to its parent limb and/or the torso. For example, if a skeletal model is illustrating an axial rotation of an arm, roll joint j40 may be used to indicate the direction the associated wrist is pointing (e.g., palm facing up). Thus, whereas joints can receive forces and adjust the skeletal model, as described below, roll joints may instead be constructed and utilized to track axial roll angles. More generally, by examining an orientation of a limb relative to its parent limb and/or the torso, an axial roll angle may be determined. For example, if examining a lower leg, the orientation of the lower leg relative to the associated upper leg and hips may be examined in order to determine an axial roll angle.

Figure 15:
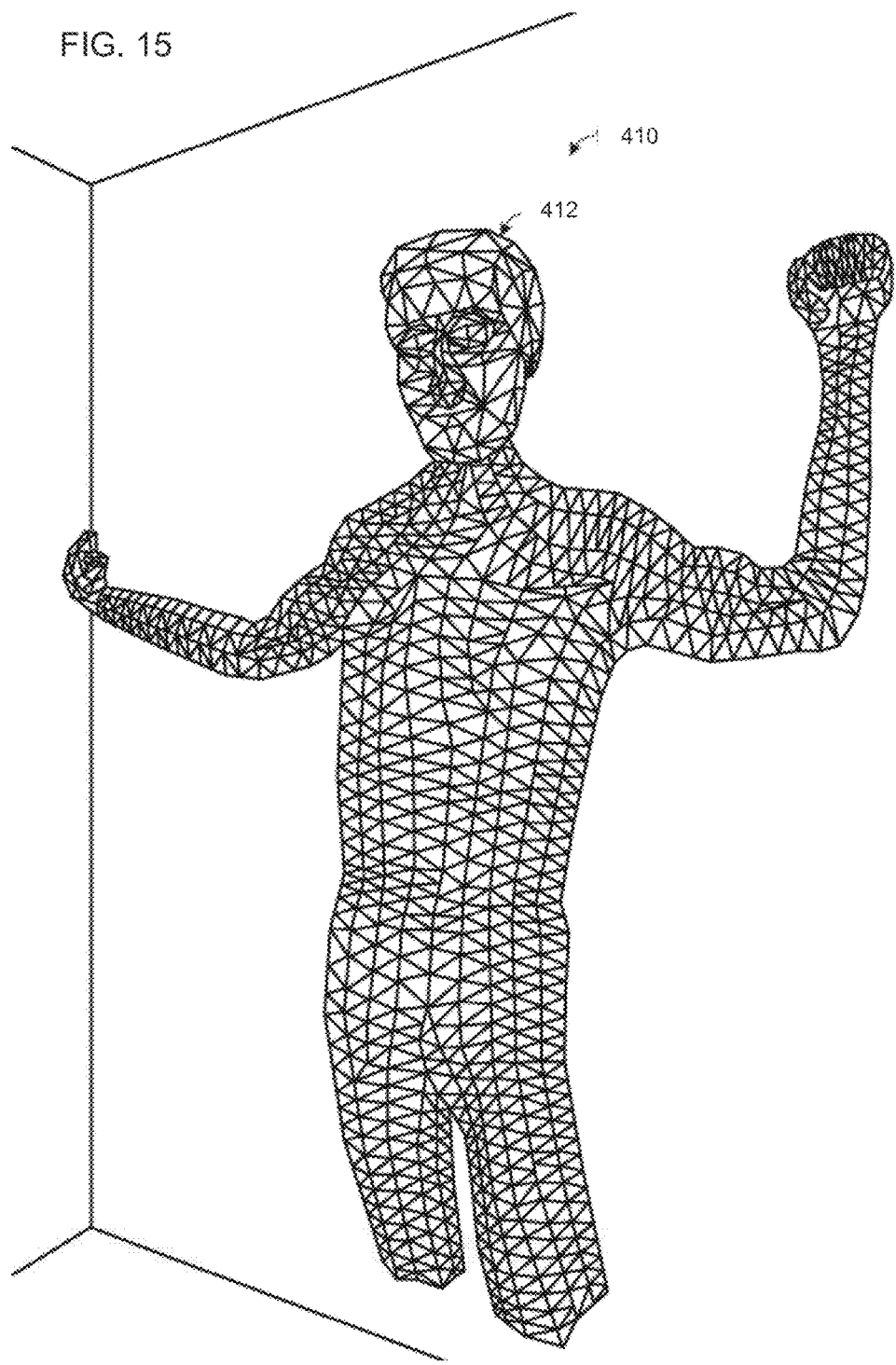
FIG. 15 shows an exemplary mesh model used to represent a human target.

As described above, some models may include a skeleton and/or body parts that serve as a machine representation of a modeled target. In some embodiments, a model may alternatively or additionally include a wireframe mesh, which may include hierarchies of rigid polygonal meshes, one or more deformable meshes, or any combination of the two. As a non-limiting example, FIG. 15 shows a model 410 including a plurality of triangles (e.g., triangle 412) arranged in a mesh that defines the shape of the body model. Such a mesh may include bending limits at each polygonal edge. When a mesh is used, the number of triangles, and/or other polygons, that collectively constitute the mesh can be selected to achieve a desired balance between quality and computational expense. More triangles may provide higher quality and/or more accurate models, while fewer triangles may be less computationally demanding. A body model including a polygonal mesh need not include a skeleton, although it may in some embodiments.

The above described body part models, skeletal models, and polygonal meshes are non-limiting example types of models that may be used as machine representations of a modeled target. Other models are also within the scope of this disclosure. For example, some models may include patches, non-uniform rotation B-splines, or other higher-order surfaces. A model may also include surface textures and/or other information to more accurately represent clothing, hair, and/or other aspects of a modeled target.

As mentioned above, a model serves as a representation of a target, such as user 58 in FIGS. 1A and 1B. As the target moves in physical space, information from a capture device, such as capture device 60 in FIGS. 1A and 1B, can be used to adjust the model so that it accurately represents the target. In particular, one or more forces may be applied to one or more force-receiving aspects of the model to adjust the model into a pose that more closely corresponds to the pose of the target in physical space. Depending on the type of model that is being used, the force may be applied to a joint, a centroid of a body part, a vertex of a triangle, or any other suitable force-receiving aspect of the model. Furthermore, in some embodiments, two or more different calculations may be used when determining the direction and/or magnitude of the force. As described in more detail below, differences between an observed image of the target, as retrieved by a capture device, and a rasterized (i.e., synthesized) image of the model may be used to determine the forces that are applied to the model in order to adjust the body into a different pose.

Figure 16:
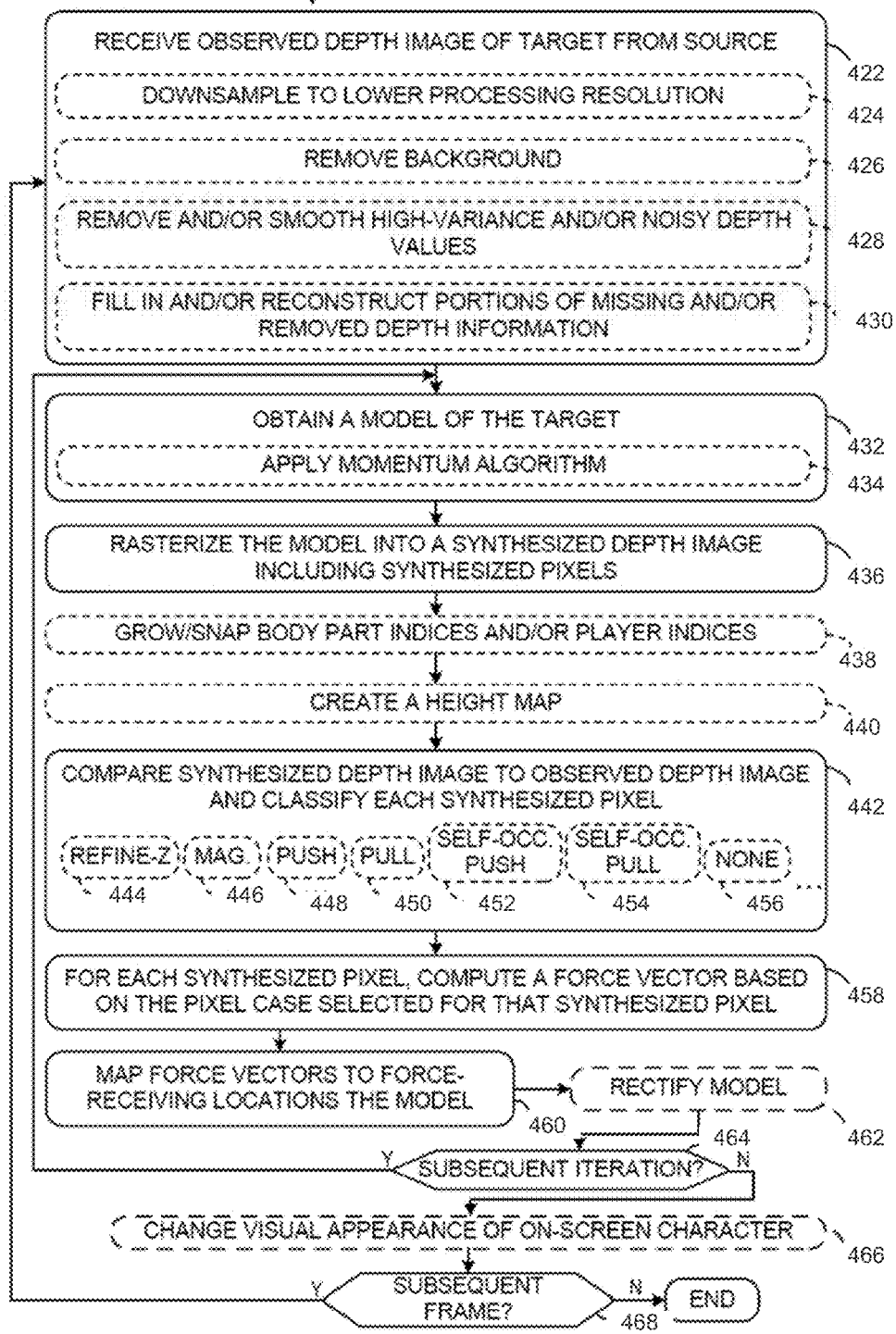
FIG. 16 shows a flow diagram of an example method of visually tracking a target.

FIG. 16 shows a flow diagram of an example method 420 of tracking a target using a model (e.g., body model 406 of FIG. 12). In some embodiments, the target may be a human, and the human may be one of two or more targets being tracked. As such, in some embodiments, method 420 may be executed by a computing system (e.g., target recognition, analysis and tracking system 50, computing environment 52 as shown in FIGS. 1A-2 multimedia console 100 in FIG. 3 and/or computing system 220 shown in FIG. 4) to track one or more users interacting with an electronic game being played on the computing system. As introduced above, tracking of the users allows physical movements of those users to act as a real-time user interface that adjusts and/or controls parameters of the electronic game. For example, the tracked motions of a user may be used to move an on-screen character or avatar in an electronic role-playing game. In another example, the tracked motions of a user may be used to control an on-screen vehicle in an electronic racing game. In yet another example, the tracked motions of a user may be used to control the building or organization of objects in a virtual environment.

At 422, method 420 includes receiving an observed depth image of the target from a depth camera as described above. FIG. 17 shows a visual representation of an exemplary observed depth image 460. As shown, observed depth image 460 captures an exemplary observed pose of a person (e.g., user 58) standing with his arms raised.

As shown at 424 of FIG. 16, upon receiving the observed depth image, method 420 may optionally include downsampling the observed depth image to a lower processing resolution. Downsampling to a lower processing resolution may allow the observed depth image to be more easily utilized and/or more quickly processed with less computing overhead.

As shown at 426, upon receiving the observed depth image, method 420 may optionally include removing a background from the observed depth image. Removing a background may include separating various regions of the observed depth image into background regions and regions occupied by the image of the target. Background regions can be removed from the image or identified so that they can be ignored during one or more subsequent processing steps.

As shown at 428, upon receiving the observed depth image, method 420 may optionally include removing and/or smoothing one or more high-variance and/or noisy depth values from the observed depth image. Such high-variance and/or noisy depth values in the observed depth image may result from a number of different sources, such as random and/or systematic errors occurring during the image capturing process, defects and/or aberrations resulting from the capture device, etc. Since such high-variance and/or noisy depth values may be artifacts of the image capturing process, including these values in any future analysis of the image may skew results and/or slow calculations. Thus, removal of such values may provide better data integrity for future calculations.

As shown at 430, method 420 may optionally include filling in and/or reconstructing portions of missing and/or removed depth information. Such backfilling may be accomplished by averaging nearest neighbors, filtering, and/or any other suitable method.

As shown at 432 of FIG. 16, method 420 may include obtaining a model (e.g., body model 406 of FIG. 12). As described above, the model may include one or more polygonal meshes, one or more mathematical primitives, one or more patches, one or more non-uniform rotational B-splines, and/or other features used to provide a machine representation of the target. Furthermore, the model may exist as an instance of one or more data structures existing on a computing system.

In some embodiments of method 420, the model may be a model obtained from a previous time step. For example, if method 420 is performed continuously, a model resulting from a previous iteration of method 420, corresponding to a previous time step, may be obtained.

In other embodiments, the model may be obtained from a database and/or other program. For example, a model may not be available during a first iteration of method 420, in which case the model may be obtained from a database including one or more models. In such a case, a model from the database may be chosen using a searching algorithm designed to select a model exhibiting a pose similar to that of the target. Even if a model from a previous time step is available, a model from a database may be used. For example, a model from a database may be used after a certain number of frames, if the target has changed poses by more than a predetermined threshold, and/or according to other criteria.

In other embodiments, the model, or portions thereof, may be synthesized. For example, if the target's body core (torso, midsection, and hips) are represented by a deformable polygonal model, that model may be originally constructed using the contents of an observed depth image, where the outline of the target in the image (i.e., the silhouette) may be used to shape the mesh in the X and Y dimensions. Additionally, in such an approach, the observed depth value(s) in that area of the observed depth image may be used to "mold" the mesh in the XY direction, as well as in the Z direction, of the model to more favorably represent the target's body shape.

Method 420 may further include representing any clothing appearing on the target using a suitable approach. Such a suitable approach may include adding to the model auxiliary geometry in the form of primitives or polygonal meshes, and optionally adjusting the auxiliary geometry based on poses to reflect gravity, cloth simulation, etc. Such an approach may facilitate molding the models into more realistic representations of the targets.

As shown at 434, method 420 may optionally comprise applying a momentum algorithm to the model. Because the momentum of various parts of a target may predict change in an image sequence, such an algorithm may be useful in assisting the obtaining of the model. The momentum algorithm may use a trajectory of each of the joints or vertices of a model over a fixed number of a plurality of previous frames to assist in obtaining the model.

In some embodiments, knowledge that different portions of a target can move a limited distance in a time frame (e.g., $1/30^{th}$ or $1/60^{th}$ of a second) can be used as a constraint in obtaining a model. Such a constraint may be used to rule out certain poses when a prior frame is known.

At 436 of FIG. 16, method 420 may also include rasterizing the model into a synthesized depth image. Rasterization allows the model described by mathematical primitives, polygonal meshes, or other objects to be converted into a synthesized depth image described by a plurality of pixels.

Rasterizing may be carried out using one or more different techniques and/or algorithms. For example, rasterizing the model may include projecting a representation of the model onto a two-dimensional plane. In the case of a model including a plurality of body part shapes (e.g., body model 406 of FIG. 12), rasterizing may include projecting and rasterizing the collection of body part shapes onto a two-dimensional plane. For each pixel in the two dimensional plane onto which the model is projected, various different types of information may be stored.

Figure 19:
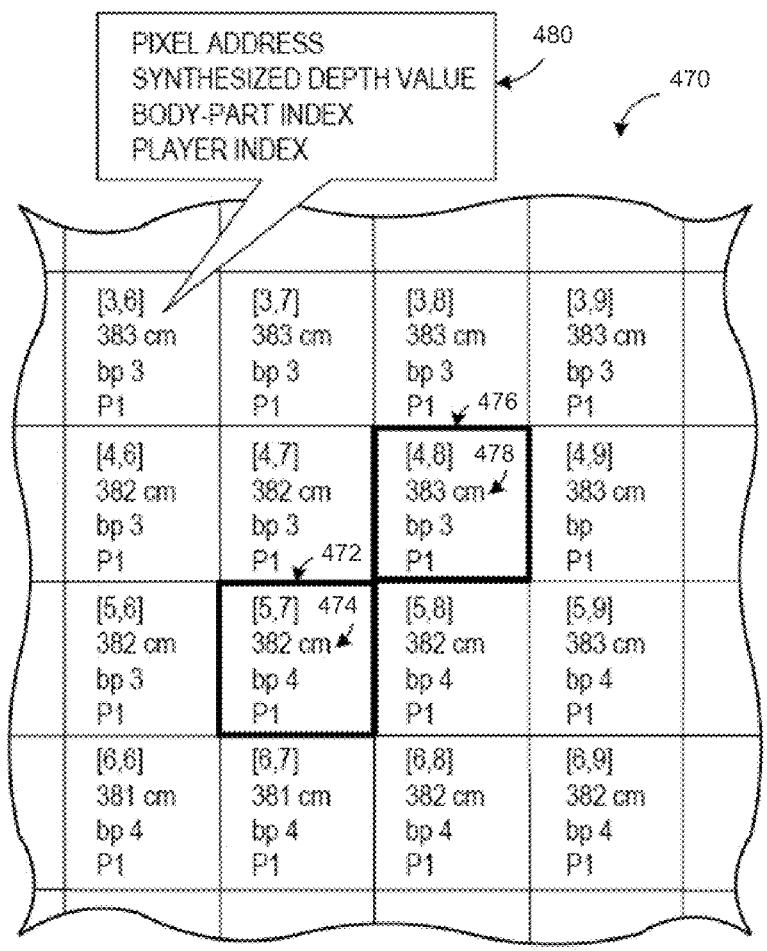
FIG. 19 schematically shows some of the pixels making up a synthesized depth image.

FIG. 18 shows a visual representation 462 of an exemplary synthesized depth image corresponding to body model 406 of FIG. 12. FIG. 19 shows a pixel matrix 470 of a portion of the same synthesized depth image. As indicated at 480, each synthesized pixel in the synthesized depth image may include a synthesized depth value. The synthesized depth value for a given synthesized pixel may be the depth value from the corresponding part of the model that is represented by that synthesized pixel. In other words, if a portion of a forearm body part (e.g., forearm body part bp4 of FIG. 12) is projected onto a two-dimensional plane, a corresponding synthesized pixel (e.g., synthesized pixel 472 of FIG. 19) may be given a synthesized depth value (e.g., synthesized depth value 474 of FIG. 19) equal to the depth value of that portion of the forearm body part. In the illustrated example, synthesized pixel 472 has a synthesized depth value of 382 cm. Likewise, if a neighboring hand body part (e.g., hand body part bp3 of FIG. 12) is projected onto a two-dimensional plane, a corresponding synthesized pixel (e.g., synthesized pixel 476 of FIG. 19) may be given a synthesized depth value (e.g., synthesized depth value 488 of FIG. 19) equal to the depth value of that portion of the hand body part. In the illustrated example, synthesized pixel 476 has a synthesized depth value of 383 cm. It is to be understood that the above is provided as an example. Synthesized depth values may be saved in any unit of measurement or as a dimensionless number.

As indicated at 480, each synthesized pixel in the synthesized depth image may include a body-part index. Such a body-part index may indicate to which of the body parts of the model that pixel corresponds. In the illustrated example of FIG. 19, synthesized pixel 472 has a body-part index of bp4, and synthesized pixel 476 has a body-part index of bp3. In some embodiments, the body-part index of a synthesized pixel may be nil if the synthesized pixel does not correspond to a body part of the target (e.g., a background pixel). In some embodiments, synthesized pixels that do not correspond to a body part may be given a different type of index.

As indicated at 480, each synthesized pixel in the synthesized depth image may include a player index, the player index corresponding to the target. For example, if there are two targets, synthesized pixels corresponding to the first target will have a first player index and synthesized pixels corresponding to the second target will have a second player index. In the illustrated example, the pixel matrix 470 corresponds to only one target, therefore synthesized pixel 472 has a player index of P1, and synthesized pixel 476 has a player index of P1. Other types of indexing systems may be used without departing from the scope of this disclosure.

As indicated at 480, each synthesized pixel in the synthesized depth image may include a pixel address. The pixel address may define the position of a pixel relative to other pixels. In the illustrated example, synthesized pixel 472 has a pixel address of [5,7], and synthesized pixel 476 has a pixel address of [4,8]. It is to be understood that other addressing schemes may be used without departing from the scope of this disclosure.

The example types of pixel information provided above are not limiting. Various different types of information may be stored as part of each pixel. Non-limiting examples of other types of pixel information that may be assigned to each pixel include, but are not limited to, joint indices, bone indices, vertex indices, triangle indices, centroid indices, and the like.

At 438, method 420 of FIG. 16 may optionally include growing and/or snapping the body part indices and/or player indices. In other words, the synthesized depth image may be augmented so that the body-part index and/or player index of some pixels are changed in an attempt to more closely correspond to the modeled target.

In performing the above described rasterizations, one or more Z-Buffers and/or body-part/player index maps may be constructed. As a non-limiting example, a first version of such a buffer/map may be constructed by performing a Z-test in which a surface closest to the viewer (e.g., depth camera) is selected and a body-part index and/or player index associated with that surface is written to the corresponding pixel. A second version of such a buffer/map may be constructed by performing a Z-test in which a surface that is closest to an observed depth value at that pixel is selected and a body-part index and/or player index associated with that surface is written to the corresponding pixel. Such tests may be constrained so as to reject a Z-distance between a synthesized depth value and an observed depth value that is beyond a predetermined threshold. In some embodiments, two or more Z-buffers and/or two or more body-part/player index maps may be maintained, thus allowing two or more of the above described tests to be carried out.

A third version of a buffer/map may be constructed by growing and/or correcting a body-part/player index map. Starting with a copy of the second version of the buffer/map described above, the values may be grown over any "unknown" values within a predetermined Z-distance, so that a space being occupied by the target, but not occupied by the body model, may be filled with proper body-part/player indices. Such an approach may further include overtaking a known value if a more favorable match is identified.

Such a third version of the buffer/map may begin with a pass over synthesized pixels of the copied map to detect pixels having neighboring pixels with a different body-part/player index. These may be considered "edge" pixels, i.e., frontiers along which values may optionally be propagated. As introduced above, growing the pixel values may include growing into either "unknown" or "known" pixels. For "unknown" pixels, the body-part/player index value, for example, in one scenario, may have been zero before, but may now have a non-zero neighboring pixel. In such a case, the four direct neighboring pixels may be examined, and the neighboring pixel having an observed depth value more closely resembling that of the pixel of interest may be selected and assigned to the pixel of interest. In the case of "known" pixels, it may be possible that a pixel with a known nonzero body-part/player index value may be overtaken, if one of its neighboring pixels has a depth value written during rasterization that more closely matches the observed depth value of the pixel of interest than that of the synthesized depth value for that pixel.

Additionally, for efficiency, updating a body-part/player index value of a synthesized pixel may include adding its neighboring four pixels to a queue of pixels to be revisited on a subsequent pass. As such, values may continue to be propagated along the frontiers without doing an entire pass over all the pixels.

Furthermore, the number of pixels that any body-part/player index object (e.g. left forearm body part bp4 of FIG. 12) can grow may be limited based on how many pixels such an object is expected to occupy (e.g., given its shape, distance and angle) vs. how many pixels in the second version of the buffer/map were assigned that body-part/player index. Additionally, the aforementioned approaches may include adding advantages or disadvantages, for certain poses, to bias the growth for certain body parts so that the growth may be correct.

A progressive snap adjustment can be made if it is determined that a distribution of pixels from a body part is grouped at one depth, and another distribution of pixels from the same body part is grouped at another depth, such that a gap exists between these two distributions. For example, an arm waving in front of a torso, and near to that torso, may "spill into" the torso. Such a case may yield a group of torso pixels with a body-part index indicating that they are arm pixels, when in fact they should be torso pixels. By examining the distribution of synthesized depth values in the lower arm, it may be determined that some of the arm pixels may be grouped at one depth, and the rest may be grouped at another depth. The gap between these two groups of depth values indicates a jump between arm pixels and what should be torso pixels. Thus, in response to identifying such a gap, the spillover may then be remedied by assigning the spillover pixels torso body-part indices.

At 440, method 420 of FIG. 16 may optionally include creating a height map from the observed depth image and the synthesized depth image. The height map can be used to illustrate the differences in depth values between the observed depth image and the synthesized depth image. The gradient of such a height map, and/or a blurred version of such a height map, may be utilized when determining the directions of adjustments that are to be made to the model, as described hereafter. Alternatively or additionally, a search in all directions may be performed to identify nearest joints where adjustments may be applied and/or the direction in which such adjustments are to be made. When a height map is used, it may be created before, after, or in parallel to the pixel class determinations described below.

The synthesized depth image and the observed depth image may not be identical, and thus the synthesized depth image can use adjustments and or modifications so that it more closely matches an observed depth image and can thus more accurately represent the target. Accordingly, a number of different approaches may be taken to modify a synthesized depth image. In one approach, two or more different models may be obtained and rasterized to yield two or more synthesized depth images. Each synthesized depth image may then be compared to the observed depth image by a predetermined set of comparison metrics. The synthesized depth image demonstrating a closest match to the observed depth image may be selected, and this process may be optionally repeated in order to improve the model.

In another approach, the two or more synthesized depth images may be blended via interpolation or extrapolation to yield a blended synthesized depth image. In yet another approach, two or more synthesized depth images may be blended in such a way that the blending techniques and parameters vary across the blended synthesized depth image. For example, if a first synthesized depth image is favorably matched to the observed depth image in one region, and a second synthesized depth image is favorably matched in a second region, the pose selected in the blended synthesized depth image could be a mixture resembling the first synthesized depth image in the first region, and resembling the second synthesized depth image in the second region.

In yet another approach, and as indicated at 442 in FIG. 16, the synthesized depth image may be compared to the observed depth image. Each synthesized pixel of the synthesized depth image may be classified based on the results of the comparison. Such classification may be referred to as determining the pixel case for each pixel. The model used to create the synthesized depth image (e.g., body model 406 of FIG. 12) may be systematically adjusted in accordance with the determined pixel cases. In particular, a force vector (magnitude and direction) may be calculated based on the determined pixel case and, depending on the type of model, the computed force vector can be applied to a nearest joint, a centroid of a body part, a vertex of a triangle, or another predetermined force-receiving location of the model used to generate the synthesized depth image.

A pixel case may be selected for each synthesized pixel based on one or more factors, which include, but are not limited to—a difference between an observed depth value and a synthesized depth value for that synthesized pixel; a body-part/player index for that synthesized pixel; and/or the body-part/player index after rasterization for that synthesized pixel compared to the body-part/player index for that pixel after the grow/fix operation shown at 438 and described above.

As indicated at 444 of FIG. 16, determining a pixel case may include selecting a refine-z pixel case. The refine-z pixel case may be selected when the observed depth value of an observed pixel (or in a region of observed pixels) of the observed depth image does not match the synthesized depth value(s) in the synthesized depth image, but is close enough to likely belong to the same object in both images, and the body-part indices match or correspond to neighboring body parts. A refine-z pixel case may be selected for a synthesized pixel if a difference between an observed depth value and a synthesized depth value for that synthesized pixel is within a predetermined range and that synthesized pixel corresponds to a body part other than an arm. The refine-z pixel case corresponds to a computed force vector that may exert a force on the model to move the model into the correct position. The computed force vector may be applied along the Z axis perpendicular to the image plane, along a vector normal to an aspect of the model (e.g., face of the corresponding body part), and/or along a vector normal to nearby observed pixels.

As indicated at 446 of FIG. 16, determining a pixel case may include selecting a magnetism pixel case. The magnetism pixel case may be selected under similar conditions to that described above for the refine-z pixel case, except that the magnetism pixel case may be utilized when the synthesized pixel being examined corresponds to a predetermined subset of body parts (e.g., the arms, or bp3, bp4, bp5, bp7, bp8, and bp9 of FIG. 12). While the arms are provided as an example, other body parts may optionally be associated with the magnetism pixel case in some scenarios. Likewise, in some scenarios, the arms may not be associated with the magnetism pixel case.

The magnetism pixel case may be selected for a synthesized pixel if that synthesized pixel corresponds to a predetermined body part, and, optionally, a difference between an observed depth value and a synthesized depth value for that synthesized pixel is within a predetermined range. The magnetism case corresponds to a computed force vector that may exert a three-dimensional (3-D) force on the model, such that a nearest or "favorably-matched" force-receiving part of the model can be pulled towards groups of pixels in the observed depth image. The 3-D computed force vector may be calculated using any suitable method, such as by identifying a vector from the nearest or "favorably-matched" force-receiving location on the model to an observed pixel of the observed depth image, so that when applied, the computed force vector may move the model so that the corresponding model more favorably matches the target shown in the observed image. An advantage of the magnetism pixel case is its ability to work well with agile body parts, such as arms.

As indicated at 448 and at 450 of FIG. 16, determining a pixel case may include selecting a pull pixel case and/or a push pixel case. These pixel cases may be invoked at the silhouette, where the synthesized and observed depth values may be severely mismatched. The pull pixel case and the push pixel case can be used when a silhouette of a model (or a body part) as shown in the synthesized depth image does not match that of the observed depth image. In such a case, the depth values on one side of the model are lower (i.e., closer) in the observed depth image than that of the target shown in the synthesized depth image. Conversely, the depth values on the other side of the model in the observed depth image may be farther away. In such a case, a three-dimensional computed force vector may be exerted on the model to either push or pull it into a position that more accurately matches the position of the target in the observed depth image. The direction of such pushing and/or pulling is often predominantly in the XY plane, although a Z component can be added to the force in some scenarios. The direction of the force can optionally be determined by following the gradient of the above described height map, or a blurred version thereof.

A pull pixel case may be selected for a synthesized pixel if a difference between an observed depth value and a synthesized depth value for that synthesized pixel is outside a predetermined range and the observed depth value is less than the synthesized depth value, or if no depth value was rasterized for that pixel. Thus, when a pixel is not rendered as part of the model, but the observed depth value at that pixel of the observed depth image is deemed, by proximity and by using the third version of the buffer/map described above, to likely belong to the target being represented by the model, the calculated force vector may pull the model toward the corresponding observed depth values of the observed depth image. In some embodiments, the model optionally may be adjusted in the Z direction.

A push pixel case may be selected for a synthesized pixel if a difference between an observed depth value and a synthesized depth value for that synthesized pixel is outside a predetermined range and the observed depth value is greater than the synthesized depth value. Thus, when a pixel is rendered as part of the model, but the observed depth value at that pixel is significantly farther away, the model may be drawn partially over the background. When applied, the calculated force vector causes the pixels drawn over the background to push the model in the proper XY direction toward the target so that the silhouette of the model more favorably matches the observed silhouette. In some embodiments, the model optionally may be adjusted in the Z direction.

As indicated at 452 and at 454 of FIG. 16, determining a pixel case may include selecting a self-occluding push and/or pull pixel case. Whereas in the above-mentioned push and pull pixel cases a body part may be moving in the foreground relative to a background, the self-occluding push and pull pixel cases consider the scenarios where the body part is in front of another body part (e.g., one leg in front of another, or arm in front of torso). In such cases, the direction of the force may be set to act toward the associated body part in the observed depth image rather than utilizing a height map.

As indicated at 456 of FIG. 16, determining a pixel case may include selecting no pixel case for a synthesized pixel. Oftentimes a force vector will not need to be calculated for all synthesized pixels of the synthesized depth image. For example, synthesized pixels that are farther away from the body model shown in the synthesized depth image, and observed pixels that are farther away from the target shown in the observed depth image (i.e., background pixels), may not influence any force-receiving locations or body parts. A pixel case need not be determined for such pixels, although it can be in some scenarios. As another example, a difference between an observed depth value and a synthesized depth value for that synthesized pixel may be below a predetermined threshold value (e.g., the model already matches the observed image). As such, a pixel case need not be determined for such pixels, although it can be in some scenarios.

The table provided below details an example relationship between the pixel cases described above and the joints illustrated in skeletal model 408 of FIG. 14. Pixel cases 1-7 are abbreviated in the table as follows: 1-Pull (regular), 2-Pull (occlusion), 3-Push (regular), 4-Push (occlusion), 5-Refine-Z, 6-Magnetic Pull, and 7-Occlusion (no action). A "Yes" entry in the "Receives Forces?" column indicates that the joint of that row may receive forces from a force vector. An "X" entry in a pixel cases column denotes that the joint of that row may receive a force from a force vector corresponding to the pixel case of that column. It is to be understood that the following table is provided as an example. It is not to be considered limiting. Other relationships between models and pixel cases may be established without departing from the scope of this disclosure.

| | | Pixel Cases | | | | | | |
|---|---|---|---|---|---|---|---|---|
| Joint | Receives Forces? | 1 | 2 | 3 | 4 | 5 | 6 | 7 |
| j1 | Yes | X | X | X | X | X | | X |
| j2 | Yes | X | X | X | X | X | | X |
| j3 | Yes | X | X | X | X | X | | X |
| j4 | Yes | X | X | X | X | X | | X |
| j5 | Yes | X | X | X | X | X | | X |
| j6 | Yes | X | X | X | X | X | | X |
| j7 | Yes | X | X | X | X | X | | X |
| j8 | Yes | X | X | X | X | X | | X |
| j9 | Yes | X | X | X | X | X | | X |
| j10 | Yes | X | X | X | X | X | | X |
| j11 | Yes | X | X | X | X | X | | X |
| j12 | Yes | X | X | X | X | X | | X |
| j13 | Yes | X | X | X | X | X | | X |
| j14 | Yes | X | X | X | X | X | | X |
| j15 | Yes | X | X | X | X | X | | X |
| j16 | Yes | X | X | X | X | X | | X |
| j17 | Yes | | | | | | X | X |
| j18 | Yes | | | | | | X | X |
| j19 | Yes | | | | | | X | X |
| j20 | Yes | | | | | | X | X |
| j21 | Yes | | | | | | X | X |
| j22 | Yes | | | | | | X | X |
| j23 | Yes | X | X | X | X | X | | X |
| j24 | Yes | X | X | X | X | X | | X |
| j25 | Yes | X | X | X | X | X | | X |
| j26 | Yes | X | X | X | X | X | | X |
| j27 | Yes | X | X | X | X | X | | X |
| j28 | Yes | X | X | X | X | X | | X |
| j29 | No | — | — | — | — | — | — | — |
| j30 | No | — | — | — | — | — | — | — |
| j31 | No | — | — | — | — | — | — | — |
| j32 | Yes | X | X | X | X | X | | X |
| j33 | Yes | X | X | X | X | X | | X |
| j34 | No | — | — | — | — | — | — | — |
| j35 | No | — | — | — | — | — | — | — |
| j36 | No | — | — | — | — | — | — | — |
| j37 | No | — | — | — | — | — | — | — |
| j38 | No | — | — | — | — | — | — | — |
| j39 | No | — | — | — | — | — | — | — |
| j40 | No | — | — | — | — | — | — | — |
| j41 | No | — | — | — | — | — | — | — |
| j42 | No | — | — | — | — | — | — | — |
| j43 | No | — | — | — | — | — | — | — |
| j44 | No | — | — | — | — | — | — | — |
| j45 | No | — | — | — | — | — | — | — |
| j46 | No | — | — | — | — | — | — | — |
| j47 | No | — | — | — | — | — | — | — |

At 458, method 420 of FIG. 16 includes, for each synthesized pixel for which a pixel case has been determined, computing a force vector based on the pixel case selected for that synthesized pixel. As described above, each pixel case corresponds to a different algorithm and/or methodology for selecting the magnitude, direction, and/or force-receiving location of a force vector. The force vectors may be computed and/or accumulated in any coordinate space, such as world space, screen space (pre-Z-divide), projection space (post-Z-divide), model space, and the like.

At 458, method 420 includes mapping each computed force vector to one or more force-receiving locations of the model. Mapping may include mapping a computed force vector to a "best-matching" force-receiving location. The selection of a best-matching force-receiving location of the model is dependent on the pixel case selected for the corresponding pixel. The best-matching force-receiving location may be the nearest joint, vertex, or centroid, for example. In some embodiments, moments (i.e., rotational forces) may be applied to a model.

In general, translations may result from forces with similar directions acting on the force-receiving locations of a model, and rotations may result from forces of different directions acting on the force-receiving locations of a model. For deformable objects, some of the components of the force vectors may be used to deform the model within its deformation limits, and the remaining components of the force vectors may be used to translate and/or rotate the model.

In some embodiments, force vectors may be mapped to the best-matching rigid or deformable object, sub-object, and/or set of polygons of an object. Accordingly, some of the force vectors may be used to deform the model, and the remaining components of the force vectors may be used to perform rigid translation of the model. Such a technique may result in a "broken" model (e.g. an arm could be severed from the body). As discussed in more detail below, a rectification step may then be used to transform translations into rotations and/or apply constraints in order to connect body parts back together.

Figures 20A, 20B:
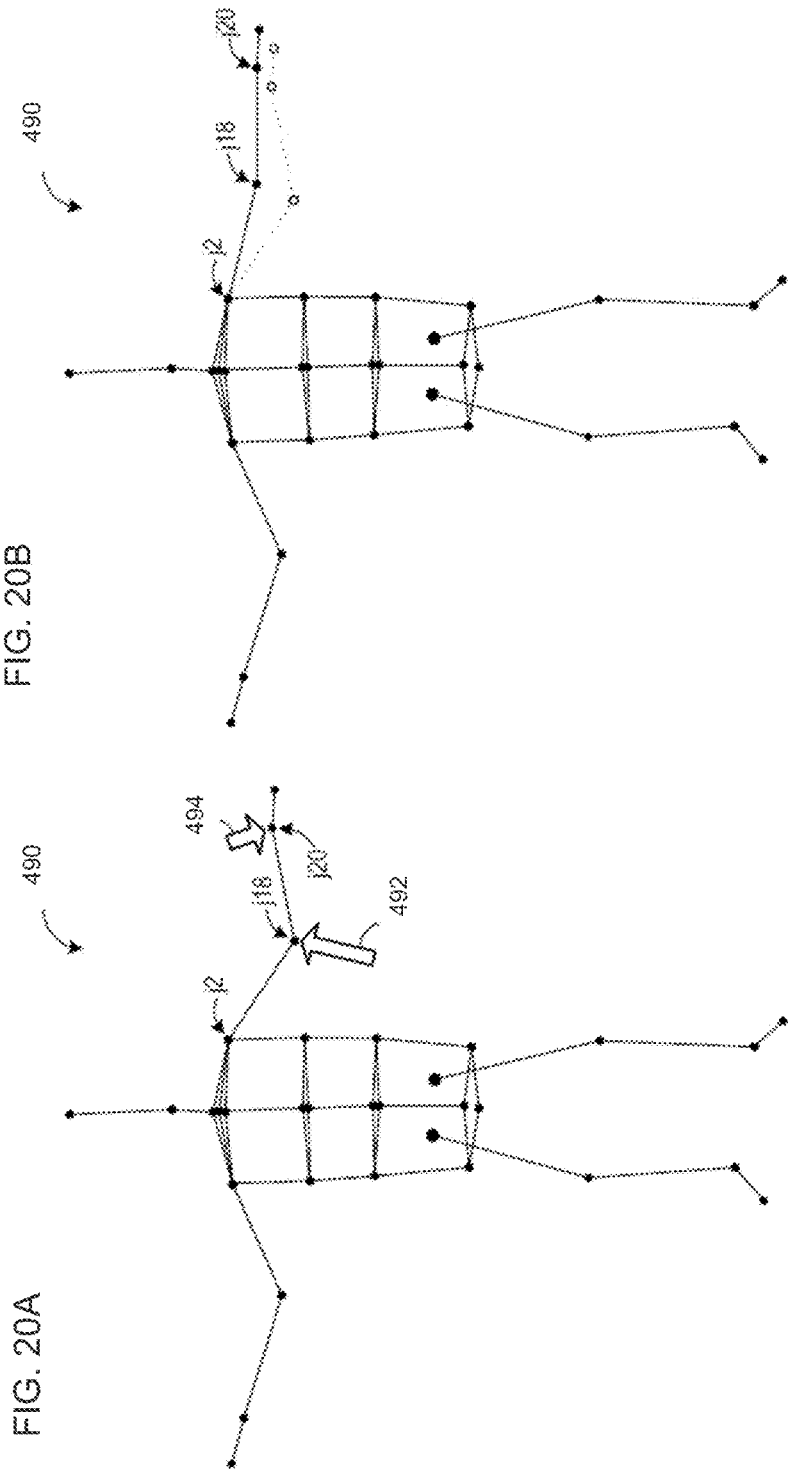
FIGS. 20A-20B schematically show application of and the result of applying force to the force-receiving location of a model.

FIGS. 20A and 20B shows a very simplified example of applying force vectors to a model—in the illustrated example, a skeletal model 490. For the sake of simplicity, only two force vectors are shown in the illustrated example. Each such force vector may be the result of the summation of two or more different force vectors resulting from the pixel case determinations and force vector calculations of two or more different pixels. Often times, a model will be adjusted by many different force vectors, each of which is the sum of many different force vectors resulting from the pixel case determinations and force vector calculations of many different pixels.

FIG. 20A shows a skeletal model 490, where force vector 492 is to be applied to joint j18 (i.e., an elbow) and force vector 494 is to be applied to joint j20 (i.e., a wrist), for the purpose of straightening one arm of skeletal model 490 to more closely match an observed depth image. FIG. 20B shows skeletal model 490 after the forces are applied. FIG. 20B illustrates how the applied forces adjust the pose of the model. As shown in FIG. 20B, the lengths of the skeletal members may be preserved. As further shown, the position of joint j2 remains at the shoulder of the skeletal model, as expected for the case of a human straightening an arm. In other words, the skeletal model remains intact after the forces have been applied. Maintaining the integrity of the skeletal model when applying forces results from one or more constraints being applied, as discussed in more detail hereafter. A variety of different constraints can be enforced to maintain the integrity of different possible model types.

At 462, method 420 of FIG. 16 optionally includes rectifying the model to a pose satisfying one or more constraints. As described above, after collecting and mapping the computed force vectors to the force-receiving locations of the model, the computed force vectors may then be applied to the model. If performed without constraint, this may "break" the model, stretching it out of proportion and/or moving body parts into invalid configurations for the actual body of the target. Iterations of various functions may then be used to "relax" the new model position into a "nearby" legal configuration. During each iteration of rectifying the model, constraints may be gently and/or gradually applied to the pose, in order to limit the set of poses to those that are physically expressible by one or more actual bodies of one or more targets. In other embodiments, such a rectifying step may be done in a non-iterative manner.

In some embodiments, the constraints may include one or more of: skeletal member length constraints, joint angle constraints, polygon edge angle constraints, and collision tests, as described hereafter.

As an example in which a skeletal model is used, skeletal member (i.e., bone) length constraints can be applied. Force vectors that can be detected (i.e., force vectors at locations where joints and/or body parts are visible and not occluded) may be propagated along a network of skeletal members of the skeletal model. By applying skeletal member length constraints, the propagated forces may "settle in" once all of the skeletal members are of acceptable lengths. In some embodiments, one or more of the skeletal member lengths are allowed to be variable within a predetermined range. For example, the length of skeletal members making up the sides of the torso may be variable to simulate a deformable midsection. As another example, the length of skeletal members making up the upper-arm may be variable to simulate a complex shoulder socket.

A skeletal model may additionally or alternatively be constrained by computing a length of each skeletal member based on the target, such that these lengths may be used as constraints during rectification. For example, the dimensions of various parts of the target's body (e.g. arm length, hip width, head size, etc.) can be determined by rendering various versions of the body model, using varied dimensions in each rendering, and selecting the dimensions of the rendering that most closely matches the target according to one or more suitable metrics. In another example, a single rendering may be made, and the proper body dimensions can be deduced by analysis of the particular areas where the rendering does, and does not, match the observed depth image.

In some embodiments, joint positions prior to rectification may be compared to joint positions after rectification. If it is determined that a consistent set of adjustments is being made to the skeletal model in every frame, method 420 may use this information to perform a "progressive refinement" on the skeletal model. For example, by comparing joint positions before and after rectification it may be determined that in each frame the shoulders are being pushed wider apart during rectification. Such a consistent adjustment suggests that the shoulders of the skeletal model are smaller than that of the target being represented, and consequently, the shoulder width is being adjusted each frame during rectification to correct for this. In such a case, a progressive refinement, such as increasing the shoulder width of the skeletal model, may be made to correct the skeletal model.

In regards to joint angle constraints, certain limbs and body parts may be limited in their range of motion relative to an adjacent body part. Additionally, this range of motion may change based on the orientation of adjacent body parts. Thus, applying joint angle constraints may allow limb segments to be constrained to possible configurations, given the orientation of parent limbs and/or body parts.

Collision tests may be applied to prevent the model from interpenetrating itself. For example, collision tests may prevent any part of the forearms/hands from penetrating the torso, or prevent the forearms/hands from penetrating each other. In other examples, collision tests may prevent a leg from penetrating the other leg. In some embodiments, collision tests may be applied to models of two or more users to prevent similar scenarios from occurring between models. In some embodiments, collision tests may be applied to a body model and/or a skeletal model. In some embodiments, collision tests may be applied to certain polygons of a mesh model.

Collision tests may be applied in any suitable manner. One approach examines collisions of one "volumetric line segment" vs. another, where a volumetric line segment may be a line segment with a radius that extends out in 3-D. An example of such a collision test may be examining a forearm vs. another forearm. In some embodiments, the volumetric line segment may have a different radius at each end of the segment.

Another approach examines collisions of a volumetric line segment vs. a posed polygonal object. An example of such a collision test may be examining a forearm vs. a torso. In some embodiments, the posed polygonal object may be a deformed polygonal object.

In some embodiments, knowledge that different portions of a target can move a limited distance in a time frame (e.g., $1/30^{th}$ or $1/60^{th}$ of a second) can be used as a constraint. Such a constraint may be used to rule out certain poses resulting from application of forces to pixel-receiving locations of the model.

As indicated at 464, after the model has been adjusted and optionally constrained, the process can loop back to begin a new rasterization of the model into a new synthesized depth image, which may then be compared to the observed depth image so that further adjustments can be made to the model. In this way, the model can be progressively adjusted to more closely represent the modeled target. Virtually any number of iterations can be completed each frame. More iterations may achieve more accurate results, but more iterations also may demand more computing overhead. It is believed that two or three iterations per frame is appropriate in many scenarios.

Figure 21B:
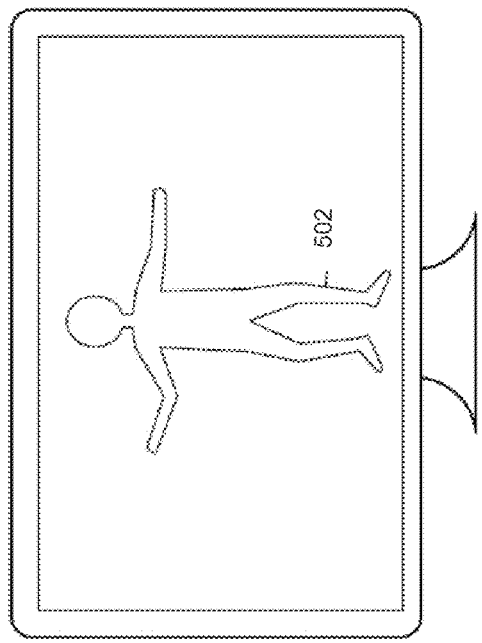
FIGS. 21A-22 show a player avatar rendered from the models of FIGS. 20A-20B.
Figure 21A:
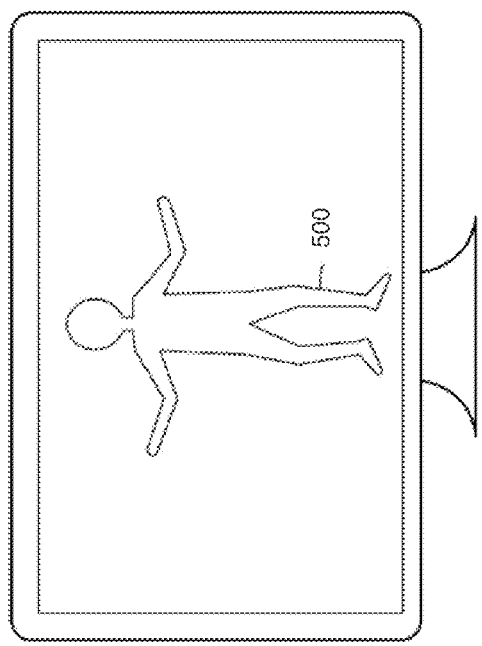

At 466, method 420 of FIG. 16 optionally includes changing the visual appearance of an on-screen character (e.g., player avatar 500 of FIG. 21A) responsive to changes to the model, such as changes shown in FIG. 20B. For example, a user playing an electronic game on a multimedia console (e.g., multimedia console 100 of FIG. 3) may be tracked by the target recognition, analysis and tracking system as described herein. In particular, a body model (e.g., body model 406 of FIG. 12) including a skeletal model (e.g., skeletal model 490 of FIG. 20A) may be used to model the target user, and the body model may be used to render an on-screen player avatar. As the user straightens one arm, the gaming console may track this motion, then in response to the tracked motion, adjust the model 490 as depicted in FIG. 20B. The gaming console may also apply one or more constraints, as described above. Upon making such adjustments and applying such constraints, the gaming console may display the adjusted player avatar 502, as shown in FIG. 21B. This is also shown by way of example in FIG. 1A, in which player avatar 64 is shown punching boxing opponent 62 responsive to user 58 throwing a punch in real space.

As discussed above, visual target recognition can be performed for purposes other than changing the visual appearance of an on-screen character or avatar. As such, the visual appearance of an on-screen character or avatar need not be changed in all embodiments.

As indicated at 468, the above described process can be repeated for subsequent frames.

Motion Capture

Figure 22:
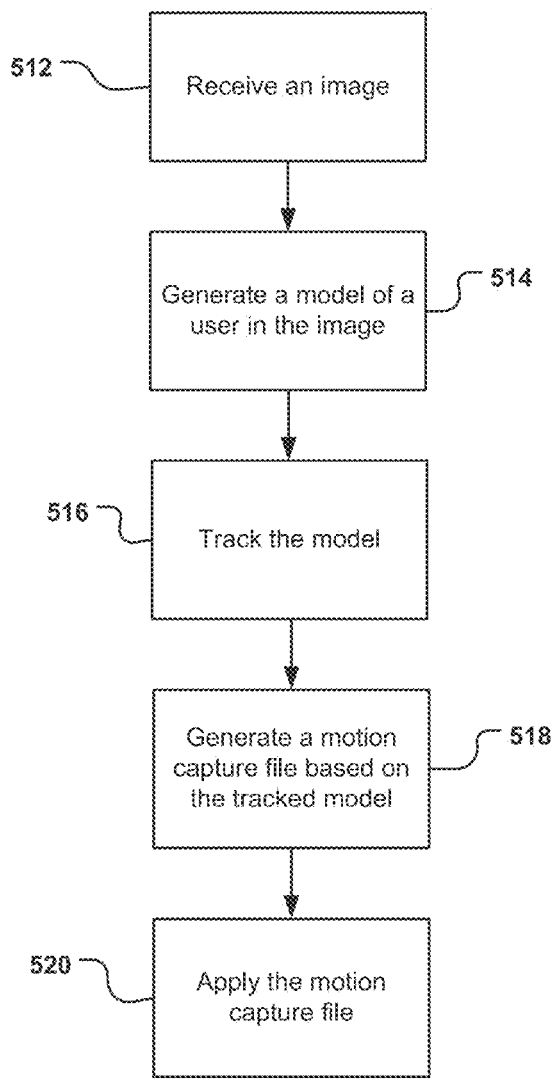

FIG. 22 depicts a flow diagram of an example method 510 for capturing motions of a user in a capture area. The example method 510 may be implemented using, for example, the capture device 60 and/or the computing environment 52 of the target recognition, analysis and tracking system 50 described with respect to FIGS. 1A-4. In an example embodiment, the example method 500 may take the form of program code (i.e., instructions) that may be executed by, for example, the capture device 60 and/or the computing environment 52 of the target recognition, analysis and tracking system 50 described with respect to FIGS. 1A-4.

According to one embodiment, at 512, as described above, an image may be received. For example, an image may be received from the capture device 60. The image may include a depth image as described above with reference to the depth image 400 from FIG. 6.

As shown in FIG. 22, in one embodiment, upon receiving the image, at 512, the image may be downsampled to a lower processing resolution such that the depth image may be more easily used and/or more quickly processed with less computing overhead. Additionally, one or more high-variance and/or noisy depth values may be removed and/or smoothed from the depth image; portions of missing and/or removed depth information may be filled in and/or reconstructed; and/or any other suitable processing may be performed on the received depth information may such that the depth information may used to generate a model such as a skeletal model, which will be described in more detail below.

At 514, as described above, a model of a user in the image may be generated. FIG. 10 above illustrates an example embodiment of a model 405 that may be generated for a human target at, for example, 514. According to an example embodiment, the model 405 may include one or more data structures that may represent, for example, the human target 402 described above with respect to FIG. 6 as a three-dimensional model. Each body part may be characterized as a mathematical vector defining joints and bones of the model 405.

As described above in FIG. 10, the model 405 may include one or more joints n1-n18, which may have associated vectors. Referring back to FIG. 22, at 516, the model may be tracked such that the model may be adjusted based on movement by the user. According to one embodiment, the model such as the model 405 described above with respect to FIG. 10 may be a representation of a user such as the user 58 described above with respect to FIGS. 1A and 1B. The target recognition, analysis and tracking system may observe or capture movements from the user such as the user 58 that may be used to adjust the model.

For example, a capture device such as the capture device 60 described above with respect to FIGS. 1A-2 may be observe or capture multiple images such as depth images, RGB images, or the like of a capture area that may be used to adjust the model. According to one embodiment, each of the images may be observed or captured based on a defined frequency. For example, the capture device may observe or capture a new image of a capture area every millisecond, microsecond, or the like.

Upon receiving each of the images, information associated with a particular image may be compared to information associated with the model to determine whether a movement may have been performed by the user. For example, in one embodiment, the model may be rasterized into a synthesized image such as a synthesized depth image. Pixels in the synthesized image may be compared to pixels associated with the human target in each of the received images to determine whether the human target in a received image has moved.

According to an example embodiment, one or more force vectors may be computed based on the pixels compared between the synthesized image and a received image. The one or more force may then be applied or mapped to one or more force-receiving aspects such as joints of the model to adjust the model into a pose that more closely corresponds to the pose of the human target or user in physical space.

According to another embodiment, the model may be adjusted to fit within a mask or representation of the human target in each of the received images to adjust the model based on movement of the user. For example, upon receiving each of the observed images, the vectors including the X, Y, and Z values that may define each of the bones and joints may be adjusted based on the mask of the human target in each of the received images. For example, the model may be moved in an X direction and/or a Y direction based on X and Y values associated with pixels of the mask of the human in each of the received images. Additionally, joints and bones of the model may be rotated in a Z direction based on the depth values associated with pixels of the mask of the human target in each of the received images.

Figure 23B:
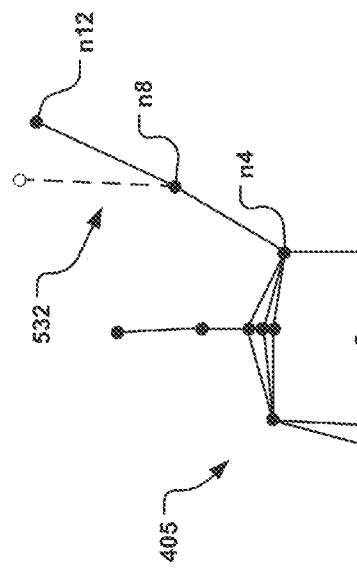
FIGS. 23A-23C illustrate an example embodiment of a model that may be captured at various points in time.
Figure 23A:
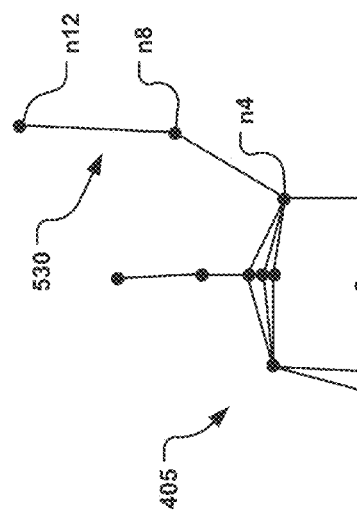
Figure 23C:
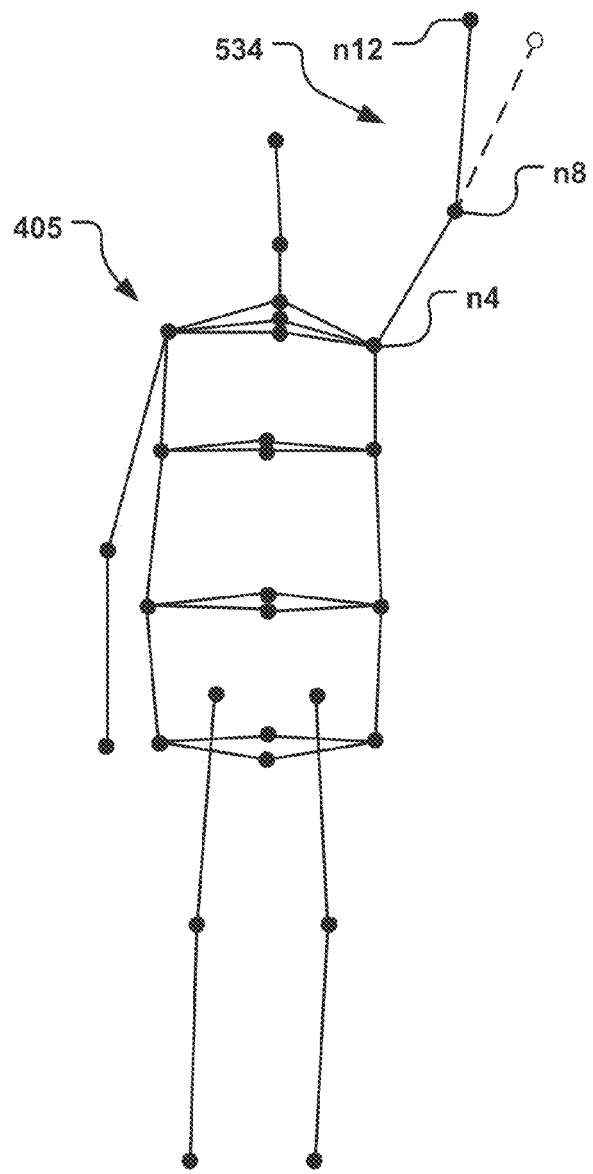

FIGS. 23A-23C illustrate an example embodiment of a model being adjusted based on movements or gestures by a user such as the user 58 described above with respect to FIGS. 1A and 1B. As shown in FIGS. 23A-23C, the model 405 described above with respect to FIG. 10 may be adjusted based on movements or gestures of the user at various points observed and captured in the depth images received at various points in time as described above. For example, as shown in FIG. 23A, the joints n4, n8, and n12 and the bones defined there between of the model 405 may be adjusted to represent pose 530 when the user raises his or her left arm by applying one or more force vectors or adjusting the model to fit with a mask for a human target in images received at various points in time as described above. The joints n8 and n12 and the bone defined there between may further be adjusted to a pose 532 and 534, as shown in FIGS. 23B-23C, when the user waves by moving his or her left forearm. Thus, according to an example embodiment, the mathematical vector defining the joints n4, n8, and n12 and the bones associated with the forearm and bicep there between may include vectors with an X value, a Y value, and a Z value that may be adjusted to correspond to poses 530, 532, and 534 by applying force vectors or fitting the model within a mask as described above.

Referring back to FIG. 22, at 518, a motion capture file of the tracked model may be generated. For example, the target recognition, analysis and tracking system may render and store a motion capture file that may include one or more motions such as a waving motion, a swinging motion such as a golf swing, a punching motion, a walking motion, a running motion, or the like specific to the user such as the user 58 described above with respect to FIGS. 1A and 1B. According to one embodiment, the motion capture file may be generated in real-time based on the information associated with the tracked model. For example, in one embodiment, the motion capture file may include, for example, the vectors including the X, Y, and Z values that may define the joints and bones of the model as it is being tracked at various points in time.

In one example embodiment, a user may be prompted to perform various motions that may be captured in the motion capture file. For example, an interface may be displayed that may prompt the user to, for example, walk or perform a golf swing motion. As described above, the model being tracked may then be adjusted based on those motions at various points in time and a motion capture file of the model for the prompted motion may be generated and stored.

In another embodiment, the motion capture file may capture the tracked model during natural movement by the user interacting with the target recognition, analysis and tracking system. For example, the motion capture file may be generated such that the motion capture file may naturally capture any movement or motion by the user during interaction with the target recognition, analysis and tracking system.

According to one embodiment, the motion capture file may include frames corresponding to, for example, a snapshot of the motion of the user at different points in time. Upon capturing the tracked model, information associated with the model including any movements or adjustment applied thereto at a particular point in time may be rendered in a frame of the motion capture file. The information in the frame may include, for example, the vectors including the X, Y, and Z values that may define the joints and bones of the tracked model and a time stamp that may be indicative of a point in time in which, for example, the user performed the movement corresponding to the pose of the tracked model.

For example, as described above with respect to FIGS. 23A-23C, the model 405 may be tracked and adjusted to form poses 530, 532, and 534 that may be indicative of the user waving his or her left hand at particular points in time. The information associated with joints and bones of the model 405 for each of the poses 530, 532, and 534 may be captured in a motion capture file.

For example, pose 530 of the model 405, shown in FIG. 23A, may correspond to a point in time when a user initially raises his or her left arm. The pose 530 including information such as the X, Y, and Z values of the joints and bones for the pose 530 may be rendered in, for example, a first frame of the motion capture file having a first time stamp associated with the point in time after the user raises his or her left arm.

Similarly, poses 532 and 534 of the model 405, shown in FIGS. 23B and 23C, may correspond to a point in time when a user waves his or her left hand. The poses 532 and 534 including information such as the X, Y, and Z values of the joints and bones for the poses 532 and 534 may be rendered in, for example, respective second and third frames of the motion capture file having respective second and third time stamps associated with different point in time of the user waving his or her left hand.

According to an example embodiment, the first, second, and third frames associated with the poses 530, 532, and 534 may be rendered in the motion capture file in a sequential time order at the respective first, second, and third time stamps. For example, the first frame rendered for the pose 530 may have a first time stamp of 0 seconds when the user raises his or her left arm, the second frame rendered for the pose 532 may have a second time stamp of 1 second after the user moves his or her left hand in an outward direction to begin a waving motion, and the third frame rendered for the pose 534 may have a third time stamp of 2 seconds when the user moves his or her left hand in an inward direction to complete a waving motion.

At 520, the motion capture file may be applied to an avatar or game character. For example, the target recognition, analysis and tracking system may apply one or more motions of the tracked model captured in the motion capture file to an avatar or game character such that the avatar or game character may be animated to mimic motions performed by the user such as the user 58 described above with respect to FIGS. 1A and 1B. In an example embodiment, the joints and bones in the model captured in the motion capture file may be mapped to particular portions of the game character or avatar. For example, the joint associated with the right elbow may be mapped to the right elbow of the avatar or game character. The right elbow may then be animated to mimic the motions of the right elbow associated with the model of the user in each frame of the motion capture file.

According to an example embodiment, the target recognition, analysis and tracking system may apply the one or more motions as the motions are captured in the motion capture file. Thus, when a frame is rendered in the motion capture file, the motions captured in the frame may be applied to the avatar or game character such that the avatar or game character may be animated to immediately mimic the motions captured in the frame.

In another embodiment, the target recognition, analysis and tracking system may apply the one or more motions after the motions may be captured in a motion capture file. For example, a motion such as a walking motion may be performed by the user and captured and stored in the motion capture file. The motion such as the walking motion may then be applied to the avatar or game character each time, for example, the user subsequently performs a gesture recognized as a control associated with the motion such as the walking motion of the user. For example, when a user lifts his or her left leg, a command that causes the avatar to walk may be initiated. The avatar may then begin walking and may be animated based on the walking motion associated with the user and stored in the motion capture file.

FIGS. 24A-24C illustrate an example embodiment of an avatar or game character 540 that may be animated based on a motion capture file at, for example, 520. As shown in FIGS. 24A-24C, the avatar or game character 540 may be animated to mimic a waving motion captured for the tracked model 405 described above with respect to FIGS. 23A-23C. For example, the joint n4, n8, and n12 and the bones defined there between of the model 405 shown in FIGS. 23A-23C may be mapped to a left shoulder joint w4', a left elbow joint w8', and a left wrist joint w12' and the corresponding bones of the avatar or game character 540 as shown in FIGS. 24A-24C. The avatar or game character 540 may then be may animated into poses 542, 544, and 546 that mimic the poses 530, 532, and 534 of the model 405 shown in FIGS. 23A-23C at the respective first, second, and third time stamps in the motion capture file.

Thus, in an example embodiment, the visual appearance of an on-screen character may be changed in response to the motion capture file. For example, a user such as the user 58 described above with respect to FIGS. 1A-1B playing an electronic game on a gaming console may be tracked by the gaming console as described herein. As the user swings an arm, the gaming console may track this motion, and then in response to the tracked motion, adjust the model such as the skeletal model, mesh model, or the like associated with the user accordingly. As described above, the tracked model may further be captured in a motion capture file. The motion capture file may then be applied to the on-screen character such that the on-screen character may be animated to mimic the actual motion of the user swinging his arm. According to example embodiments, the on-screen character may be animated to swing, for example, a golf club, a bat, or throw a punch in a game exactly like the user swings his or her arm.

Body Pose Estimation

Body pose estimation may also be performed. As described above, the capture device 20 and/or computing environment 52 may perform one or more processes on a depth map to assign pixels on the depth map to segments of a user's body. From these assigned body parts, the computing environment may obtain nodes, centroids or joint positions of the body parts, and may provide the nodes, joints or centroids to one or more processes to create a 3-D model of a body pose. In one aspect, the body pose is the three dimensional location of the set of body parts associated with a user. In another aspect, pose includes the three dimensional location of the body part, as well as the direction it is pointing, the rotation of the body segment or joint as well as any other aspects of the body part or segment.

Figure 25:
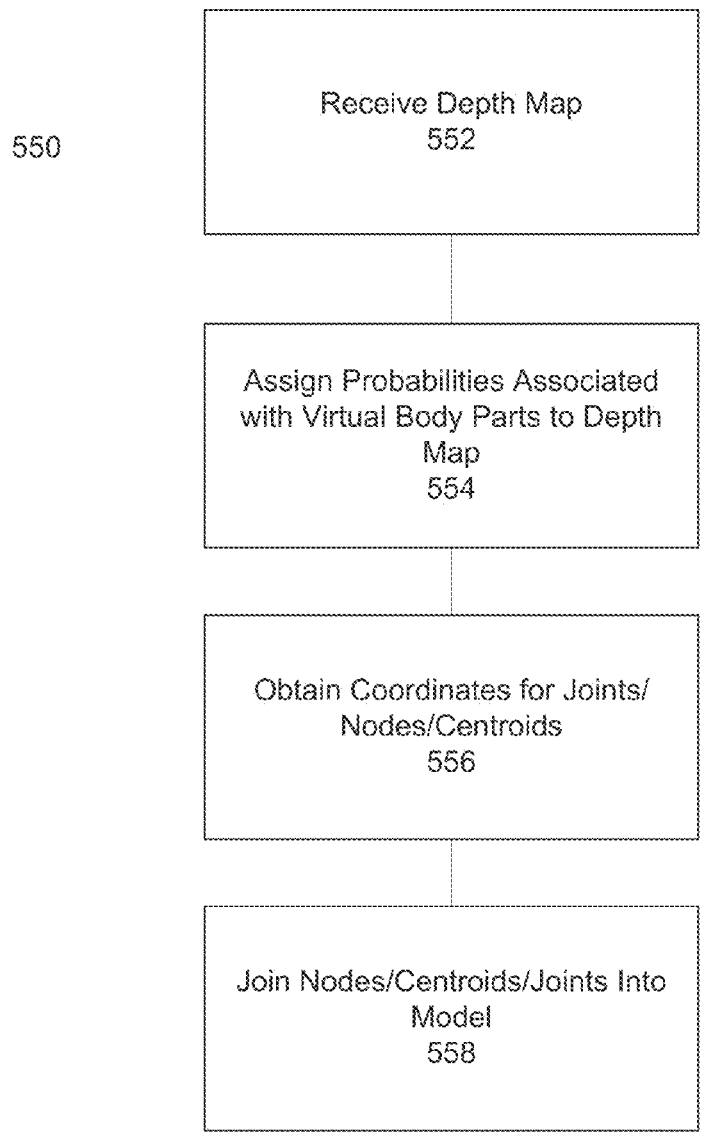
FIG. 25 depicts a flow diagram of an example method for body pose estimation.

FIG. 25 is a flow diagram 550 illustrating one embodiment of a method for performing body pose estimation. At 552, a depth map such as depth map 400 may be received by the target recognition, analysis and tracking system. Probabilities associated with one or more virtual body parts may be assigned to pixels on a depth map at 554. A centroid may be calculated for sets of associated pixels associated with a virtual body part, which may be a node, joint or centroid at 556. Centroids may be representations of joints or nodes of a body, and may be calculated using any mathematical algorithm, including, for example, averaging the coordinates of every pixel in a depth map having a threshold probability that it is associated with a body part, or, as another example, a linear regression technique. At 558, the various nodes, joints or centroids associated with the body parts may be combined into a model, which may be provided to one or more programs in a target recognition, analysis and tracking system. The model may include not only the location in three dimensions of the joints or body parts, but may also include the rotation of a joint or any other information about the pointing of the body part.

Body poses may be estimated for multiple users. In an embodiment, this may be accomplished by assuming a user segmentation. For example, values may be assigned to an image such that a value 0 represents background, value 1 represents user 1, value 2 represents user 2, etc. Given this user segmentation image, it is possible to classify all user 1 pixels and do a centroid finding, and then repeat this process for subsequent users. In another embodiment, background subtraction may be performed and the remaining foreground pixels (belonging to the multiple users) may then be classified. When computing centroids, it may be ensured that each centroid is spatially localized, so that a respective body part is present for each user. The centroids may then be combined into coherent models by, for example, connecting neighboring body parts throughout each user's body.

Figure 26:
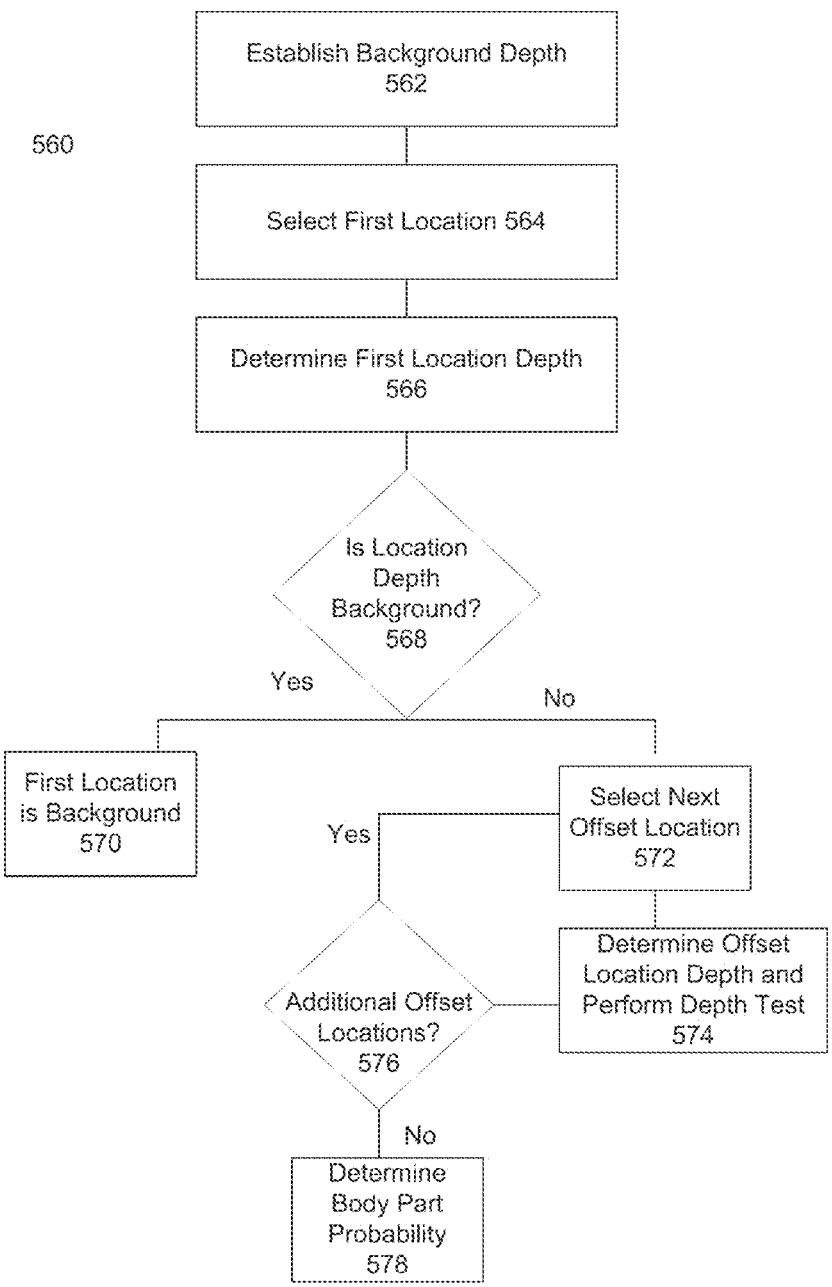
FIG. 26 depicts a flow diagram of an example depth feature test.

FIG. 26 depicts a sample flow chart for assigning probabilities associated with virtual body parts to a depth map. In an example embodiment, the process of FIG. 26 may be performed at 554 of FIG. 25. Process 560 may employ a depth map received at 552 to assign probabilities associated with virtual body parts at 554. One or more background depths on a depth map may be established at 562. For example, one background depth may correspond to a wall in the back of a room, other background depths may correspond to other humans or objects in the room. These background depths may be used later in flowchart of FIG. 26 to determine if a pixel on the depth map is part of a particular user's body or whether the pixel may be associated with the background.

At 564, a first location may be selected in the depth map. The depth of the first location may be determined at 566. At 568, the depth of the first location may be compared with one or more background depths. If the first location depth is at the same or within a specified threshold range of a background depth, then, at 570, the first location is determined to be part of the background and not part of any body parts. If the first location is not at or within a specified threshold range of a background depth, an offset location, referenced with respect to the first location, may be selected at 572. At 574, the depth of the offset location may be determined and a depth test may be performed to determine if the offset location is background. At 576, it is determined whether any additional offset locations are desired.

The determination of whether or not to select additional offset locations, as well as the angle and distance of the additional offset locations from the first location, may be made based in part on the depth of the previous offset location(s) with respect to the first location and/or the background. These determinations may also be made based on additional factors such as the training module described below. In one embodiment, the offsets will scale with depth. For example, if a user is very close to a detector in a capture area, depth may be measured at large offset distances from the first pixel. If the user were to move twice as far from a detector, then the offset distances may decrease by a factor of two. In one embodiment, this scaling causes the depth-offset tests to be invariant. Any number of offset locations may be selected and depth tested, after which a probability that the first location is associated with one or more body parts is calculated at 578. This calculation may be based in part on the depth of the first location and the offset locations with respect to the one or more background depths. This calculation may also be made based on additional factors such as the training module described below.

In another embodiment, 562 may not be performed. In this embodiment, each pixel in a depth map is examined for depth at 566, and then the method proceeds directly to choosing offset locations at 572. In such an example, every pixel in a depth map may be examined for depth or for the probability that it is associated with one or more body parts and/or background. From the determinations made at the first pixel and the offset locations, probabilities may be associated with one or more pixels.

Figure 27:
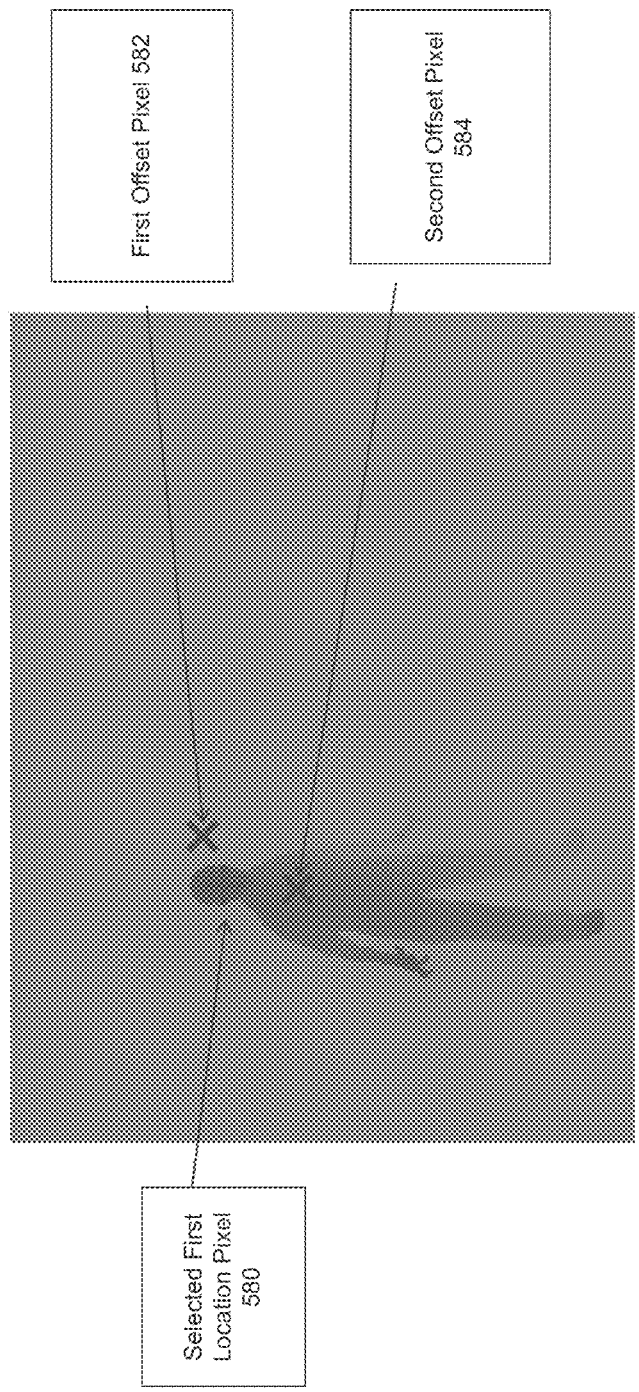
FIG. 27 depicts an example embodiment of pixels measured in a depth feature/probability test.

FIG. 27 depicts an instance of the flow chart referenced in FIG. 26. In the flow chart of FIG. 26, a series of feature tests may be used to determine the probability that a pixel in a depth map is associated with one or more body parts. A first location pixel is selected at 580. A first offset pixel is examined at 582, and a second offset pixel is examined at 584. As more pixels are examined for depth, the probability that a particular pixel is associated with a part of the body may decrease or increase. This probability may be provided to other processes in a target recognition, analysis and tracking system.

In another example depicted by FIG. 27, a first location pixel of a depth map is selected at 580, wherein the depth map has probabilities that each pixel in the depth map is associated with one or more body parts already assigned to each pixel. A second offset pixel is examined for its associated probability at 584. As more pixels are examined for their associated probabilities, a second pass at the probability associated with the first pixel may provide a more accurate determination of the body part associated with the pixel. This probability may be provided to other processes in a target recognition, analysis and tracking system.

Figure 28:
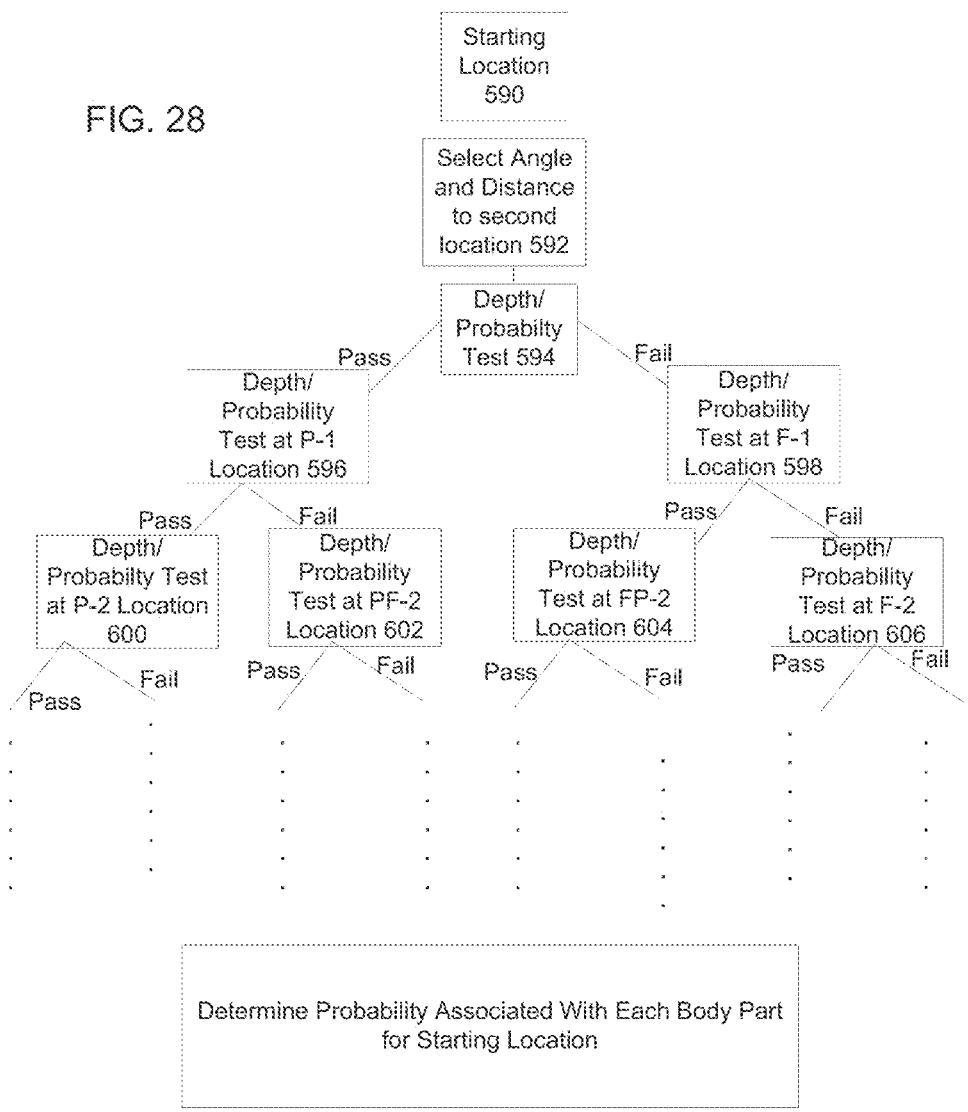
FIG. 28 depicts a flow diagram of an example embodiment of a depth feature/probability test tree.

FIG. 28 depicts a flow chart of another example implementation of feature testing in body pose estimation. A depth map is received and a first pixel location is selected at 590. This may be the pixel depicted at FIG. 28 as the first location. If the first pixel is at the background depth, then probabilities associated with each body part may be zero. If, however, the first pixel is not at the background depth, an angle and distance to a second pixel may be selected at 592.

In another embodiment, a background depth is not determined, instead depth tests and the surrounding offset depth tree tests may be performed at each pixel, regardless of its depth.

In another embodiment, the depth map received at 590 already has the probability that each pixel is associated with one or more body parts assigned to each pixel. Accordingly, instead of testing depth at the first pixel and at offset locations, the probabilities may be tested.

A depth/probability test may be performed on the second pixel at 594. If the second pixel fails the depth/probability test (i.e. it is at the background depth/probability, the depth/probability of a second user, not within the range of a users body or the like) then location F-1 is selected at 598. If, however, the second pixel passes the depth/probability test (i.e. it is within a threshold of the body depth/probability), then location P-1 is selected at 596. Depth/probability tests will then be performed on third pixels at 596 or 598, and based on whether the third pixels pass or fail the depth/probability test, other pixel locations will be selected at one of 600, 602, 604 or 606. While these locations may, in some cases, be the same, they may also vary widely in location based on the results of the depth/probability tests.

In an example embodiment, depth/probability tests on any number of pixels may be performed with reference to a single pixel. For example, 16 tests may be performed, where each depth/probability test is at a different pixel. By performing some quantity of depth/probability tests, the probability that a pixel is associated with each body part may be assigned to each pixel. As another example, only one test may need to be performed on a particular pixel in order to determine the probability that it is associated with one or more body parts.

FIG. 29 depicts an example image that may come from a capture device, such as capture device 60, a graphics package, or other 3-D rendering along with a segmented body image of the example image. Original image 610 may be may be a depth map or other image from the capture device. In an example embodiment, the image of a body may be segmented into many parts as in segmented image 612, and each pixel in a depth map may be associated with a probability for each of the segments in FIG. 29. This probability may be determined using the methods, processes and systems described with respect to FIGS. 26, 27 and 28.

Figure 30:
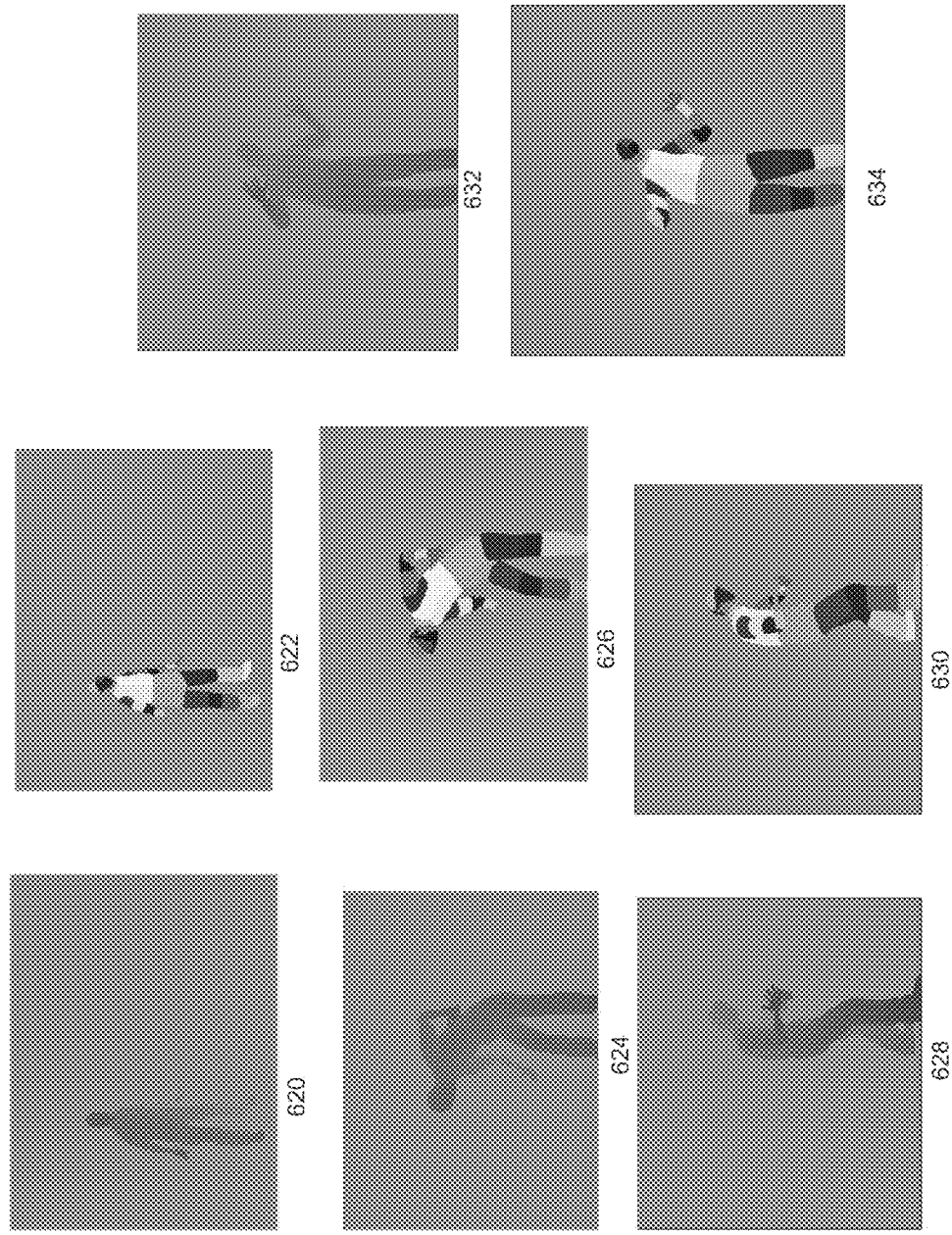
FIG. 30 depicts example embodiments of poses of a user and corresponding segmented images which may be used in a training program to create feature tests.

FIG. 30 depicts a series of images of poses from one or more users. For each pose, an image that may be received from a capture device such as capture device 60 is shown adjacent to an image of the pose that has been segmented into parts.

In a first embodiment, the target recognition, analysis and tracking system may receive the non-segmented images 620, 624, 628, and 632, and use the processes described at FIGS. 26, 27 and 28 to determine the probability that each pixel in the image is associated with each of the segmented body parts. The purpose of the processes described in FIGS. 26, 27 and 28 may be to segment the body into each of the parts shown at 622, 626, 630 and 634. These segmented parts may be used by one or more computer processes to determine the body pose of the user.

In a second embodiment, these images may be used in a feature test training module to determine the feature test of FIGS. 26, 27 and 28. Recall from FIGS. 26, 27 and 28 that a depth test may be performed on a pixel, and it either passes or fails, and based on the pass or fail, a next location will be selected. In one embodiment, the next location selected is not arbitrary, but is selected based on a training module. A training module may involve inputting a volume of thousands, hundreds of thousands, millions or any number of segmented poses such as those shown in FIG. 30 into a program. The program may perform one or more operations on the volume of poses to determine optimal feature tests for each pass or fail for the full volume, or some selection of poses. This optimized series of feature tests may be known as feature test trees.

A volume of poses input into a feature test training module may not contain every possible pose by a user. Further, it may increase the efficiency of the program to create several feature test training modules, each of which are based on a separate volume of body poses. Accordingly, the feature tests at each step of a feature test tree may be different and the final probabilities associated with each segment of a body at the conclusion of a test tree may also be different. In one embodiment, several feature test trees are provided for each pixel and the probabilities output from each test tree may be averaged or otherwise combined to provide a segmented image of a body pose.

Figure 31:
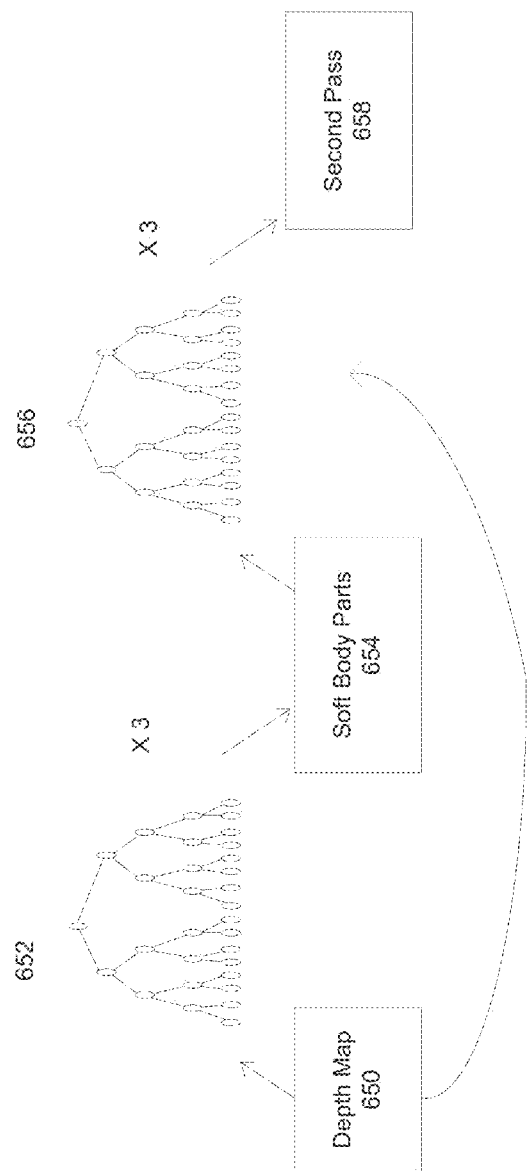
FIG. 31 depicts an example embodiment of assigning probabilities associated with body parts using multiple feature tests.

FIG. 31 depicts an example flow chart to determine body segment probabilities associated with each pixel in human body pose estimation. At 650 a depth map such as the depth map shown above in FIG. 6 may be received from a capture device 60. This depth map may be provided to a series of feature test trees at 652. In FIG. 31, three feature test trees, each having been trained on a different volume of body poses, test each pixel of a depth map. The probability that each pixel is associated with each segment of the body is determined at 654 as the soft body parts. In an example embodiment, the process stops here and these probabilities may be used to obtain the joints/nodes/centroids of FIG. 25 at 556.

In another embodiment, at 656, the depth map may again be provided to a series of feature test trees, each of which may have been created using a different volume of body pose images. In FIG. 31, this second series of feature tests contains three trees, each of which may output a probability for each pixel of the depth map associated with each segment of a body. At 658, the probabilities from the second set of feature test trees 656 and the soft body parts from 654 may be combined by averaging or some other method to determine the second pass of the body parts. FIG. 31 shows two sets of three feature test trees, however, the number of feature test trees is not limited by the number three, nor are the number of passes limited by FIG. 31. There may be any number of feature test trees and any number of passes.

In another embodiment, at 656, the depth map provided to the series of feature test trees may have the probability that each pixel of a depth map is associated with one or more body parts already associated with each pixel. For example, the probability maps determined by the feature test trees at 652 may be provided to the feature test trees at 656. In such a circumstance, instead of depth test training programs and trees, the system instead utilizes probability test training programs and trees. The number of trees and passes is not limited in any way, and the trees may be any combination of depth and probability feature tests.

Figure 32:
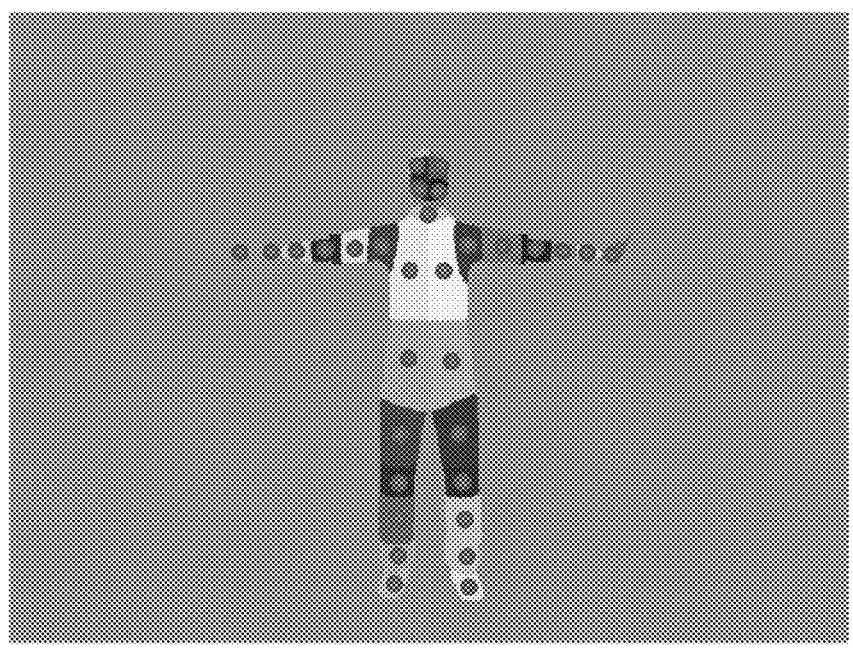
FIG. 32 depicts an example embodiment of centroids/joints/nodes of body parts in body pose estimation.

FIG. 32 depicts a segmented body pose image wherein each segment contains a node/joint/centroid, such as those described at 556 with reference to FIG. 25. These joints/nodes/centroids may be determined by taking the centroid of all of the pixels associated with a body part segment after performing the feature tests of FIGS. 26, 27, 28, and 31. Other methods may also be used to determine the location of the nodes/centroids/joints. For example, a filtering process may remove outlying pixels or the like, after which a process may take place to determine the location of the joints/nodes/centroids.

The joints/nodes/centroids of FIG. 32 may be used to construction a skeletal model, or otherwise represent the body pose of a user. This model may be used by the target recognition, analysis and tracking system in any way, including determining the gesture command of one or more users, identifying one or more users and the like.

Gesture Recognition

The system 50 may also include gesture recognition, so that a user may control an application executing on the computing environment 52, which as discussed above may be a game console, a computer, or the like, by performing one or more gestures. In one embodiment, a gesture recognizer engine, the architecture of which is described more fully below, is used to determine from a skeletal model of a user when a particular gesture has been made by the user.

Figure 33A:
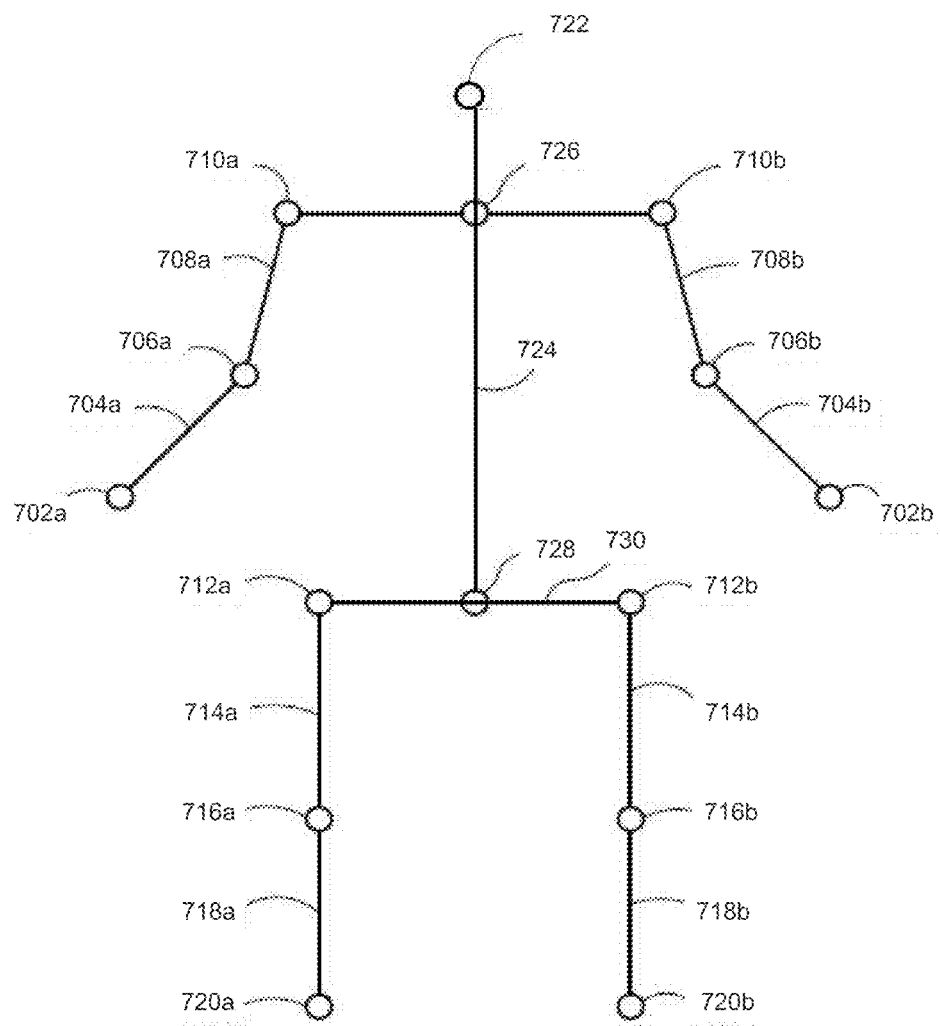
FIG. 33A illustrates a skeletal mapping of a user that has been generated from the target recognition, analysis and tracking system of FIGS. 1A-2.

FIG. 33A depicts an example skeletal mapping of a user, like the map illustrated in FIG. 10, that may be generated from the capture device 60 in the manner described above. In this example, a variety of joints and bones are identified: each hand 702, each forearm 704, each elbow 706, each bicep 708, each shoulder 710, each hip 712, each thigh 714, each knee 716, each foreleg 718, each foot 720, the head 722, the torso 724, the top 726 and bottom 728 of the spine, and the waist 730. Where more points are tracked, additional features may be identified, such as the bones and joints of the fingers or toes, or individual features of the face, such as the nose and eyes.

Through moving his body, a user may create gestures. A gesture comprises a motion or pose by a user that may be captured as image data and parsed for meaning. A gesture may be dynamic, comprising a motion, such as mimicking throwing a ball. A gesture may be a static pose, such as holding one's crossed forearms 704 in front of his torso 724. A gesture may also incorporate props, such as by swinging a mock sword. A gesture may comprise more than one body part, such as clapping the hands 702 together, or a subtler motion, such as pursing one's lips.

Gestures may be used for input in a general computing context. For instance, various motions of the hands 702 or other body parts may correspond to common system wide tasks such as navigate up or down in a hierarchical list, open a file, close a file, and save a file. Gestures may also be used in a video-game-specific context, depending on the game. For instance, with a driving game, various motions of the hands 702 and feet 720 may correspond to steering a vehicle in a direction, shifting gears, accelerating, and breaking.

A user may generate a gesture that corresponds to walking or running, by walking or running in place himself. The user may alternately lift and drop each leg 712-720 to mimic walking without moving. The system may parse this gesture by analyzing each hip 712 and each thigh 714. A step may be recognized when one hip-thigh angle (as measured relative to a vertical line, wherein a standing leg has a hip-thigh angle of 0°, and a forward horizontally extended leg has a hip-thigh angle of 90°) exceeds a certain threshold relative to the other thigh. A walk or run may be recognized after some number of consecutive steps by alternating legs. The time between the two most recent steps may be thought of as a period. After some number of periods where that threshold angle is not met, the system may determine that the walk or running gesture has ceased.

Given a "walk or run" gesture, an application may set values for parameters associated with this gesture. These parameters may include the above threshold angle, the number of steps required to initiate a walk or run gesture, a number of periods where no step occurs to end the gesture, and a threshold period that determines whether the gesture is a walk or a run. A fast period may correspond to a run, as the user will be moving his legs quickly, and a slower period may correspond to a walk.

A gesture may be associated with a set of default parameters at first that the application may override with its own parameters. In this scenario, an application is not forced to provide parameters, but may instead use a set of default parameters that allow the gesture to be recognized in the absence of application-defined parameters.

There are a variety of outputs that may be associated with the gesture. There may be a baseline "yes or no" as to whether a gesture is occurring. There also may be a confidence level, which corresponds to the likelihood that the user's tracked movement corresponds to the gesture. This could be a linear scale that ranges over floating point numbers between 0 and 1, inclusive. Wherein an application receiving this gesture information cannot accept false-positives as input, it may use only those recognized gestures that have a high confidence level, such as at least 0.95. Where an application must recognize every instance of the gesture, even at the cost of false-positives, it may use gestures that have at least a much lower confidence level, such as those merely greater than 0.2. The gesture may have an output for the time between the two most recent steps, and where only a first step has been registered, this may be set to a reserved value, such as −1 (since the time between any two steps must be positive). The gesture may also have an output for the highest thigh angle reached during the most recent step.

Another exemplary gesture is a "heel lift jump." In this, a user may create the gesture by raising his heels off the ground, but keeping his toes planted. Alternatively, the user may jump into the air where his feet 720 leave the ground entirely. The system may parse the skeleton for this gesture by analyzing the angle relation of the shoulders 710, hips 712 and knees 716 to see if they are in a position of alignment equal to standing up straight. Then these points and upper 726 and lower 728 spine points may be monitored for any upward acceleration. A sufficient combination of acceleration may trigger a jump gesture.

Given this "heel lift jump" gesture, an application may set values for parameters associated with this gesture. The parameters may include the above acceleration threshold, which determines how fast some combination of the user's shoulders 710, hips 712 and knees 716 must move upward to trigger the gesture, as well as a maximum angle of alignment between the shoulders 710, hips 712 and knees 716 at which a jump may still be triggered.

The outputs may comprise a confidence level, as well as the user's body angle at the time of the jump.

Setting parameters for a gesture based on the particulars of the application that will receive the gesture is important in accurately identifying gestures. Properly identifying gestures and the intent of a user greatly helps in creating a positive user experience. Where a gesture recognizer system is too sensitive, and even a slight forward motion of the hand 702 is interpreted as a throw, the user may become frustrated because gestures are being recognized where he has no intent to make a gesture, and thus, he lacks control over the system. Where a gesture recognizer system is not sensitive enough, the system may not recognize conscious attempts by the user to make a throwing gesture, frustrating him in a similar manner. At either end of the sensitivity spectrum, the user becomes frustrated because he cannot properly provide input to the system.

Another parameter to a gesture may be a distance moved. Where a user's gestures control the actions of an avatar in a virtual environment, that avatar may be arm's length from a ball. If the user wishes to interact with the ball and grab it, this may require the user to extend his arm 702-710 to full length while making the grab gesture. In this situation, a similar grab gesture where the user only partially extends his arm 702-710 may not achieve the result of interacting with the ball.

A gesture or a portion thereof may have as a parameter a volume of space in which it must occur. This volume of space may typically be expressed in relation to the body where a gesture comprises body movement. For instance, a football throwing gesture for a right-handed user may be recognized only in the volume of space no lower than the right shoulder 710*a*, and on the same side of the head 722 as the throwing arm 702*a*-710*a*. It may not be necessary to define all bounds of a volume, such as with this throwing gesture, where an outer bound away from the body is left undefined, and the volume extends out indefinitely, or to the edge of capture area that is being monitored.

Figure 33B:
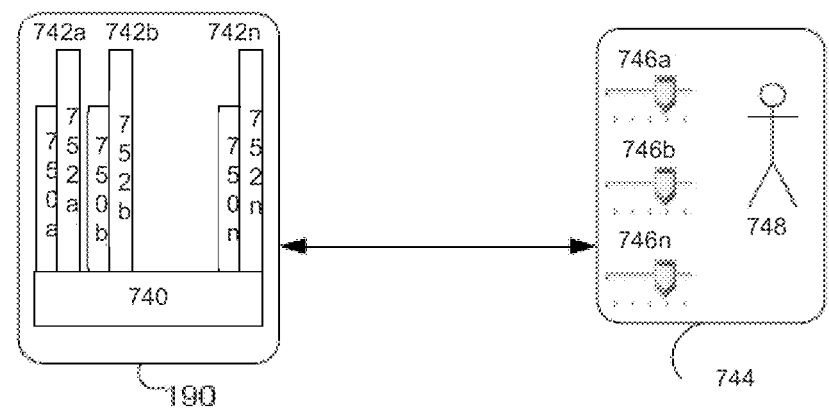
FIG. 33B illustrates further details of the gesture recognizer architecture shown in FIG. 2.

FIG. 33B provides further details of one exemplary embodiment of the gesture recognizer engine 190 of FIG. 2. As shown, the gesture recognizer engine 190 may comprise at least one filter 742 to determine a gesture or gestures. A filter 742 comprises information defining a gesture 750 (hereinafter referred to as a "gesture") along with parameters 752, or metadata, for that gesture. A filter may comprise code and associated data that can recognize gestures or otherwise process depth, RGB, or skeletal data. For instance, a throw, which comprises motion of one of the hands from behind the rear of the body to past the front of the body, may be implemented as a gesture 750 comprising information representing the movement of one of the hands of the user from behind the rear of the body to past the front of the body, as that movement would be captured by the depth camera. Parameters 752 may then be set for that gesture 750. Where the gesture 750 is a throw, a parameter 752 may be a threshold velocity that the hand has to reach, a distance the hand must travel (either absolute, or relative to the size of the user as a whole), and a confidence rating by the recognizer engine that the gesture occurred. These parameters 752 for the gesture 750 may vary between applications, between contexts of a single application, or within one context of one application over time.

A filter may comprise code and associated data that can recognize gestures or otherwise process depth, RGB, or skeletal data. Filters may be modular or interchangeable. In an embodiment, a filter has a number of inputs, each of those inputs having a type, and a number of outputs, each of those outputs having a type. In this situation, a first filter may be replaced with a second filter that has the same number and types of inputs and outputs as the first filter without altering any other aspect of the recognizer engine architecture. For instance, there may be a first filter for driving that takes as input skeletal data and outputs a confidence that the gesture associated with the filter is occurring and an angle of steering. Where one wishes to substitute this first driving filter with a second driving filter—perhaps because the second driving filter is more efficient and requires fewer processing resources—one may do so by simply replacing the first filter with the second filter so long as the second filter has those same inputs and outputs—one input of skeletal data type, and two outputs of confidence type and angle type.

A filter need not have a parameter. For instance, a "user height" filter that returns the user's height may not allow for any parameters that may be tuned. An alternate "user height" filter may have tunable parameters—such as to whether to account for a user's footwear, hairstyle, headwear and posture in determining the user's height.

Inputs to a filter may comprise things such as joint data about a user's joint position, like angles formed by the bones that meet at the joint, RGB color data from the capture area, and the rate of change of an aspect of the user. Outputs from a filter may comprise things such as the confidence that a given gesture is being made, the speed at which a gesture motion is made, and a time at which a gesture motion is made.

A context may be a cultural context, and it may be an environmental context. A cultural context refers to the culture of a user using a system. Different cultures may use similar gestures to impart markedly different meanings. For instance, an American user who wishes to tell another user to "look" or "use his eyes" may put his index finger on his head close to the distal side of his eye. However, to an Italian user, this gesture may be interpreted as a reference to the mafia.

Similarly, there may be different contexts among different environments of a single application. Take a first-person shooter game that involves operating a motor vehicle. While the user is on foot, making a first with the fingers towards the ground and extending the first in front and away from the body may represent a punching gesture. While the user is in the driving context, that same motion may represent a "gear shifting" gesture. There may also be one or more menu environments, where the user can save his game, select among his character's equipment or perform similar actions that do not comprise direct game-play. In that environment, this same gesture may have a third meaning, such as to select something or to advance to another screen.

The gesture recognizer engine 190 may have a base recognizer engine 740 that provides functionality to a gesture filter 742. In an embodiment, the functionality that the recognizer engine 740 implements includes an input-over-time archive that tracks recognized gestures and other input, a Hidden Markov Model implementation (where the modeled system is assumed to be a Markov process—one where a present state encapsulates any past state information necessary to determine a future state, so no other past state information must be maintained for this purpose—with unknown parameters, and hidden parameters are determined from the observable data), as well as other functionality required to solve particular instances of gesture recognition.

Filters 742 are loaded and implemented on top of the base recognizer engine 740 and can utilize services provided by the engine 740 to all filters 742. In an embodiment, the base recognizer engine 740 processes received data to determine whether it meets the requirements of any filter 742. Since these provided services, such as parsing the input, are provided once by the base recognizer engine 740 rather than by each filter 742, such a service need only be processed once in a period of time as opposed to once per filter 742 for that period, so the processing required to determine gestures is reduced.

An application may use the filters 742 provided by the recognizer engine 190, or it may provide its own filter 742, which plugs in to the base recognizer engine 740. In an embodiment, all filters 742 have a common interface to enable this plug-in characteristic. Further, all filters 742 may utilize parameters 752, so a single gesture tool as described below may be used to debug and tune the entire filter system 742.

These parameters 752 may be tuned for an application or a context of an application by a gesture tool 744. In an embodiment, the gesture tool 744 comprises a plurality of sliders 746, each slider 746 corresponding to a parameter 752, as well as a pictorial representation of a body 748. As a parameter 752 is adjusted with a corresponding slider 746, the body 748 may demonstrate both actions that would be recognized as the gesture with those parameters 752 and actions that would not be recognized as the gesture with those parameters 752, identified as such. This visualization of the parameters 752 of gestures provides an effective means to both debug and fine tune a gesture.

FIG. 34 depicts more complex gestures or filters 742 created from stacked gestures or filters 742. Gestures can stack on each other. That is, more than one gesture may be expressed by a user at a single time. For instance, rather than disallowing any input but a throw when a throwing gesture is made, or requiring that a user remain motionless save for the components of the gesture (e.g. stand still while making a throwing gesture that involves only one arm). Where gestures stack, a user may make a jumping gesture and a throwing gesture simultaneously, and both of these gestures will be recognized by the gesture engine.

Figure 34A:
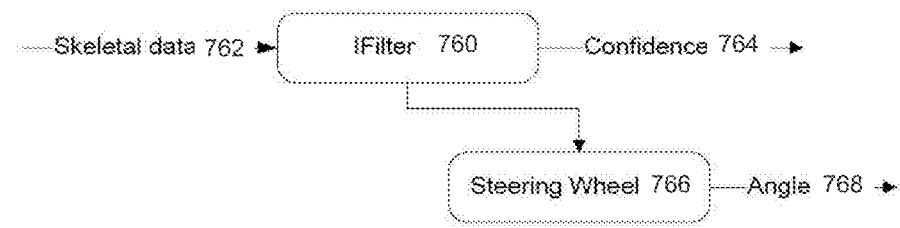
FIGS. 34A-34B illustrate how gesture filters may be stacked to create more complex gesture filters.

FIG. 34A depicts a simple gesture filter 742 according to the stacking paradigm. The IFilter filter 760 is a basic filter 742 that may be used in every gesture filter. IFilter 760 takes user position data 762 and outputs a confidence level 764 that a gesture has occurred. It also feeds that position data 762 into a Steering Wheel filter 766 that takes it as an input and outputs an angle to which the user is steering (e.g. 40 degrees to the right of the user's current bearing) 768.

Figure 34B:
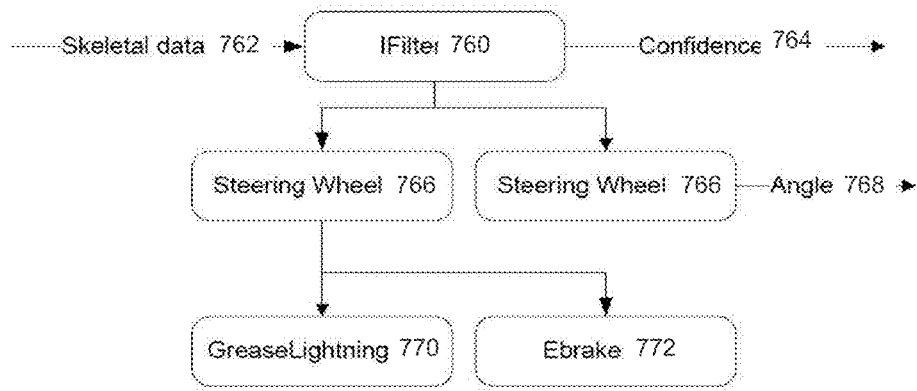

FIG. 34B depicts a more complex gesture that stacks filters 742 onto the gesture filter of FIG. 34A. In addition to IFilter 760 and SteeringWheel 766, there is an ITracking filter 512 that receives position data 762 from IFilter 760 and outputs the amount of progress the user has made through a gesture 514. ITracking 512 also feeds position data 762 to GreaseLightning 770 and EBrake 772, which are filters 742 regarding other gestures that may be made in operating a vehicle, such as using the emergency brake.

FIGS. 35A-35E depict an example gesture that a user 802 may make to signal for a "fair catch" in a football video game. These figures depict the user at points in time, with FIG. 35A being the first point in time, and FIG. 35E being the last point in time. Each of these figures may correspond to a snapshot or frame of image data as captured by a depth camera 402, though not necessarily consecutive frames of image data, as the depth camera 402 may be able to capture frames more rapidly than the user may cover the distance. For instance, this gesture may occur over a period of 3 seconds, and where a depth camera captures data at 40 frames per second, it would capture 60 frames of image data while the user 802 made this fair catch gesture.

In FIG. 35A, the user 802 begins with his arms 804 down at his sides. He then raises them up and above his shoulders as depicted in FIG. 35B and then further up, to the approximate level of his head, as depicted in FIG. 35C. From there, he lowers his arms 804 to shoulder level, as depicted in FIG. 35D, and then again raises them up, to the approximate level of his head, as depicted in FIG. 35E. Where a system captures these positions by the user 802 without any intervening position that may signal that the gesture is cancelled, or another gesture is being made, it may have the fair catch gesture filter output a high confidence level that the user 802 made the fair catch gesture.

FIG. 36 depicts the example "fair catch" gesture of FIG. 34 as each frame of image data has been parsed to produce a skeletal map of the user. The system, having produced a skeletal map from the depth image of the user, may now determine how that user's body moves over time, and from that, parse the gesture.

In FIG. 36A, the user's shoulders 710, are above his elbows 706, which in turn are above his hands 702. The shoulders 710, elbows 706 and hands 702 are then at a uniform level in FIG. 36B. The system then detects in FIG. 36C that the hands 702 are above the elbows, which are above the shoulders 710. In FIG. 36D, the user has returned to the position of FIG. 36B, where the shoulders 710, elbows 706 and hands 702 are at a uniform level. In the final position of the gesture, shown in FIG. 36E, the user returns to the position of FIG. 36C, where the hands 702 are above the elbows, which are above the shoulders 710.

While the capture device 60 captures a series of still images, such that in any one image the user appears to be stationary, the user is moving in the course of performing this gesture (as opposed to a stationary gesture, as discussed supra). The system is able to take this series of poses in each still image, and from that determine the confidence level of the moving gesture that the user is making.

In performing the gesture, a user is unlikely to be able to create an angle as formed by his right shoulder 710a, right elbow 706a and right hand 702a of, for example, between 140° and 145°. So, the application using the filter 742 for the fair catch gesture 750 may tune the associated parameters 752 to best serve the specifics of the application. For instance, the positions in FIGS. 36C and 36E may be recognized any time the user has his hands 702 above his shoulders 710, without regard to elbow 706 position. A set of parameters that are more strict may require that the hands 702 be above the head 710 and that the elbows 706 be both above the shoulders 710 and between the head 722 and the hands 702. Additionally, the parameters 752 for a fair catch gesture 750 may require that the user move from the position of FIG. 36A through the position of FIG. 36E within a specified period of time, such as 1.5 seconds, and if the user takes more than 1.5 seconds to move through these positions, it will not be recognized as the fair catch 750, and a very low confidence level may be output.

Figure 37:
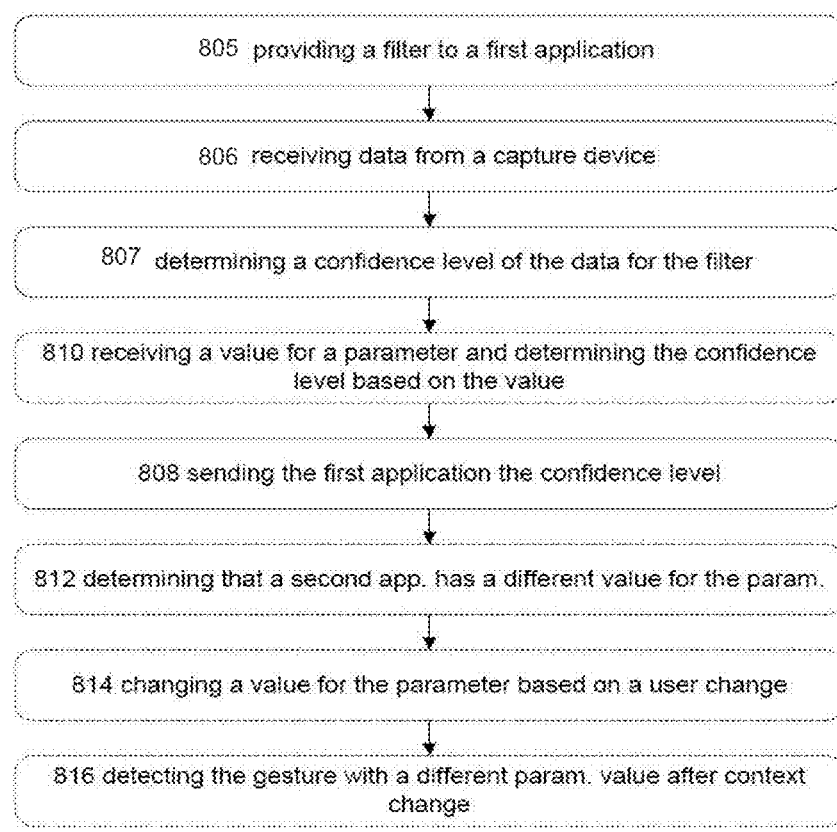
FIG. 37 illustrates exemplary operational procedures for using a gesture recognizer architecture to provide gestures to at least one application.

FIG. 37 depicts exemplary operational procedures for using a gesture recognizer architecture to provide gestures to at least one application of a plurality of applications.

Operation 805 depicts providing a filter representing a gesture to the first application, the filter comprising base information about the gesture. The gesture may comprise a wide variety of gestures. It may, for instance, be any of a crouch, a jump, a lean, an arm throw, a toss, a swing, a dodge, a kick, and a block. Likewise, the gesture may correspond to navigation of a user interface. For instance, a user may hold his hand with the fingers pointing up and the palm facing the depth camera. He may then close his fingers towards the palm to make a fist, and this could be a gesture that indicates that the focused window in a window-based user-interface computing environment should be closed.

As gestures may be used to indicate anything from that an avatar should throw a punch to that a window should be closed, a wide variety of applications, from video games to text editors may utilize gestures.

Gestures may be grouped together into genre packages of complimentary gestures that are likely to be used by an application in that genre. Complimentary gestures—either complimentary as in those that are commonly used together, or complimentary as in a change in a parameter of one will change a parameter of another—are grouped together into genre packages. These packages are provided to an application, which may select at least one. The application may tune, or modify, the parameter of a gesture to best fit the unique aspects of the application. When that parameter is tuned, a second, complimentary parameter (in the inter-dependent sense) of either the gesture or a second gesture is also tuned such that the parameters remain complimentary. Genre packages for video games may include genres such as first-person shooter, action, driving, and sports.

The parameter may vary based on the context the application is in. To that end, an application may assign a plurality of values to a parameter for a gesture, each value corresponding to a different context. As discussed supra, this context may be a cultural context or an environmental context.

In an embodiment, the application provides the gesture, which is used by the gesture recognizer engine. In the embodiment where each gesture comprises common inputs and outputs, the application may provide a gesture that adheres to those conventions, and communicate this gesture with the recognizer engine through an agreed-upon protocol.

Operation 805 depicts receiving data captured by capture device 60, as described above, the data corresponding to the first application. The data may correspond to the first application because that is the currently active application for which input is being generated.

Operation 807 depicts applying the filter to the data and determining an output from the base information about the gesture. In an embodiment, the output comprises a confidence level that the gesture corresponding to the filter has been performed. This confidence level may be output once, or it may be output continuously in response to received data. In an embodiment, this comprises determining a confidence level that the user has moved in such a way as to meet any requirements of the gesture (such as the hand being above the head) that are independent of any parameters. In an embodiment, this output may comprise a Boolean determination as to whether the gesture corresponding to the filter occurred.

Where the filter comprises a parameter, the parameter may be a threshold, such as arm velocity is greater than X. It may be an absolute, such as arm velocity equals X. There may be a fault tolerance, such as arm velocity equals within Y of X. It may also comprise a range, such as arm velocity is greater than or equal to X, but less than Z. From the received data, the characteristics of that data that apply to the parameter may be determined, and then compared to the requirements of the parameter.

In an embodiment, the user also uses his voice to make, augment, distinguish or clarify a gesture. In this embodiment, operation 807 comprises receiving voice data and determining that a combination of the data and the voice data is indicative of the gesture. For instance, a user may be able to make a singing gesture by opening and closing his mouth, but also specify a specific note of that singing gesture by singing that note. Additionally, the user may be able to make a "strong punch" gesture as opposed to a "regular punch" gesture by shouting while making the otherwise "regular punch" gesture.

In an embodiment, the gesture may comprise a plurality of gestures. For instance, the user may be making the motions corresponding to moving to his side and discharging his firearm simultaneously. In this embodiment, it would be disfavored to limit the user to not discharging his firearm while he is moving, so multiple gestures made simultaneously by the user are detected.

Operation 808 depicts sending the first application the confidence level. In an embodiment, this may include sending the application a time or a period of time at which the gesture occurred. In another embodiment where the application desires time information, the application may use the time at which this indication that the gesture occurred is received as that time information. In an embodiment, this operation includes sending the application information about the characteristics of the gesture, such as a velocity of movement, a release point, a distance, and a body part that made the gesture. For instance, given a baseball video game where a pitcher may throw a pitch at any integer velocity between 50 mph and 105 mph, inclusive, and that velocity is based on the user's maximum arm velocity in making the gesture, it may be cumbersome to define a separate set of parameters for each of those 56 possible velocities. Instead, the application may be given an indication that the gesture occurred along with the maximum arm velocity of the user, and then the application may use internal logic to determine how fast the corresponding pitcher should throw the pitch.

Optional operation 810 depicts receiving from the first application a value for at least one parameter, and where determining from the base information about the gesture and each parameter a confidence level includes determining from the value of the parameter a confidence level. A parameter may comprise any of a wide variety of characteristics of a gesture, such as a body part, a volume of space, a velocity, a direction of movement, an angle, and a place where a movement occurs.

In an embodiment, the value of the parameter is determined by an end user of the application through making a gesture. For instance, an application may allow the user to train it, so that the user is able to specify what motions he believes a gesture should comprise. This may be beneficial to allow a user without good control over his motor skills to be able to link what motions he can make with a corresponding gesture. If this were not available, the user may become frustrated because he is unable to make his body move in the manner required by the application to produce the gesture.

In an embodiment where there exist complimentary gestures—a plurality of gestures that have inter-related parameters—receiving from the application a value for a parameter may include both setting the parameter with the value, and setting a complimentary parameter of a complimentary gesture based on the value. For example, one may decide that a user who throws a football in a certain manner is likely to also throw a baseball in a certain manner. So, where it is determined that a certain parameter should be set in a particular manner, other complimentary parameters may be set based on how that first parameter is set.

This need not be the same value for a given parameter, or even the same type of parameter across gestures. For instance, it could be that when a football throw must be made with a forward arm velocity of X m/s, then a football catch must be made with the hands at least distance Y m away from the torso.

Operation 812 depicts the optional operation of receiving from the second application a second value for at least one parameter of a second filter representing the gesture, the second filter comprising the base information about the gesture, the second value differing from the value received from the first application; receiving second data captured by a camera; applying the second filter to the second data and determining from the base information about the gesture and each parameter of the second filter a confidence level that the second data is indicative of the gesture being performed; and sending the second application the confidence level.

Each application, or context within an application, may specify its own parameter for a single gesture, and the gesture recognizer 190 will be responsive to the particulars of each application. For instance, one first-person shooter may require a demonstrative gun firing gesture, because ammunition is limited or secrecy plays a major role in the game, and firing a gun produces a loud noise. However, a second first-person shooter may allow for a much smaller motion for firing a gun, because a demonstrative motion runs too close to what that game has defined for a punching motion.

Optional operation 814 depicts optional operations—wherein receiving from the application a value for a parameter includes setting the parameter with the value, and receiving data captured by the capture device includes receiving data from a first user—of setting the parameter with a second value in response to receiving data captured by the capture device indicative of one selected from the group consisting of an increase in the first user's fatigue, an increase in the first user's competence, and a second user replacing the first user.

The motions or poses that a user makes to convey a gesture may change over time, and this may create a change in context. For instance, the user may become fatigued and no longer jump as high as he did at the start of his session to convey a jump gesture. Also, the user may through practice become better at making the motion or pose associated with a gesture, so the acceptable variations for a parameter may be decreased so that two different gestures are less likely to be recognized by one set of motions or pose. The application may also wish to give the user a more challenging experience as he becomes more adroit, so as not to lose his attention. In another embodiment, the application may give the user finer control over the gestures or more gestures to use. For instance, a beginner at a tennis video game may only be concerned with hitting the ball over the net, and not with putting any spin on it. However, as the tennis application detects that the user is improving, it may introduce or recognize gestures for top-spin or back-spin in addition to the standard hit.

Also, a second user may replace the first user as the one providing input and the second user may have drastically different ways of conveying gestures. In an embodiment, the received depth images may be parsed to determine that a second user is in the capture area conveying the gestures. In an embodiment, there may be a reserved gesture that the user may utilize to indicate this to the application. Also, the recognizer engine may determine the presence of the second user through a change in the motions or poses made to convey gestures.

When these changes have been determined, they may each be treated like a change in context, and parameters may be changed correspondingly to account for this.

Operation 816 depicts the optional operation of changing the context; receiving a second data captured by the camera indicative of the user's first gesture being performed; determining from the second data that a confidence level that a second gesture represented by a second filter is being performed is greater than the confidence level from the second data that the represented by the filter is being performed.

In different contexts, one motion or pose by a user may be correspond to different gestures. For instance, in a fighting game, while in the fighting mode of the game, the user may cross his forearms in front of his torso. In this fighting context, that may correspond to a "block attack" gesture. However, if the user pauses the game and enters a menu screen, this menu screen comprises a different context. In this menu screen context, that same crossed forearms may correspond to a "exit menu screen" gesture.

CONCLUSION

As can be appreciated from the description above, a system, which may be embodied in a single capture device, such as capture device 60, may contain a number of elements that may work alone or in parallel with other elements. For example, these elements may include the IR light component, the three-dimensional (3-D) camera, and the RGB camera described above in connection with FIG. 2. The elements may also include the microphone(s), the processor and the memory of the capture device. As described herein, these elements work synergistically in order to uniquely recognize targets in a capture area without having special sensor devices attached to the targets, to track them in space, and to use poses and gestures of a target to control a computing environment.

As an example of the synergy provided by these elements, consider that the IR light component and the 3-D camera may provide a depth image of a capture area, but in certain situations the depth image alone may not be sufficient to discern the position or movement of a human target. In those situations, the RGB camera may "take over" or supplement the information from the 3-D camera to enable a more complete recognition of the human target's movement or position. For example, the RGB camera may be used to recognize, among other things, colors associated with one or more targets. If a user is wearing a shirt with a pattern on it that the depth camera may not be able to detect, the RGB camera may be used to track that pattern and provide information about movements that the user is making. As another example, if a user twists, the RGB camera may be use to supplement the information from one or more other sensors to determine the motion of the user. As a further example, if a user is next to another object such as a wall or a second target, the RGB data may be used to distinguish between the two objects. The RGB camera may also be capable of determining fine aspects of a user such as facial recognition, hair color and the like which may be used to provide additional information. For example, if a user turns backwards, the RGB camera may use hair color and/or the lack of facial features to determine that a user is facing away from the capture device.

Other synergies may also be achieved. For example, the microphone(s) in the capture device may also be used to provide additional and supplemental information about a target to enable the system to better discern aspects of the target's position or movement. For example, the microphone(s) may comprise directional microphone(s) or an array of directional microphones that can be used to further discern the position of a human target or to distinguish between two targets. For example, if two users are of similar shape or size and are in a capture area, the microphones may be used to provide information about the users such that the users may be distinguished from each other base, for example, on recognition of their separate voices. As another example, the microphones may be used to provide information to a user profile about the user, or in a 'speech to text' type embodiment, where the at least one microphone may be used to create text in a computing system.

The inclusion of processing capabilities in the capture device enables the multi-point skeletal model of a user to be delivered in real-time, expensive external post-processing is not necessary for applications to digest the information. In one embodiment, there may be a separate processor for each of multiple components of the capture device, or there may be a single central processor. As another example, there may be a central processor as well as at least one other associated processor. If there is a high cost computing task, the two or more processors may share the processing tasks in any way. The processor(s) may include a memory as described above and the memory may store one or more user profiles. These profiles may store body scans, typical modes of usage or play, age, height, weight information, names, avatars, high scores or any other information associated with a user and usage of the system.

As also described above, a variety of different software may also be included in the capture device and on an associated computing environment to facilitate the recognition, analysis and tracking of human and non-human targets. The software may be used to create and store profiles, to track users over time, to provide training modules, to control the aspects of the capture device and the computing environment, and the like. In one embodiment, the software may use the information received form two or more of the sensors to create synergies such that at least one target may be tracked accurately and in real time by a target tracking, recognition and analysis system.

While the present disclosure has been described in connection with the preferred aspects, as illustrated in the various figures, it is understood that other similar aspects may be used or modifications and additions may be made to the described aspects for performing the same function of the present disclosure without deviating therefrom. Therefore, the present disclosure should not be limited to any single aspect, but rather construed in breadth and scope in accordance with the appended claims. For example, the various procedures described herein may be implemented with hardware or software, or a combination of both. Thus, the methods and apparatus of the disclosed embodiments, or certain aspects or portions thereof, may take the form of program code (i.e., instructions) embodied in tangible media, such as floppy diskettes, CD-ROMs, hard drives, or any other machine-readable storage medium. When the program code is loaded into and executed by a machine, such as a computer, the machine becomes an apparatus configured for practicing the disclosed embodiments. In addition to the specific implementations explicitly set forth herein, other aspects and implementations will be apparent to those skilled in the art from consideration of the specification disclosed herein. It is intended that the specification and illustrated implementations be considered as examples only.

What is claimed:

1. A system for analyzing a user in a capture area, comprising:
  a processor; and
  a memory communicatively coupled to the processor when the system is operational, the memory bearing processor-executable instructions that, when executed on the processor, cause the system at least to:
    receive depth data for the capture area;
    receive color data for the capture area;
    determine a skeletal model of the user in the capture area based on the depth data, the user having a first body part and a second body part, the skeletal model comprising a representation of the first body part and a representation of the second body part of the user; and
    determine an orientation of the first body part of the user relative to the second body part of the user based on the color data.

2. The system of claim 1, wherein the instructions that, when executed on the processor, cause the system at least to determine the orientation of the first body part of the user relative to the second body part of the user, further cause the system at least to:
  determine an axial roll angle of the first body part of the user relative to the second body part of the user; and constrain a range of motion of the representation of the first body part relative to the representation of the second body part in the skeletal model based on the axial roll angle.

3. The system of claim 2, wherein the memory further bears instructions that, when executed on the processor, cause the system at least to:
receive second color data for the capture area;
determine a second orientation of the first body part of the user relative to the second body part of the user based on the second color data;
determine that the second orientation of the first body part of the user relative to the second body part of the user violates the constrained range of motion; and
modify an orientation of the representation of the first body part of the user relative to the representation of the second body part of the user in the skeletal model based on the constrained range of motion.

4. The system of claim 1, wherein the instructions that, when executed on the processor, cause the system at least to determine the orientation of the first body part of the user relative to the second body part of the user based on the color data, further cause the system at least to:
determine that the orientation of the user comprises the user facing toward a capture device in response to determining that a face of the user is present in the color data.

5. The system of claim 1, wherein the memory further bears instructions that, when executed on the processor, cause the system at least to:
determine a location of the user in the capture area based in on the depth data.

6. The system of claim 5, wherein the memory further bears instructions that, when executed on the processor, cause the system at least to:
track the user over time based on known mechanics of a human muscular-skeletal system.

7. The system of claim 1, wherein the memory further bears instructions that, when executed on the processor, cause the system at least to:
track movement of the user over time based on the skeletal model.

8. The system of claim 7, wherein when the memory further bears instructions that, when executed on the processor, cause the system at least to:
determine that the system is unable to track movement of the user from the depth data without the color data; and
track movement of the user based on the depth data supplemented with the color data.

9. The system of claim 1, wherein the instructions that, when executed on the processor, cause the system at least to determine the orientation of the first body part of the user relative to the second body part of the user based on the color data, further cause the system at least to:
determine that the orientation of the user comprises the user facing away from a capture device in response to determining that a threshold amount of hair color of the user or less than a threshold amount of facial features of the user is present in the color data.

10. The system of claim 1, wherein the color data comprises black and white or grayscale colors.

11. A method for tracking a human user in a capture area, comprising:
receiving depth data for the capture area;
receiving color data for the capture area;
determining a skeletal model of the user in the capture area based on the depth data, the skeletal model comprising a first body part and a second body part of the user; and
determining an orientation of the first body part of the user relative to the second body part of the user based on the color data.

12. The method of claim 11, wherein determining the orientation of the first body part of the user relative to the second body part of the user further comprises:
determining an axial roll angle of the first body part of the user relative to the second body part of the user; and
constraining a range of motion of a representation of the first body part relative to a representation of the second body part in the skeletal model based on the axial roll angle.

13. The method of claim 12, further comprising:
receiving second color data for the capture area;
determining a second orientation of the first body part of the user relative to the second body part of the user based on the second color data;
determining that the second orientation of the first body part of the user relative to the second body part of the user violates the constrained range of motion; and
modifying an orientation of the representation of the first body part of the user relative to the representation of the second body part of the user in the skeletal model based on the constrained range of motion.

14. The method of claim 11, further comprising:
receiving sound data from at least one microphone; and
recognizing and tracking comprises recognizing and tracking movement of the user in the capture area over time based on a combination of at least two of the depth data, the color data and the sound data.

15. The method of claim 11, further comprising:
tracking movement of the user over time based on known mechanics of a human muscular-skeletal system.

16. The method of claim 11, further comprising:
determining, by one or more computers, that the one or more computers are unable to track movement of the user from the depth data without the color data; and
tracking, by the one or more computers, movement of the user based on the depth data supplemented with the color data.

17. The method of claim 11, wherein the first body part and the second body part are both directly connected at a joint.

18. A computer-readable storage device bearing computer-executable instructions that, when executed by a computer, causing the computer to perform operations comprising:
receiving depth data for a user in a capture area;
receiving color data for the capture area;
determining a skeletal model of the user in the capture area based on the depth data, the skeletal model comprising a first body part and a second body part of the user; and
determining an orientation of the first body part of the user relative to the second body part of the user based on the color data.

19. The computer-readable storage device of claim 18, further bearing computer-executable instructions that, when executed by the computer, causing the computer to perform operations comprising:
determining a constraint of where a representation of the first body part may be located based on a rotational orientation of the first body part relative to the second body part and the location of the second body part;

determining that the location of the first body part violates the constraint; and in response to determining that the location of the first body part violates the constraint, adjusting a position of a representation of the first body part in the skeletal model to a location that does not violate the constraint.

20. The computer-readable storage device of claim 18, further bearing computer-executable instructions that, when executed by the computer, causing the computer to perform operations comprising:

determining a rotational orientation of the first body part relative to the second body part based on the color data, the rotational orientation indicating how the first body part is rotated at its location in the capture area.

* * * * *